(12) United States Patent
Patel et al.

(10) Patent No.: US 7,498,282 B2
(45) Date of Patent: *Mar. 3, 2009

(54) MULTI-LAYER, ELASTIC ARTICLES

(75) Inventors: Rajen M. Patel, Lake Jackson, TX (US); Andy C. Chang, Houston, TX (US); Hong Peng, Lake Jackson, TX (US); Seema V. Karande, Pearland, TX (US); Benjamin C. Poon, Pearland, TX (US); Yunwa Wilson Cheung, Pittsford, NY (US)

(73) Assignee: Dow Global Technology Inc., Midland, MI (US)

( * ) Notice: Subject to any disclaimer, the term of this patent is extended or adjusted under 35 U.S.C. 154(b) by 195 days.

This patent is subject to a terminal disclaimer.

(21) Appl. No.: 11/552,563

(22) Filed: Oct. 25, 2006

(65) Prior Publication Data

US 2007/0092704 A1    Apr. 26, 2007

Related U.S. Application Data

(60) Provisional application No. 60/730,705, filed on Oct. 26, 2005, provisional application No. 60/754,087, filed on Dec. 27, 2005, provisional application No. 60/824,728, filed on Sep. 6, 2006.

(51) Int. Cl.
*B32B 27/12* (2006.01)
*B32B 5/26* (2006.01)
*B32B 27/00* (2006.01)

(52) U.S. Cl. .................... 442/398; 422/381; 422/394; 422/389; 428/424.8

(58) Field of Classification Search ................ 442/381, 442/394, 389, 398, 403, 405, 361
See application file for complete search history.

(56) References Cited

U.S. PATENT DOCUMENTS

| | | | |
|---|---|---|---|
| 3,873,642 A | 3/1975 | Jezl | |
| 5,344,691 A | 9/1994 | Hanschen et al. | |
| 5,354,597 A | 10/1994 | Capik et al. | |
| 5,376,430 A | 12/1994 | Swenson et al. | |
| 5,422,178 A | 6/1995 | Swenson et al. | |
| 5,424,025 A | 6/1995 | Hanschen et al. | |
| 5,429,856 A | 7/1995 | Krueger et al. | |
| 5,462,708 A | 10/1995 | Swenson et al. | |
| 5,468,428 A | 11/1995 | Hanschen et al. | |
| 5,468,810 A | 11/1995 | Hayakawa et al. | |
| 5,501,679 A | 3/1996 | Krueger et al. | |
| 5,594,080 A | 1/1997 | Waymouth et al. | |
| 5,610,253 A | 3/1997 | Hatke et al. | |
| 5,620,780 A | 4/1997 | Krueger et al. | |
| 5,691,034 A | 11/1997 | Krueger et al. | |
| 5,733,980 A | 3/1998 | Cozewith et al. | |
| 5,798,420 A | 8/1998 | Cozewith et al. | |
| 5,800,903 A | 9/1998 | Wood et al. | |
| 5,969,070 A | 10/1999 | Waymouth et al. | |
| 6,114,457 A | 9/2000 | Markel et al. | |
| 6,147,180 A | 11/2000 | Markel et al. | |
| 6,262,203 B1 | 7/2001 | Chien et al. | |
| 6,566,544 B1 | 5/2003 | Waymouth et al. | |
| 2004/0121922 A1 | 6/2004 | Okada et al. | |
| 2007/0254176 A1* | 11/2007 | Patel et al. .................. | 428/519 |

FOREIGN PATENT DOCUMENTS

| | | |
|---|---|---|
| EP | 0 274 906 A2 | 7/1988 |
| EP | 0 500 590 B1 | 7/1995 |
| EP | 0 958 313 B1 | 9/2002 |
| EP | 1 262 498 A2 | 12/2002 |
| JP | 2002-206007 A | 7/2002 |
| JP | 2004-204058 A | 7/2004 |
| WO | WO 95/27745 A1 | 10/1995 |
| WO | WO 95/27746 A1 | 10/1995 |
| WO | WO 98/34970 A1 | 8/1998 |
| WO | WO 99/35171 A1 | 7/1999 |
| WO | WO 00/37514 A1 | 6/2000 |
| WO | WO 02/066540 A2 | 8/2002 |
| WO | WO 03/014046 A1 | 2/2003 |
| WO | WO 2004/063270 A2 | 7/2004 |
| WO | WO 2005/090425 A1 | 9/2005 |
| WO | WO 2006/101930 A2 | 9/2006 |
| WO | WO 2006/101966 A1 | 9/2006 |
| WO | WO 2006/101968 A2 | 9/2006 |
| WO | WO 2006/102149 A2 | 9/2006 |

OTHER PUBLICATIONS

International Search Report and Written Opinion of the International Searching Authority, mailed May 15, 2007 (PCT/US2006/060209).

* cited by examiner

*Primary Examiner*—Lynda Salvatore

(57) ABSTRACT

The invention is an article comprising at least two layers, a low crystallinity layer and a high crystallinity layer. One or both layers is capable of being elongated so that a prestretched article is capable of being formed.

156 Claims, 7 Drawing Sheets

MULTI-LAYER, ELASTIC ARTICLES

CROSS-REFERENCE TO RELATED APPLICATIONS

This application claims priority to U.S. Provisional Application No. 60/730,705, filed Oct. 26, 2005, U.S. Provisional Application No. 60/754,087, filed Dec. 27, 2005, and U.S. Provisional Application No. 60/824,728, filed Sep. 6, 2006. For purposes of United States patent practice, the contents of the provisional applications are herein incorporated by reference in their entirety.

FIELD OF THE INVENTION

This invention relates to polymer articles such as laminates, films, fabrics and fibers comprising a low crystallinity layer and a high crystallinity layer.

BACKGROUND AND SUMMARY OF THE INVENTION

Known co-extrusion processes involve melting of at least two separate polymer compositions and their simultaneous extrusion and immediate combination. The extrudate can be cooled, e.g., using a chilled roll, until the polymers have solidified and can be mechanically wound onto a roll. The extrudate may be oriented to a controlled degree in the machine and/or transverse direction. This drawing may be performed at temperatures below the melting point of the co-extrudate. In this way, articles can be made combining the desired properties of different polymer compositions.

Co-extruded films are generally made from polymer compositions, which develop considerable mechanical strength upon cooling by the forming of crystalline phases. Such polymer compositions are also capable of developing increased strength upon orientation of the compositions and better alignment of the crystalline regions.

Elasticity in films and laminates is desired for a number of applications. Examples of such applications are in personal care products, such as diaper back sheets, diaper waistbands, and diaper ears; medical applications, such as gowns and bags; and garment applications, such as disposable wear. In use in the final structure, elastic articles can provide desirable characteristics, such as helping to achieve compliance of garments to an underlying shape. In diaper waistbands, for example, a high elastic recovery ensures good conformability throughout the use of the diaper.

Difficulty in processing elastic monolayer films arises from the tackiness of the films on the roll, which causes "blocking", i.e., sticking of the film to itself. This limits the storage of the article after it has been produced. Elastic polymers can also have poor aesthetics, including, for example, poor surface appearance and a rubbery or tacky feel or touch.

Several approaches have been taken to alleviate these problems. U.S. Pat. No. 6,649,548 discloses laminates of nonwoven fabrics with films to impart a better feel. U.S. Pat. Nos. 4,629,643 and 5,814,413 and PCT Publications WO 99/47339 and WO 01/05574 disclose various mechanical and processing techniques used to emboss or texture the film surface in order to increase the surface area and improve the feel. U.S. Pat. Nos. 4,714,735 and 4,820,590 disclose films comprising an elastomer, ethylene vinyl acetate (EVA), and process oil that are prepared by orienting the film at elevated temperature and annealing the film to freeze in the stresses. The film is subsequently heated, which shrinks and forms an elastic film.

In one embodiment, these references also disclose films having layers of ethylene polymers or copolymers on either side of the elastic film to reduce tackiness. By heat-setting the film, it can be stabilized in its extended condition. Upon application of heat higher than the heat setting temperature, the heat set is removed and the film returns to its original length and remains elastic. Two heating steps are involved, adding cost and complexity. U.S. Pat. No. 4,880,682 discloses a multilayer film comprising an elastomer core layer and thermoplastic skin layer(s). The elastomers are ethylene/propylene (EP) rubbers, ethylene/propylene/diene monomer rubbers (EPDM), and butyl rubber, in a laminated structure with EVA as the skin layers. After casting, these films are oriented to yield films having a micro-undulated surface providing a low gloss film.

Micro-textured elastomeric laminated films having at least one adhesive layer are disclosed in U.S. Pat. Nos. 5,354,597 and 5,376,430. U.S. Pat. No. 4,476,180 describes blends of styrenic block copolymer based elastomers with ethylene-vinyl acetate copolymers to reduce the tackiness without excessively degrading the mechanical properties.

WO 2004/063270 describes an article that includes a low crystallinity layer and high crystallinity layer capable of undergoing plastic deformation upon elongation. The crystallinity layer includes a low crystallinity polymer and, optionally, an additional polymer. The high crystallinity layer includes a high crystallinity polymer having a melting point at least 25 C higher that that of the low crystallinity polymer. The low crystallinity polymer and the high crystallinity polymer can have compatible crystallinity.

SUMMARY OF THE INVENTION

In one embodiment the present invention is an article comprising at least two layers, a first or low crystallinity layer often comprising a low crystallinity polymer and a second or high crystallinity layer often comprising a high crystallinity polymer. The high crystallinity polymer may have a melting point as determined by differential scanning calorimetry (DSC) that is about the same, greater than, or less than, or within about 25 C of the melting point of the low crystallinity polymer. The article is capable of being elongated at a temperature below the melting point of the lowest melting component in at least one direction to an elongation of at least about 50%, preferably at least about 100% and more preferably at least about 150%, of its original length or width, to form a pre-stretched, and optionally subsequently relaxed, article. Preferably, the high crystallinity layer is capable of undergoing plastic deformation upon the elongation.

In another embodiment, the invention is a pre-stretched, multi-layer film or laminate comprising:

A. At least one core or non-skin layer comprising (i) opposing first and second planar surfaces, and (ii) a low crystalline, elastic polymer, and B. At least one first and, optionally a second, outer or skin layer(s) each comprising (i) opposing first and second planar surfaces, and (ii) a high crystalline polymer, the second or bottom planar surface of the first outer layer in intimate contact with the first or top planar surface of the core layer and the first or top planar surface of the second outer layer in intimate contact with the bottom or second planar surface of the core layer. The high crystalline polymer of one skin layer can be the same or different than the high crystalline polymer of the other skin layer. Preferably the at least one core layer polymer is an ethylene/α-olefin multi-block interpolymer component that are further defined and discussed in copending PCT Application No. PCT/US2005/008917, filed on Mar. 17, 2005 and published on Sep. 29, 2005 as WO/2005/090427, and the at least one skin layer polymer is typically a polyolefin. Typically, the skin layer polymer of the first and second outer layers is often the same.

Upon preparation, the articles of the present invention may be stretched or activated, typically at an elongation of at least about 50%, preferably at least about 100% and more preferably at least about 150%, more preferably at least 300%, more preferably at least 400% of its original measurement (e.g. length or width) to an approximate maximum of 500% to 1500%. The stretched article is optionally subsequently relaxed to a very low tension to allow substantial elastic recovery before winding up on a roll.

In another embodiment, the invention is a process for making a pre-stretched, multi-layer film comprising at least two layers, a first or low crystallinity layer comprising a low crystallinity polymer and a second or high crystallinity layer comprising a high crystallinity polymer. The process comprises the steps of: (1) forming the film, and (2) elongating the film in at least one direction to at least about 150%, preferably at least about 200%, of its original length or width. Preferably, the film is elongated at a temperature below the melting point of the high crystallinity polymer, more preferably at a temperature below the melting point of the low crystallinity polymer. The elongation step produces a film with a haze value of greater than 0%, typically of at least 10%, more typically of at least 25%, and even more typically of at least 50%.

In another embodiment, the invention is the article described in the first and second embodiments in the form of a fiber, preferably a bicomponent fiber. Preferably, the high crystallinity polymer comprises at least a portion of the surface of the fiber, especially in fibers with a configuration of sheath/core, side-by-side, crescent moon, tri-lobal, islands-in-the-sea, or flat, although there are some applications where the low crystallinity polymer can comprise at least a portion of the surface of the fiber, e.g., binder fiber applications. Fibers in which the high crystallinity polymer has been plastically deformed are particularly preferred.

Other embodiments of the invention include the article described in the previous embodiments in the form of a woven, nonwoven or woven/nonwoven blended fabric, films comprising four or more layers, garments and other structures made from the articles, e.g., diaper back-sheets and elastic tabs, hospital wear, etc., cross-linked articles, articles containing fillers and the like. Another preferred embodiment is an article described in the previous embodiments comprising a laminate comprising nonwoven/film/nonwoven laminates, nonwoven/nonwoven/nonwoven laminates, laminates comprising at least two nonwovens, and woven/nonwoven laminates.

In many embodiments of this invention, preferably the weight percent crystallinity difference between the high and low crystallinity layers is at least about 3%, preferably at least about 5% and more preferably at least about 10% and not in excess of about 90%.

In many embodiments, the article may comprise at least one ethylene/α-olefin interpolymer in the low crystallinity layer, the high crystallinity layer, either, or both, wherein the ethylene/α-olefin interpolymer is described in and discussed in copending PCT Application No. PCT/US2005/008917, filed on Mar. 17, 2005 and published on Sep. 29, 2005 as WO/2005/090427 which is incorporated herein by reference. The ethylene/α-olefin interpolymer is characterized by one or more of the following:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$T_m \geq 858.91 - 1825.3(d) + 1112.8(d)^2;\text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48°\text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d);\text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), wherein the ratio of G'(25° C.) to G'(100° C.) is in the range of about 1:1 to about 9:1 wherein the ethylene/α-olefin interpolymer has a density of from about 0.85 to about 0.89 g/cc and a melt index ($I_2$) of from about 0.5 g/10 min. to about 20 g/10 min.

DETAILED DESCRIPTION OF THE INVENTION

Figure 1:
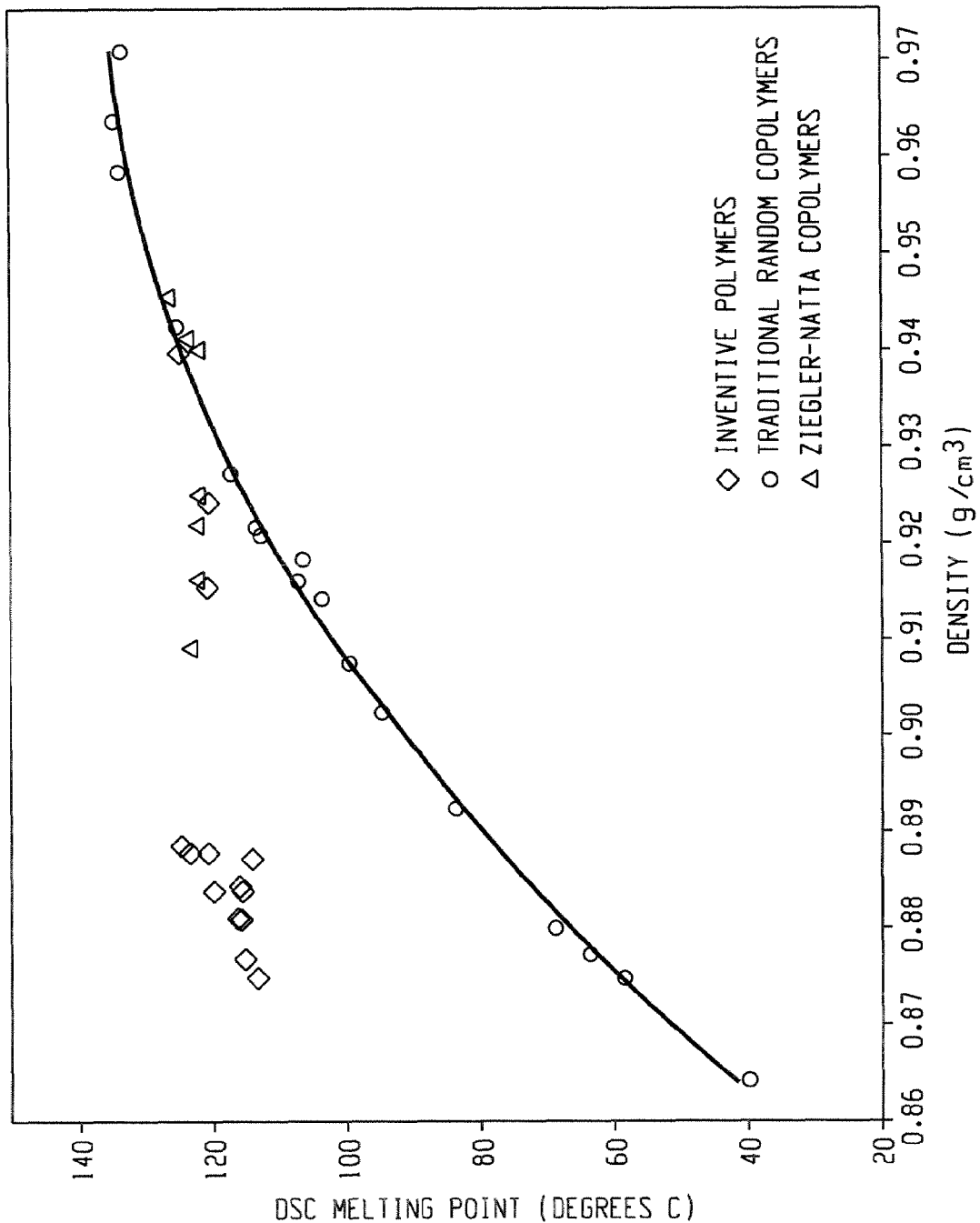
FIG. 1 shows the melting point/density relationship for the inventive polymers (represented by diamonds) as compared to traditional random copolymers (represented by circles) and Ziegler-Natta copolymers (represented by triangles).

"Low crystallinity", "high crystallinity" and like terms are used in a relative sense, not in an absolute sense. However, low crystallinity layers have crystallinity of from about 1 to about 25, preferably from about 1 to about 20, and more preferably from about 1 to about 15 weight percent crystallinity.

Typical high crystalline polymers often include linear low density polyethylene (LLDPE), low density polyethylene (LDPE), LLDPE/LDPE blends, high density polyethylene (HDPE), homopolypropylene (hPP), substantially linear ethylene polymer (SLEP), random propylene based copolymer, polypropylene (PP) plastomers and elastomers, random copolymer (RCP), and the like, and various blends thereof. Low crystallinity polymers of particular interest preferably include ethylene/α-olefin multi-block interpolymers defined and discussed in copending PCT Application No. PCT/US2005/008917, filed on Mar. 17, 2005 and published on Sep. 29, 2005 as WO/2005/090427, which in turn claims priority to U.S. Provisional Application No. 60/553,906, filed Mar. 17, 2004, both which are incorporated by reference. Low crystalline polymers also include propylene/ethylene, propylene/1-butene, propylene/1-hexene, propylene/4-methyl-1-pentene, propylene/1-octene, propylene/ethylene/1-butene, propylene/ethylene/ENB, propylene/ethylene/1-hexene, propylene/ethylene/1-octene, propylene/styrene, and propylene/ethylene/styrene. Representative of these copolymers are the VERSIFY® elastic propylene copolymers manufactured and marketed by The Dow Chemical Company and VISTAMAXX propylene copolymers made by Exxon-Mobil.

The term "polymer" generally includes, but is not limited to, homopolymers, copolymers, such as, for example, block, graft, random and alternating copolymers, terpolymers, etc., and blends and modifications of the same. Furthermore, unless otherwise specifically limited, the term "polymer" shall include all possible geometrical configurations of the material. These configurations include, but are not limited to, isotactic, syndiotactic and random symmetries.

All percentages specified herein are weight percentages unless otherwise specified.

"Interpolymer" means a polymer prepared by the polymerization of at least two different types of monomers. The generic term "interpolymer" includes the term "copolymer" (which is usually employed to refer to a polymer prepared from two different monomers) as well as the term "terpolymer" (which is usually employed to refer to a polymer prepared from three different types of monomers). It also encompasses polymers made by polymerizing four or more types of monomers.

The term "ethylene/α-olefin interpolymer" generally refers to polymers comprising ethylene and an α-olefin having 3 or more carbon atoms. Preferably, ethylene comprises the majority mole fraction of the whole polymer, i.e., ethylene comprises at least about 50 mole percent of the whole polymer. More preferably ethylene comprises at least about 60 mole percent, at least about 70 mole percent, or at least about 80 mole percent, with the substantial remainder of the whole polymer comprising at least one other comonomer that is preferably an α-olefin having 3 or more carbon atoms. For many ethylene/octene copolymers, the preferred composition comprises an ethylene content greater than about 80 mole percent of the whole polymer and an octene content of from about 10 to about 15, preferably from about 15 to about 20 mole percent of the whole polymer. In some embodiments, the ethylene/α-olefin interpolymers do not include those produced in low yields or in a minor amount or as a by-product of a chemical process. While the ethylene/α-olefin interpolymers can be blended with one or more polymers, the as-produced ethylene/α-olefin interpolymers are substantially pure and often comprise a major component of the reaction product of a polymerization process.

The ethylene/α-olefin interpolymers comprise ethylene and one or more copolymerizable α-olefin comonomers in polymerized form, characterized by multiple blocks or segments of two or more polymerized monomer units differing in chemical or physical properties. That is, the ethylene/α-olefin interpolymers are block interpolymers, preferably multi-block interpolymers or copolymers. The terms "interpolymer" and copolymer" are used interchangeably herein. In some embodiments, the multi-block copolymer can be represented by the following formula:

where n is at least 1, preferably an integer greater than 1, such as 2, 3, 4, 5, 10, 15, 20, 30, 40, 50, 60, 70, 80, 90, 100, or higher, "A" represents a hard block or segment and "B" represents a soft block or segment. Preferably, As and Bs are linked in a substantially linear fashion, as opposed to a substantially branched or substantially star-shaped fashion. In other embodiments, A blocks and B blocks are randomly distributed along the polymer chain. In other words, the block copolymers usually do not have a structure as follows.

AAA-AA-BBB-BB

In still other embodiments, the block copolymers do not usually have a third type of block, which comprises different comonomer(s). In yet other embodiments, each of block A and block B has monomers or comonomers substantially randomly distributed within the block. In other words, neither block A nor block B comprises two or more sub-segments (or sub-blocks) of distinct composition, such as a tip segment, which has a substantially different composition than the rest of the block.

The multi-block polymers typically comprise various amounts of "hard" and "soft" segments. "Hard" segments refer to blocks of polymerized units in which ethylene is present in an amount greater than about 95 weight percent, and preferably greater than about 98 weight percent based on the weight of the polymer. In other words, the comonomer content (content of monomers other than ethylene) in the hard segments is less than about 5 weight percent, and preferably less than about 2 weight percent based on the weight of the polymer. In some embodiments, the hard segments comprises all or substantially all ethylene. "Soft" segments, on the other hand, refer to blocks of polymerized units in which the comonomer content (content of monomers other than ethylene) is greater than about 5 weight percent, preferably greater than about 8 weight percent, greater than about 10 weight percent, or greater than about 15 weight percent based on the weight of the polymer. In some embodiments, the comonomer content in the soft segments can be greater than about 20 weight percent, greater than about 25 weight percent, greater than about 30 weight percent, greater than about 35 weight percent, greater than about 40 weight percent, greater than about 45 weight percent, greater than about 50 weight percent, or greater than about 60 weight percent.

The soft segments can often be present in a block interpolymer from about 1 weight percent to about 99 weight percent of the total weight of the block interpolymer, preferably from about 5 weight percent to about 95 weight percent, from about 10 weight percent to about 90 weight percent, from about 15 weight percent to about 85 weight percent, from about 20 weight percent to about 80 weight percent, from about 25 weight percent to about 75 weight percent, from about 30 weight percent to about 70 weight percent, from about 35 weight percent to about 65 weight percent, from about 40 weight percent to about 60 weight percent, or from about 45 weight percent to about 55 weight percent of the total weight of the block interpolymer. Conversely, the hard segments can be present in similar ranges. The soft segment weight percentage and the hard segment weight percentage can be calculated based on data obtained from DSC or NMR. Such methods and calculations are disclosed in a concurrently filed U.S. patent application Ser. No. 11/376,835, entitled "Ethylene/α-Olefin Block Interpolymers", filed on Mar. 15, 2006, in the name of Colin L. P. Shan, Lonnie Hazlitt, et. al. and assigned to Dow Global Technologies Inc., the disclosure of which is incorporated by reference herein in its entirety.

Ethylene/α-Olefin Interpolymers

The ethylene/α-olefin interpolymers used in embodiments of the invention (also referred to as "inventive interpolymer" or "inventive polymer") comprise ethylene and one or more copolymerizable α-olefin comonomers in polymerized form, characterized by multiple blocks or segments of two or more polymerized monomer units differing in chemical or physical properties (block interpolymer), preferably a multi-block copolymer. The ethylene/α-olefin interpolymers are characterized by one or more of the aspects described as follows.

In one aspect, the ethylene/α-olefin interpolymers used in embodiments of the invention have a $M_w/M_n$ from about 1.7 to about 3.5 and at least one melting point, $T_m$, in degrees Celsius and density, d, in grams/cubic centimeter, wherein the numerical values of the variables correspond to the relationship:

$$T_m > -2002.9 + 4538.5(d) - 2422.2(d)^2, \text{ and preferably}$$

$$T_m \geq -6288.1 + 13141(d) - 6720.3(d)^2, \text{ and more preferably}$$

$$T_m \geq 858.91 - 1825.3(d) + 1112.8(d)^2.$$

Such melting point/density relationship is illustrated in FIG. 1. Unlike the traditional random copolymers of ethylene/α-olefins whose melting points decrease with decreasing densities, the inventive interpolymers (represented by diamonds) exhibit melting points substantially independent of the density, particularly when density is between about 0.87 g/cc to about 0.95 g/cc. For example, the melting point of such polymers are in the range of about 110° C. to about 130° C. when density ranges from 0.875 g/cc to about 0.945 g/cc. In some embodiments, the melting point of such polymers are in the range of about 115° C. to about 125° C. when density ranges from 0.875 g/cc to about 0.945 g/cc.

Figure 2:
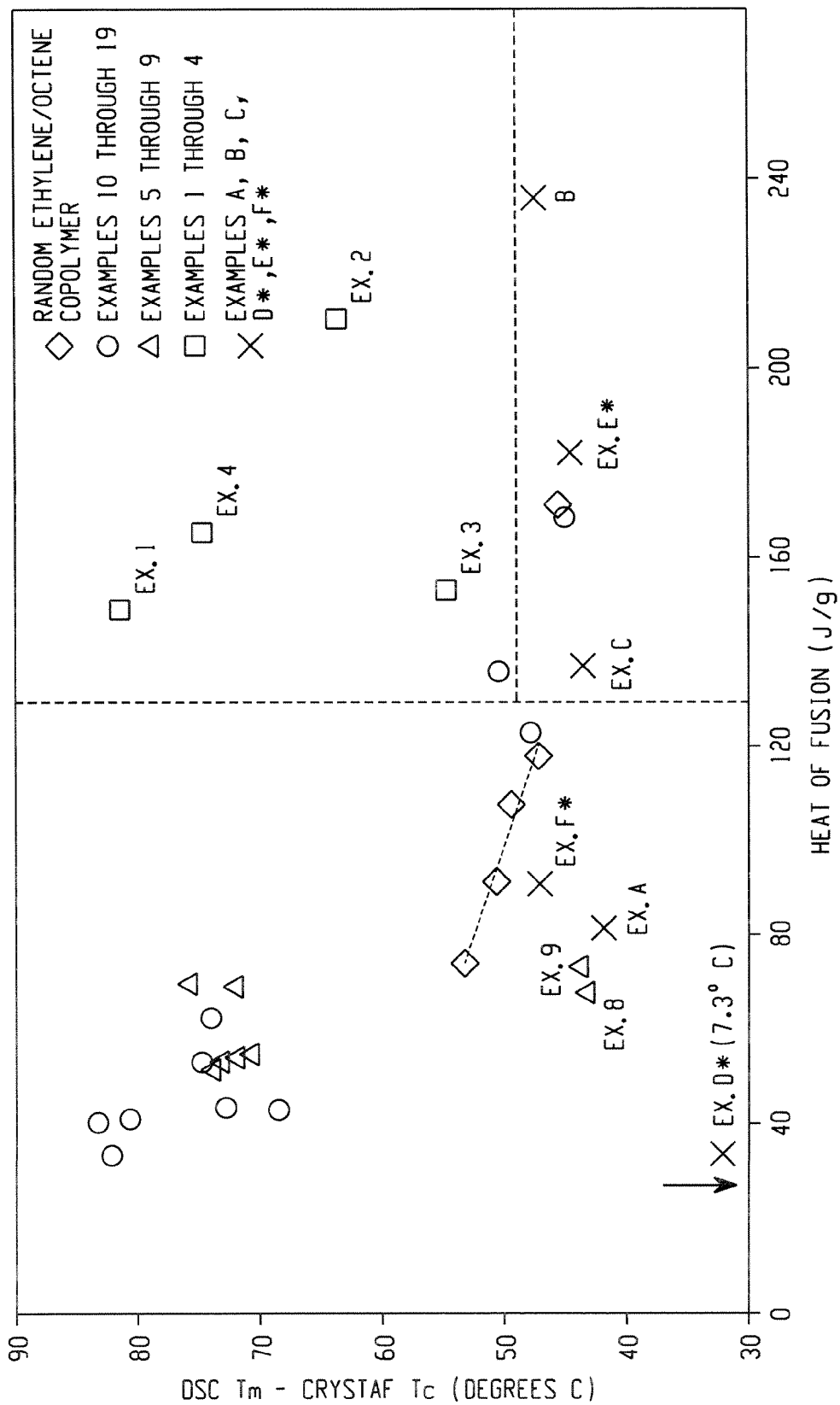
FIG. 2 shows plots of delta DSC-CRYSTAF as a function of DSC Melt Enthalpy for various polymers. The diamonds represent random ethylene/octene copolymers; the squares represent polymer examples 1-4; the triangles represent polymer examples 5-9; and the circles represent polymer examples 10-19. The "X" symbols represent polymer examples A*-F*.

In another aspect, the ethylene/α-olefin interpolymers comprise, in polymerized form, ethylene and one or more α-olefins and are characterized by a ΔT, in degree Celsius, defined as the temperature for the tallest Differential Scanning Calorimetry ("DSC") peak minus the temperature for the tallest Crystallization Analysis Fractionation ("CRYSTAF") peak and a heat of fusion in J/g, ΔH, and ΔT and ΔH satisfy the following relationships:

$$\Delta T > -0.1299(\Delta H) + 62.81, \text{ and preferably}$$

$$\Delta T \geq -0.1299(\Delta H) + 64.38, \text{ and more preferably}$$

$$\Delta T \geq -0.1299(\Delta H) + 65.95,$$

for ΔH up to 130 J/g. Moreover, ΔT is equal to or greater than 48° C. for ΔH greater than 130 J/g. The CRYSTAF peak is determined using at least 5 percent of the cumulative polymer (that is, the peak must represent at least 5 percent of the cumulative polymer), and if less than 5 percent of the polymer has an identifiable CRYSTAF peak, then the CRYSTAF temperature is 30° C., and ΔH is the numerical value of the heat of fusion in J/g. More preferably, the highest CRYSTAF peak contains at least 10 percent of the cumulative polymer. FIG. 2 shows plotted data for inventive polymers as well as comparative examples. Integrated peak areas and peak temperatures are calculated by the computerized drawing program supplied by the instrument maker. The diagonal line shown for the random ethylene octene comparative polymers corresponds to the equation ΔT=-0.1299 (ΔH)+62.81.

In yet another aspect, the ethylene/α-olefin interpolymers have a molecular fraction which elutes between 40° C. and 130° C. when fractionated using Temperature Rising Elution Fractionation ("TREF"), characterized in that said fraction has a molar comonomer content higher, preferably at least 5 percent higher, more preferably at least 10 percent higher, than that of a comparable random ethylene interpolymer fraction eluting between the same temperatures, wherein the comparable random ethylene interpolymer contains the same comonomer(s), and has a melt index, density, and molar comonomer content (based on the whole polymer) within 10 percent of that of the block interpolymer. Preferably, the Mw/Mn of the comparable interpolymer is also within 10 percent of that of the block interpolymer and/or the comparable inter polymer has a total comonomer content within 10 weight percent of that of the block interpolymer.

In still another aspect, the ethylene/α-olefin interpolymers are characterized by an elastic recovery, Re, in percent at 300 percent strain and 1 cycle measured on a compression-molded film of an ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ and preferably}$$

$$Re \geq 1491 - 1629(d); \text{ and more preferably}$$

$$Re \geq 1501 - 1629(d); \text{ and even more preferably}$$

$$Re \geq 1511 - 1629(d).$$

Figure 3:
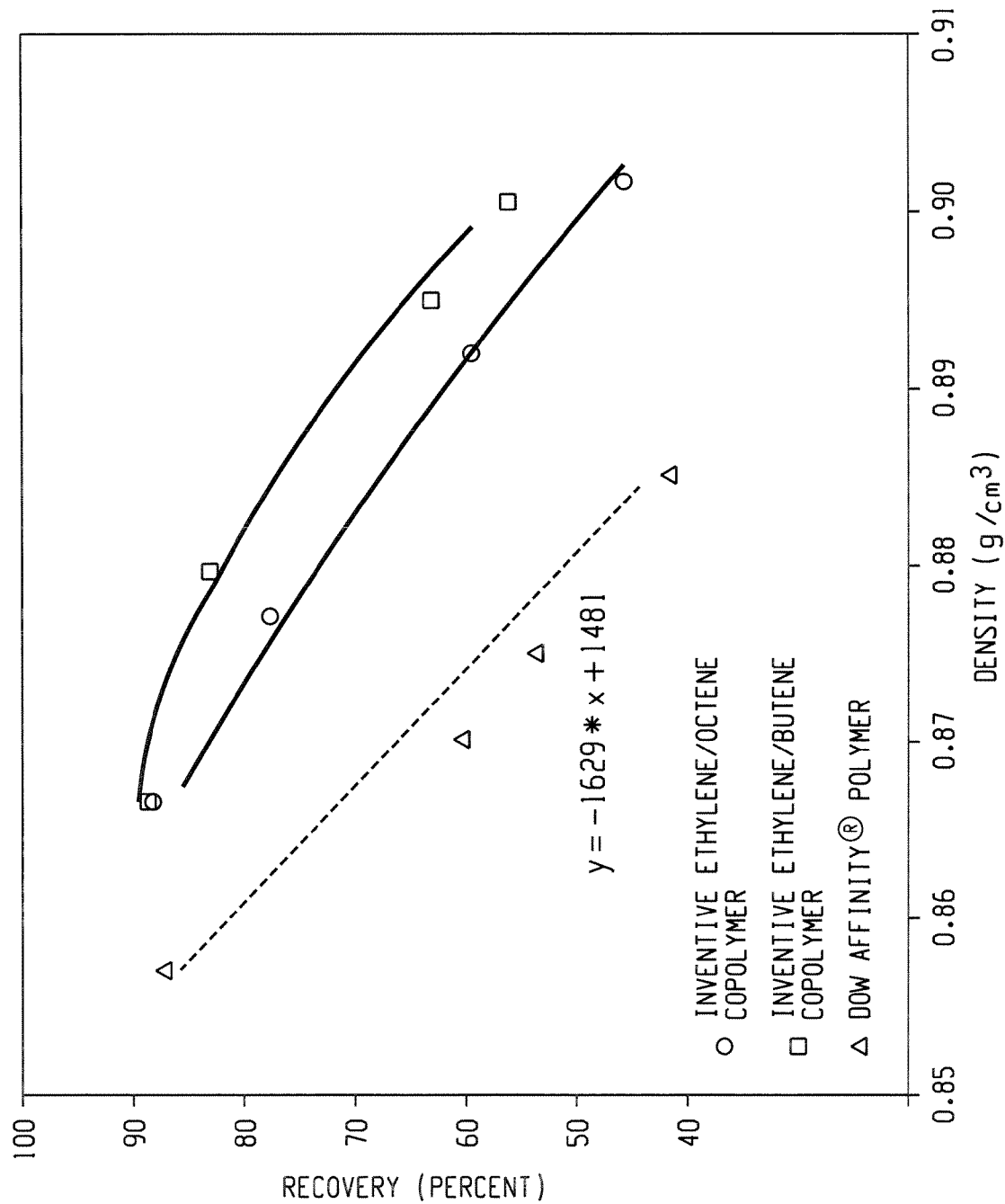
FIG. 3 shows the effect of density on elastic recovery for unoriented films made from inventive interpolymers (represented by the squares and circles) and traditional copolymers (represented by the triangles which are various Dow AFFINITY® polymers). The squares represent inventive ethylene/butene copolymers; and the circles represent inventive ethylene/octene copolymers.

FIG. 3 shows the effect of density on elastic recovery for unoriented films made from certain inventive interpolymers and traditional random copolymers. For the same density, the inventive interpolymers have substantially higher elastic recoveries.

In some embodiments, the ethylene/α-olefin interpolymers have a tensile strength above 10 MPa, preferably a tensile strength≧11 MPa, more preferably a tensile strength≧13 MPa and/or an elongation at break of at least 600 percent, more preferably at least 700 percent, highly preferably at least 800 percent, and most highly preferably at least 900 percent at a crosshead separation rate of 11 cm/minute.

In other embodiments, the ethylene/α-olefin interpolymers have (1) a storage modulus ratio, G'(25° C.)/G'(100° C.), of from 1 to 50, preferably from 1 to 20, more prefereably from 1 to 10; and/or (2) a 70° C. compression set of less than 80 percent, preferably less than 70 percent, especially less than 60 percent, less than 50 percent, or less than 40 percent, down to a compression set of 0 percent.

In still other embodiments, the ethylene/α-olefin interpolymers have a 70° C. compression set of less than 80 percent, less than 70 percent, less than 60 percent, or less than 50 percent. Preferably, the 70° C. compression set of the interpolymers is less than 40 percent, less than 30 percent, less than 20 percent, and may go down to about 0 percent.

In some embodiments, the ethylene/α-olefin interpolymers have a heat of fusion of less than 85 J/g and/or a pellet blocking strength of equal to or less than 100 pounds/foot$^2$ (4800 Pa), preferably equal to or less than 50 lbs/ft$^2$ (2400 Pa), especially equal to or less than 5 lbs/ft$^2$ (240 Pa), and as low as 0 lbs/ft$^2$ (0 Pa).

In other embodiments, the ethylene/α-olefin interpolymers comprise, in polymerized form, at least 50 mole percent ethylene and have a 70° C. compression set of less than 80 percent, preferably less than 70 percent or less than 60 percent, most preferably less than 40 to 50 percent and down to close zero percent.

In some embodiments, the multi-block copolymers possess a PDI fitting a Schultz-Flory distribution rather than a Poisson distribution. The copolymers are further characterized as having both a polydisperse block distribution and a polydisperse distribution of block sizes and possessing a most probable distribution of block lengths. Preferred multi-block copolymers are those containing 4 or more blocks or segments including terminal blocks. More preferably, the copolymers include at least 5, 10 or 20 blocks or segments including terminal blocks.

Comonomer content may be measured using any suitable technique, with techniques based on nuclear magnetic resonance ("NMR") spectroscopy preferred. Moreover, for polymers or blends of polymers having relatively broad TREF curves, the polymer desirably is first fractionated using TREF into fractions each having an eluted temperature range of 10° C. or less. That is, each eluted fraction has a collection temperature window of 10° C. or less. Using this technique, said block interpolymers have at least one such fraction having a higher molar comonomer content than a corresponding fraction of the comparable interpolymer.

In another aspect, the inventive polymer is an olefin interpolymer, preferably comprising ethylene and one or more copolymerizable comonomers in polymerized form, characterized by multiple blocks (i.e., at least two blocks) or segments of two or more polymerized monomer units differing in chemical or physical properties (blocked interpolymer), most preferably a multi-block copolymer, said block interpolymer having a peak (but not just a molecular fraction) which elutes between 40° C. and 130° C. (but without collecting and/or isolating individual fractions), characterized in that said peak, has a comonomer content estimated by infra-red spectroscopy when expanded using a full width/half maximum (FWHM) area calculation, has an average molar comonomer content higher, preferably at least 5 percent higher, more preferably at least 10 percent higher, than that of a comparable random ethylene interpolymer peak at the same elution temperature and expanded using a full width/half maximum (FWHM) area calculation, wherein said comparable random ethylene interpolymer has the same comonomer(s) and has a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer. The full width/half maximum (FWHM) calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between $T_1$ and $T_2$, where $T_1$ and $T_2$ are points determined, to the left and right of the ATREF peak, by dividing the peak height by two, and then drawing a line horizontal to the base line, that intersects the left and right portions of the ATREF curve. A calibration curve for comonomer content is made using random ethylene/α-olefin copolymers, plotting comonomer content from NMR versus FWHM area ratio of the TREF peak. For this infra-red method, the calibration curve is generated for the same comonomer type of interest. The comonomer content of TREF peak of the inventive polymer can be determined by referencing this calibration curve using its FWHM methyl: methylene area ratio [$CH_3/CH_2$] of the TREF peak.

Comonomer content may be measured using any suitable technique, with techniques based on nuclear magnetic resonance (NMR) spectroscopy preferred. Using this technique, said blocked interpolymers has higher molar comonomer content than a corresponding comparable interpolymer.

Preferably, for interpolymers of ethylene and 1-octene, the block interpolymer has a comonomer content of the TREF fraction eluting between 40 and 130° C. greater than or equal to the quantity (−0.2013)T+20.07, more preferably greater than or equal to the quantity (−0.2013)T+21.07, where T is the numerical value of the peak elution temperature of the TREF fraction being compared, measured in ° C.

Figure 4:
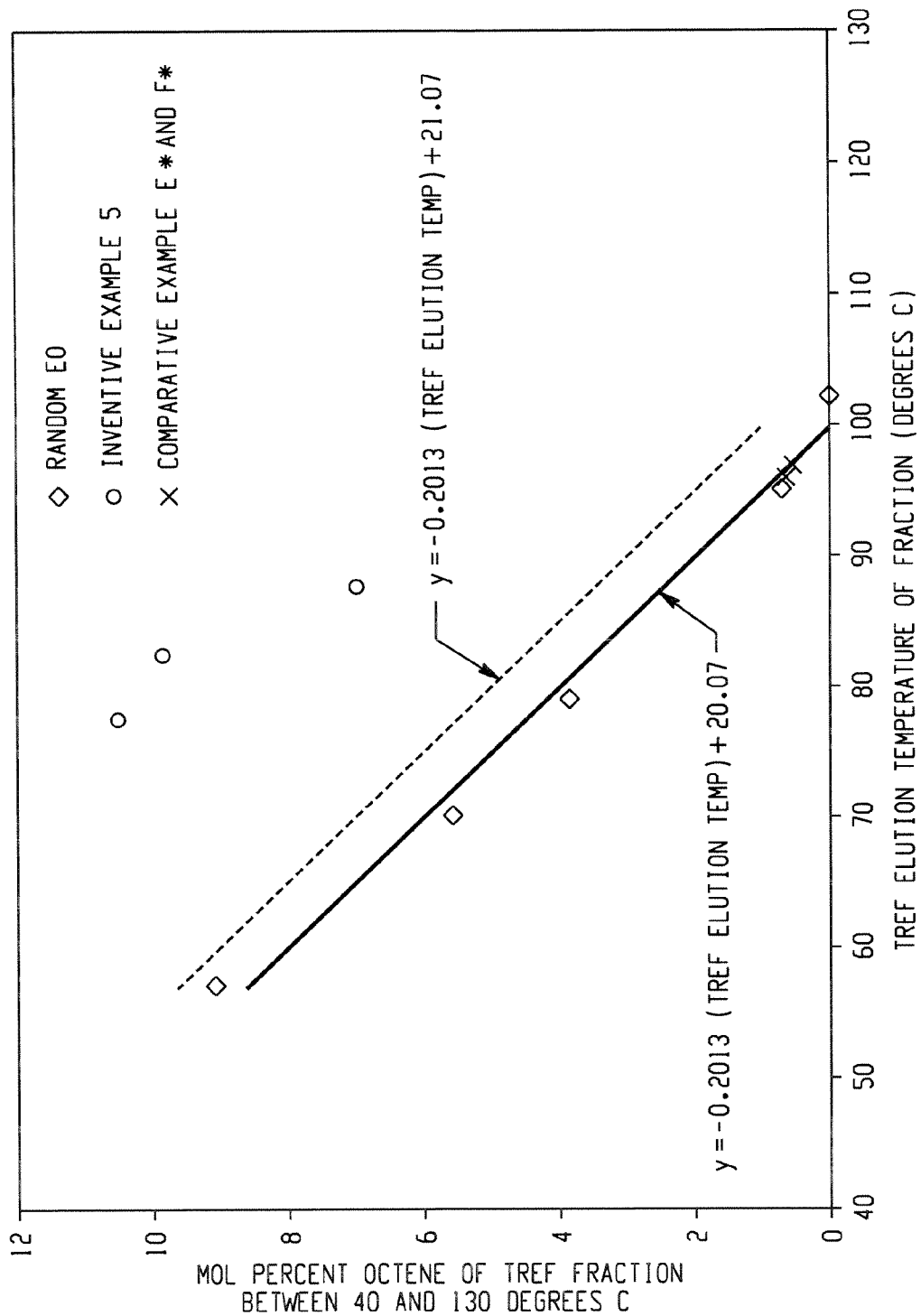
FIG. 4 is a plot of octene content of TREF fractionated ethylene/1-octene copolymer fractions versus TREF elution temperature of the fraction for the polymer of Example 5 (represented by the circles) and comparative polymers E and F (represented by the "X" symbols). The diamonds represent traditional random ethylene/octene copolymers.

FIG. 4 graphically depicts an embodiment of the block interpolymers of ethylene and 1-octene where a plot of the comonomer content versus TREF elution temperature for several comparable ethylene/1-octene interpolymers (random copolymers) are fit to a line representing (−0.2013)T+ 20.07 (solid line). The line for the equation (−0.2013)T+ 21.07 is depicted by a dotted line. Also depicted are the comonomer contents for fractions of several block ethylene/ 1-octene interpolymers of the invention (multi-block copolymers). All of the block interpolymer fractions have significantly higher 1-octene content than either line at equivalent elution temperatures. This result is characteristic of the inventive interpolymer and is believed to be due to the presence of differentiated blocks within the polymer chains, having both crystalline and amorphous nature.

Figure 5:
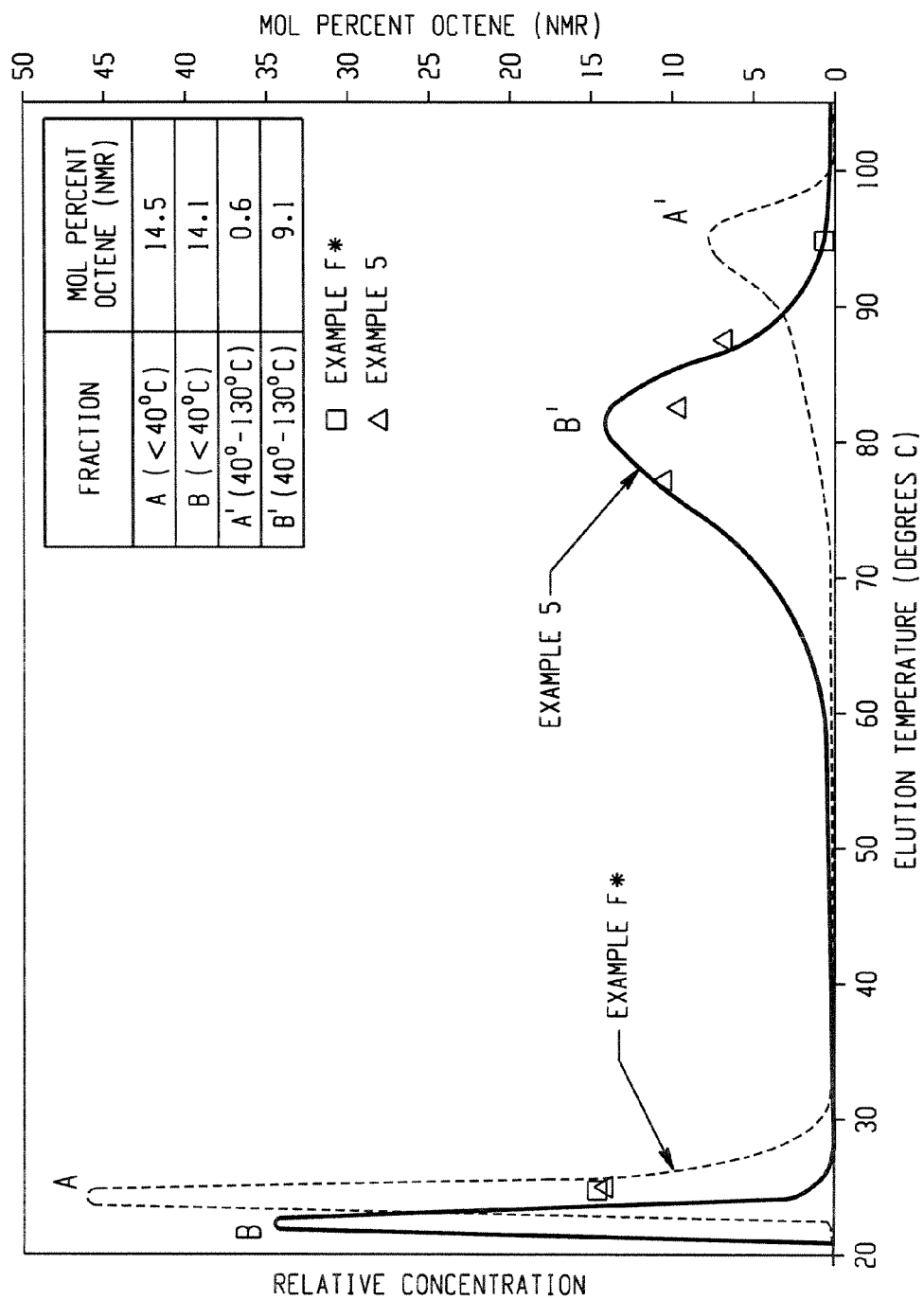
FIG. 5 is a plot of octene content of TREF fractionated ethylene/1-octene copolymer fractions versus TREF elution temperature of the fraction for the polymer of Example 5 (curve 1) and for comparative F (curve 2). The squares represent Example F*; and the triangles represent Example 5.

FIG. 5 graphically displays the TREF curve and comonomer contents of polymer fractions for Example 5 and comparative F to be discussed below. The peak eluting from 40 to 130° C., preferably from 60° C. to 95° C. for both polymers is fractionated into three parts, each part eluting over a temperature range of less than 10° C. Actual data for Example 5 is represented by triangles. The skilled artisan can appreciate that an appropriate calibration curve may be constructed for interpolymers containing different comonomers and a line used as a comparison fitted to the TREF values obtained from comparative interpolymers of the same monomers, preferably random copolymers made using a metallocene or other homogeneous catalyst composition. Inventive interpolymers are characterized by a molar comonomer content greater than the value determined from the calibration curve at the same TREF elution temperature, preferably at least 5 percent greater, more preferably at least 10 percent greater.

In addition to the above aspects and properties described herein, the inventive polymers can be characterized by one or more additional characteristics. In one aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that said fraction has a molar comonomer content higher, preferably at least 5 percent higher, more preferably at least 10, 15, 20 or 25 percent higher, than that of a comparable random ethylene interpolymer fraction eluting between the same temperatures, wherein said comparable random ethylene interpolymer comprises the same comonomer(s), preferably it is the same comonomer(s), and a melt index, density, and molar comonomer content (based on the whole polymer) within 10 percent of that of the blocked interpolymer. Preferably, the Mw/Mn of the comparable interpolymer is also within 10 percent of that of the blocked interpolymer and/or the comparable interpolymer has a total comonomer content within 10 weight percent of that of the blocked interpolymer.

Preferably, the above interpolymers are interpolymers of ethylene and at least one α-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity $(-0.1356)T+13.89$, more preferably greater than or equal to the quantity $(-0.1356)T+14.93$, and most preferably greater than or equal to the quantity $(-0.2013)T+21.07$, where T is the numerical value of the peak ATREF elution temperature of the TREF fraction being compared, measured in ° C.

Preferably, for the above interpolymers of ethylene and at least one alpha-olefin especially those interpolymers having a whole polymer density from about 0.855 to about 0.935 g/cm$^3$, and more especially for polymers having more than about 1 mole percent comonomer, the blocked interpolymer has a comonomer content of the TREF fraction eluting between 40 and 130° C. greater than or equal to the quantity $(-0.2013)T+20.07$, more preferably greater than or equal to the quantity $(-0.2013)T+21.07$, where T is the numerical value of the peak elution temperature of the TREF fraction being compared, measured in ° C.

In still another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction having a comonomer content of at least about 6 mole percent, has a melting point greater than about 100° C. For those fractions having a comonomer content from about 3 mole percent to about 6 mole percent, every fraction has a DSC melting point of about 110° C. or higher. More preferably, said polymer fractions, having at least 1 mol percent comonomer, has a DSC melting point that corresponds to the equation:

$$Tm \geq (-5.5926)(\text{mol percent comonomer in the fraction})+135.90.$$

In yet another aspect, the inventive polymer is an olefin interpolymer, preferably comprising ethylene and one or more copolymerizable comonomers in polymerized form, characterized by multiple blocks or segments of two or more polymerized monomer units differing in chemical or physical properties (blocked interpolymer), most preferably a multi-block copolymer, said block interpolymer having a molecular fraction which elutes between 40° C. and 130° C., when fractionated using TREF increments, characterized in that every fraction that has an ATREF elution temperature greater than or equal to about 76° C., has a melt enthalpy (heat of fusion) as measured by DSC, corresponding to the equation:

$$\text{Heat of fusion (J/gm)} \leq (3.1718)(ATREF \text{ elution temperature in Celsius})-136.58,$$

The inventive block interpolymers have a molecular fraction which elutes between 40° C. and 130° C., when fractionated using TREF increments, characterized in that every fraction that has an ATREF elution temperature between 40° C. and less than about 76° C., has a melt enthalpy (heat of fusion) as measured by DSC, corresponding to the equation:

$$\text{Heat of fusion (J/gm)} \leq (1.1312)(ATREF \text{ elution temperature in Celsius})+22.97.$$

ATREF Peak Comonomer Composition Measurement by Infra-Red Detector

The comonomer composition of the TREF peak can be measured using an IR4 infra-red detector available from Polymer Char, Valencia, Spain (http://www.polymerchar.com/).

The "composition mode" of the detector is equipped with a measurement sensor ($CH_2$) and composition sensor ($CH_3$) that are fixed narrow band infra-red filters in the region of 2800-3000 cm$^{-1}$. The measurement sensor detects the methylene ($CH_2$) carbons on the polymer (which directly relates to the polymer concentration in solution) while the composition sensor detects the methyl ($CH_3$) groups of the polymer. The mathematical ratio of the composition signal ($CH_3$) divided by the measurement signal ($CH_2$) is sensitive to the comonomer content of the measured polymer in solution and its response is calibrated with known ethylene alpha-olefin copolymer standards.

The detector when used with an ATREF instrument provides both a concentration ($CH_2$) and composition ($CH_3$) signal response of the eluted polymer during the TREF process. A polymer specific calibration can be created by measuring the area ratio of the $CH_3$ to $CH_2$ for polymers with known comonomer content (preferably measured by NMR). The comonomer content of an ATREF peak of a polymer can be estimated by applying a reference calibration of the ratio of the areas for the individual $CH_3$ and $CH_2$ response (i.e. area ratio $CH_3/CH_2$ versus comonomer content).

The area of the peaks can be calculated using a full width/half maximum (FWHM) calculation after applying the appropriate baselines to integrate the individual signal responses from the TREF chromatogram. The full width/half maximum calculation is based on the ratio of methyl to methylene response area [$CH_3/CH_2$] from the ATREF infra-red detector, wherein the tallest (highest) peak is identified from the base line, and then the FWHM area is determined. For a distribution measured using an ATREF peak, the FWHM area is defined as the area under the curve between T1 and T2, where T1 and T2 are points determined, to the left and right of the ATREF peak, by dividing the peak height by two, and then drawing a line horizontal to the base line, that intersects the left and right portions of the ATREF curve.

The application of infra-red spectroscopy to measure the comonomer content of polymers in this ATREF-infra-red method is, in principle, similar to that of GPC/FTIR systems as described in the following references: Markovich, Ronald P.; Hazlitt, Lonnie G.; Smith, Linley; "Development of gel-permeation chromatography-Fourier transform infrared spectroscopy for characterization of ethylene-based polyolefin copolymers". Polymeric Materials Science and Engineering (1991), 65, 98-100.; and Deslauriers, P. J.; Rohlfing, D. C.; Shieh, E. T.; "Quantifying short chain branching microstructures in ethylene-1-olefin copolymers using size exclusion chromatography and Fourier transform infrared spectroscopy (SEC-FTIR)", Polymer (2002), 43, 59-170., both of which are incorporated by reference herein in their entirety.

In other embodiments, the inventive ethylene/α-olefin interpolymer is characterized by an average block index, ABI, which is greater than zero and up to about 1.0 and a molecular weight distribution, $M_w/M_n$, greater than about 1.3. The average block index, ABI, is the weight average of the block index ("BI") for each of the polymer fractions obtained in preparative TREF from 20° C. and 110° C., with an increment of 5° C.:

$$ABI = \Sigma(w_i BI_i)$$

where $BI_i$ is the block index for the ith fraction of the inventive ethylene/α-olefin interpolymer obtained in preparative TREF, and $w_i$ is the weight percentage of the ith fraction.

For each polymer fraction, BI is defined by one of the two following equations (both of which give the same BI value):

$$BI = \frac{1/T_X - 1/T_{XO}}{1/T_A - 1/T_{AB}} \text{ or } BI = -\frac{LnP_X - LnP_{XO}}{LnP_A - LnP_{AB}}$$

where $T_X$ is the preparative ATREF elution temperature for the ith fraction (preferably expressed in Kelvin), $P_X$ is the ethylene mole fraction for the ith fraction, which can be measured by NMR or IR as described above. $P_{AB}$ is the ethylene mole fraction of the whole ethylene/α-olefin interpolymer (before fractionation), which also can be measured by NMR or IR. $T_A$ and $P_A$ are the ATREF elution temperature and the ethylene mole fraction for pure "hard segments" (which refer to the crystalline segments of the interpolymer). As a first order approximation, the $T_A$ and $P_A$ values are set to those for high density polyethylene homopolymer, if the actual values for the "hard segments" are not available. For calculations performed herein, $T_A$ is 372° K, $P_A$ is 1.

$T_{AB}$ is the ATREF temperature for a random copolymer of the same composition and having an ethylene mole fraction of $P_{AB}$. $T_{AB}$ can be calculated from the following equation:

$$Ln P_{AB} = \alpha/T_{AB} + \beta$$

where α and β are two constants which can be determined by calibration using a number of known random ethylene copolymers. It should be noted that α and β may vary from instrument to instrument. Moreover, one would need to create their own calibration curve with the polymer composition of interest and also in a similar molecular weight range as the fractions. There is a slight molecular weight effect. If the calibration curve is obtained from similar molecular weight ranges, such effect would be essentially negligible. In some embodiments, random ethylene copolymers satisfy the following relationship:

$$Ln P = -237.83/T_{ATREF} + 0.639$$

$T_{XO}$ is the ATREF temperature for a random copolymer of the same composition and having an ethylene mole fraction of $P_X$. $T_{XO}$ can be calculated from $LnP_X = \alpha/T_{XO} + \beta$. Conversely, $P_{XO}$ is the ethylene mole fraction for a random copolymer of the same composition and having an ATREF temperature of $T_X$, which can be calculated from $Ln P_{XO} = \alpha/T_X + \beta$.

Once the block index (BI) for each preparative TREF fraction is obtained, the weight average block index, ABI, for the whole polymer can be calculated. In some embodiments, ABI is greater than zero but less than about 0.3 or from about 0.1 to about 0.3. In other embodiments, ABI is greater than about 0.3 and up to about 1.0. Preferably, ABI should be in the range of from about 0.4 to about 0.7, from about 0.5 to about 0.7, or from about 0.6 to about 0.9. In some embodiments, ABI is in the range of from about 0.3 to about 0.9, from about 0.3 to about 0.8, or from about 0.3 to about 0.7, from about 0.3 to about 0.6, from about 0.3 to about 0.5, or from about 0.3 to about 0.4. In other embodiments, ABI is in the range of from about 0.4 to about 1.0, from about 0.5 to about 1.0, or from about 0.6 to about 1.0, from about 0.7 to about 1.0, from about 0.8 to about 1.0, or from about 0.9 to about 1.0.

Another characteristic of the inventive ethylene/α-olefin interpolymer is that the inventive ethylene/α-olefin interpolymer comprises at least one polymer fraction which can be obtained by preparative TREF, wherein the fraction has a block index greater than about 0.1 and up to about 1.0 and a molecular weight distribution, $M_w/M_n$, greater than about 1.3. In some embodiments, the polymer fraction has a block index greater than about 0.6 and up to about 1.0, greater than about 0.7 and up to about 1.0, greater than about 0.8 and up to about 1.0, or greater than about 0.9 and up to about 1.0. In other embodiments, the polymer fraction has a block index greater than about 0.1 and up to about 1.0, greater than about 0.2 and up to about 1.0, greater than about 0.3 and up to about 1.0, greater than about 0.4 and up to about 1.0, or greater than about 0.4 and up to about 1.0. In still other embodiments, the polymer fraction has a block index greater than about 0.1 and up to about 0.5, greater than about 0.2 and up to about 0.5, greater than about 0.3 and up to about 0.5, or greater than about 0.4 and up to about 0.5. In yet other embodiments, the polymer fraction has a block index greater than about 0.2 and up to about 0.9, greater than about 0.3 and up to about 0.8, greater than about 0.4 and up to about 0.7, or greater than about 0.5 and up to about 0.6.

For copolymers of ethylene and an α-olefin, the inventive polymers preferably possess (1) a PDI of at least 1.3, more preferably at least 1.5, at least 1.7, or at least 2.0, and most preferably at least 2.6, up to a maximum value of 5.0, more preferably up to a maximum of 3.5, and especially up to a maximum of 2.7; (2) a heat of fusion of 80 J/g or less; (3) an ethylene content of at least 50 weight percent; (4) a glass transition temperature, $T_g$, of less than −25° C., more preferably less than −30° C., and/or (5) one and only one $T_m$.

Figure 6:
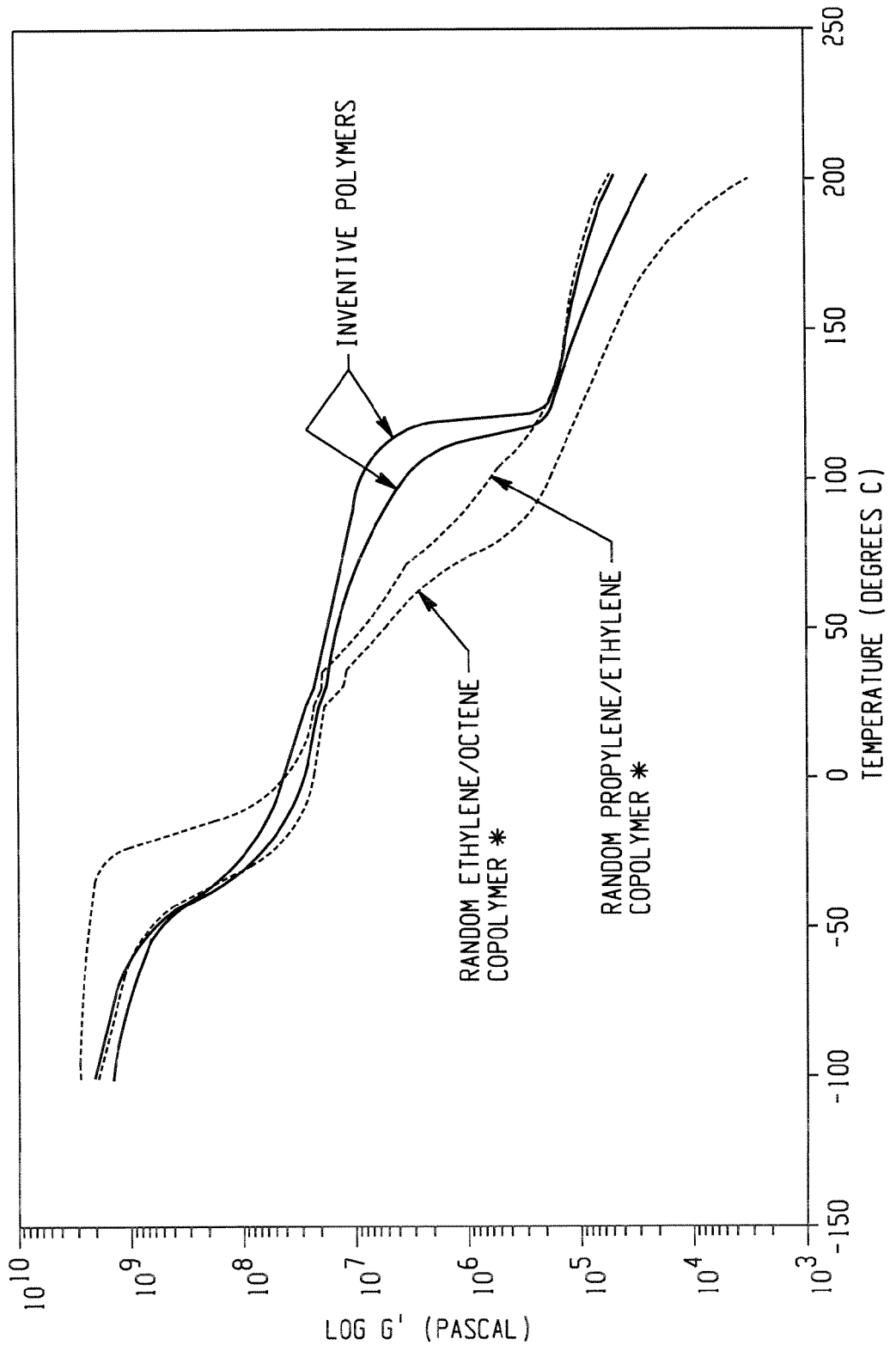
FIG. 6 is a graph of the log of storage modulus as a function of temperature for comparative ethylene/1-octene copolymer (curve 2) and propylene/ethylene-copolymer (curve 3) and for two ethylene/1-octene block copolymers of the invention made with differing quantities of chain shuttling agent (curves 1).

Further, the inventive polymers can have, alone or in combination with any other properties disclosed herein, a storage modulus, G', such that log (G') is greater than or equal to 400 kPa, preferably greater than or equal to 1.0 MPa, at a temperature of 100° C. Moreover, the inventive polymers possess a relatively flat storage modulus as a function of temperature in the range from 0 to 100° C. (illustrated in FIG. 6) that is characteristic of block copolymers, and heretofore unknown for an olefin copolymer, especially a copolymer of ethylene and one or more $C_{3-8}$ aliphatic α-olefins. (By the term "relatively flat" in this context is meant that log G' (in Pascals) decreases by less than one order of magnitude between 50 and 100° C., preferably between 0 and 100° C.).

Figure 7:
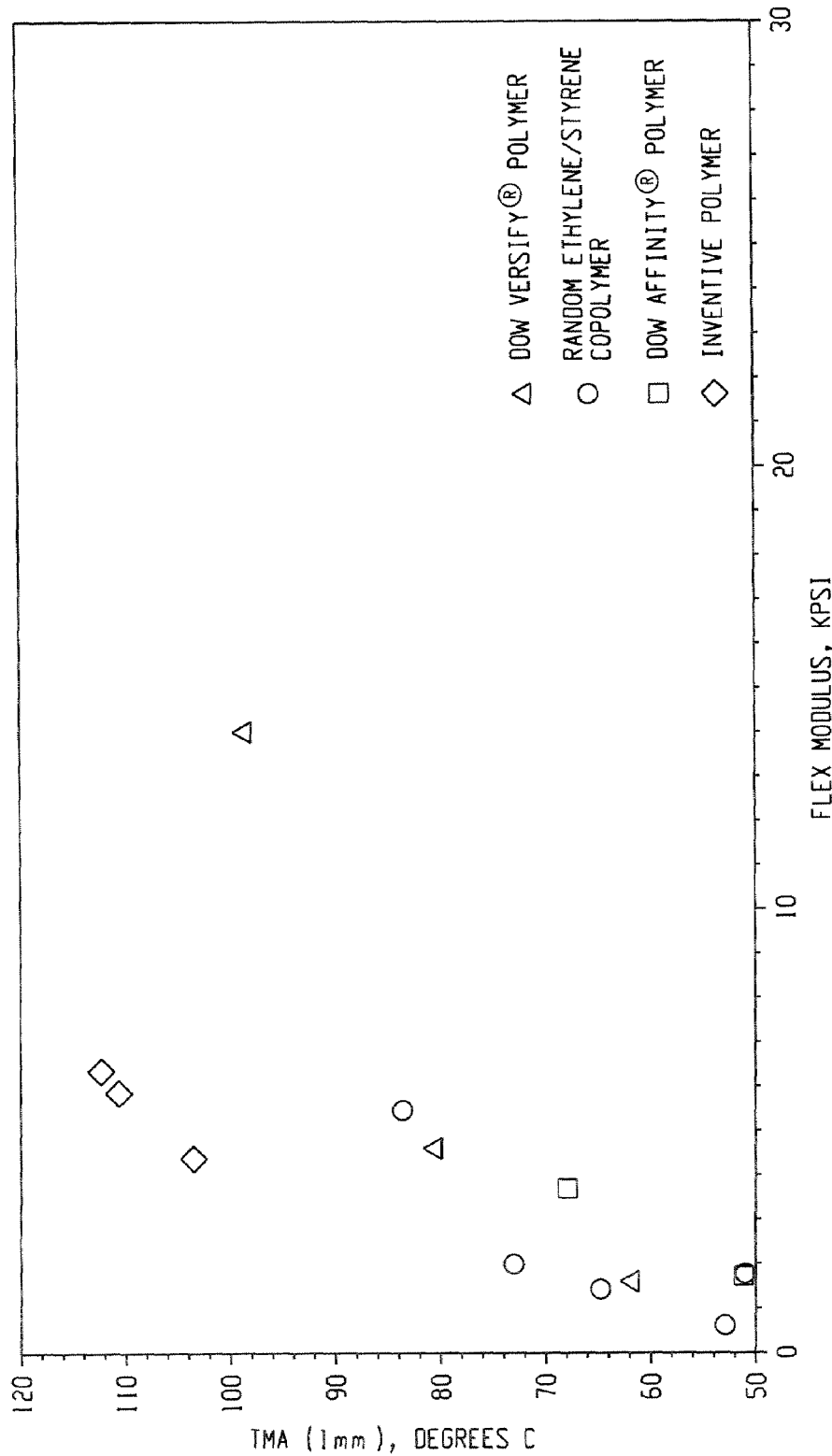
FIG. 7 shows a plot of TMA (1 mm) versus flex modulus for some inventive polymers (represented by the diamonds), as compared to some known polymers. The triangles represent various Dow VERSIFY® polymers; the circles represent various random ethylene/styrene copolymers; and the squares represent various Dow AFFINITY® polymers.

The inventive interpolymers may be further characterized by a thermomechanical analysis penetration depth of 1 mm at a temperature of at least 90° C. as well as a flexural modulus of from 3 kpsi (20 MPa) to 13 kpsi (90 MPa). Alternatively, the inventive interpolymers can have a thermomechanical analysis penetration depth of 1 mm at a temperature of at least 104° C. as well as a flexural modulus of at least 3 kpsi (20 MPa). They may be characterized as having an abrasion resistance (or volume loss) of less than 90 mm³. FIG. 7 shows the TMA (1 mm) versus flex modulus for the inventive polymers, as compared to other known polymers. The inventive polymers have significantly better flexibility-heat resistance balance than the other polymers.

Additionally, the ethylene/α-olefin interpolymers can have a melt index, $I_2$, from 0.01 to 2000 g/10 minutes, preferably from 0.01 to 1000 g/10 minutes, more preferably from 0.01 to 500 g/10 minutes, and especially from 0.01 to 100 g/10 minutes. In certain embodiments, the ethylene/α-olefin interpolymers have a melt index, $I_2$, from 0.01 to 10 g/10 minutes, from 0.5 to 50 g/10 minutes, from 1 to 30 g/10 minutes, from 1 to 6 g/10 minutes or from 0.3 to 10 g/10 minutes. In certain embodiments,. the melt index for the ethylene/α-olefin polymers is 1 g/10 minutes, 3 g/10 minutes or 5 g/10 minutes.

The polymers can have molecular weights, $M_w$, from 1,000 g/mole to 5,000,000 g/mole, preferably from 1000 g/mole to 1,000,000, more preferably from 10,000 g/mole to 500,000 g/mole, and especially from 10,000 g/mole to 300,000 g/mole. The density of the inventive polymers can be from 0.80 to 0.99 g/cm³ and preferably for ethylene containing polymers from 0.85 g/cm³ to 0.97 g/cm³. In certain embodiments, the density of the ethylene/α-olefin polymers ranges from 0.860 to 0.925 g/cm³ or 0.867 to 0.910 g/cm³.

The process of making the polymers has been disclosed in the following patent applications: U.S. Provisional Application No. 60/553,906, filed Mar. 17, 2004; U.S. Provisional Application No. 60/662,937, filed Mar. 17, 2005; U.S. Provisional Application No. 60/662,939, filed Mar. 17, 2005; U.S. Provisional Application No. 60/5662938, filed Mar. 17, 2005; PCT Application No. PCT/US2005/008916, filed Mar. 17, 2005; PCT Application No. PCT/US2005/008915, filed Mar. 17, 2005; and PCT Application No. PCT/US2005/008917, filed Mar. 17, 2005, all of which are incorporated by reference herein in their entirety. For example, one such method comprises contacting ethylene and optionally one or more addition polymerizable monomers other than ethylene under addition polymerization conditions with a catalyst composition comprising:

the admixture or reaction product resulting from combining:

(A) a first olefin polymerization catalyst having a high comonomer incorporation index, (B) a second olefin polymerization catalyst having a comonomer incorporation index less than 90 percent, preferably less than 50 percent, most preferably less than 5 percent of the comonomer incorporation index of catalyst (A), and (C) a chain shuttling agent.

Representative catalysts and chain shuttling agent are as follows.

Catalyst (A1) is [N-(2,6-di(1-methylethyl)phenyl)amido)(2-isopropylphenyl)(α-naphthalen-2-diyl(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

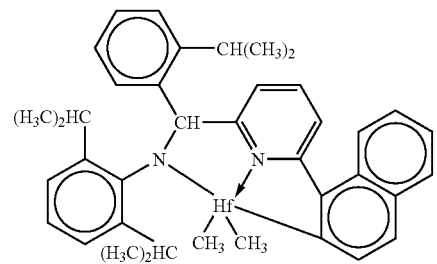

Catalyst (A2) is [N-(2,6-di(1-methylethyl)phenyl)amido)(2-methylphenyl)(1,2-phenylene-(6-pyridin-2-diyl)methane)]hafnium dimethyl, prepared according to the teachings of WO 03/40195, 2003US0204017, U.S. Ser. No. 10/429,024, filed May 2, 2003, and WO 04/24740.

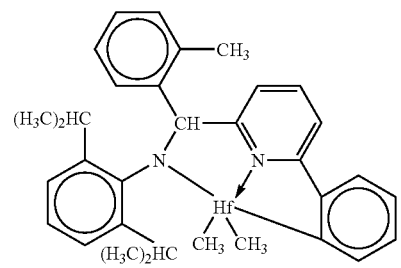

Catalyst (A3) is bis[N,N'''-(2,4,6-tri(methylphenyl)amido)ethylenediamine]hafnium dibenzyl.

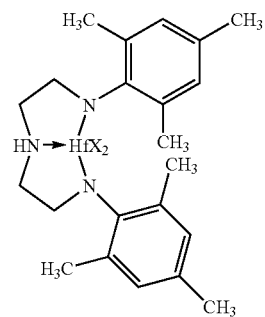

X = $CH_2C_6H_5$

Catalyst (A4) is bis((2-oxoyl-3-(dibenzo-1H-pyrrole-1-yl)-5-(methyl)phenyl)-2-phenoxymethyl)cyclohexane-1,2-diyl zirconium (IV) dibenzyl, prepared substantially according to the teachings of US-A-2004/0010103.

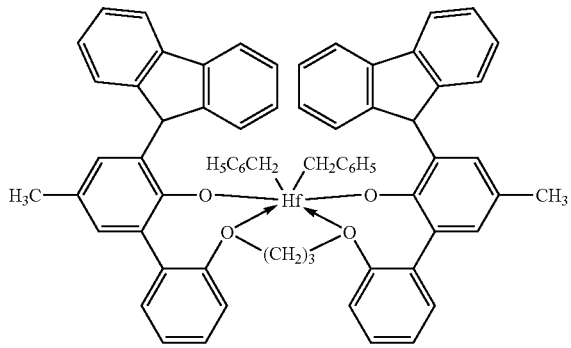

Catalyst (B1) is 1,2-bis-(3,5-di-t-butylphenylene)(1-(N-(1-methylethyl)immino)methyl)(2-oxoyl) zirconium dibenzyl

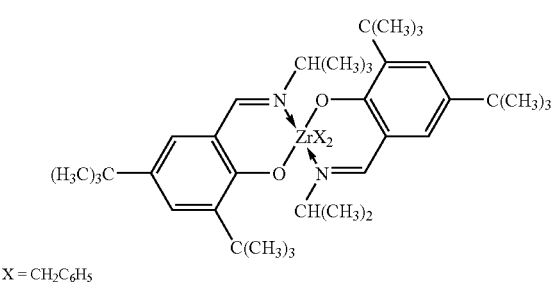

Catalyst (B2) is 1,2-bis-(3,5-di-t-butylphenylene)(1-(N-(2-methylcyclohexyl)-immino)methyl)(2-oxoyl) zirconium dibenzyl

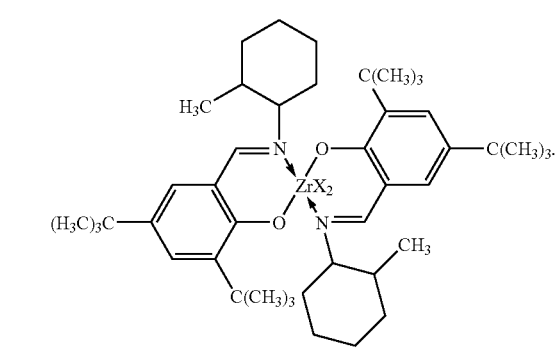

Catalyst (C1) is (t-butylamido)dimethyl(3-N-pyrrolyl-1,2,3,3a,7a-η-inden-1yl) silanetitanium dimethyl prepared substantially according to the techniques of U.S. Pat. No. 6,268,444:

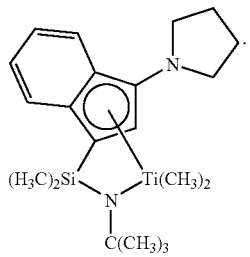

Catalyst (C2) is (t-butylamido)di(4-methylphenyl)(2-methyl-1,2,3,3a,7a-η-inden-1-yl)silanetitanium dimethyl prepared substantially according to the teachings of US-A-2003/004286:

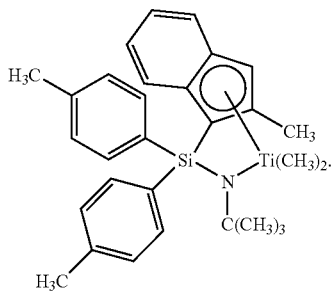

Catalyst (C3) is (t-butylamido)di(4-methylphenyl)(2-methyl-1,2,3,3a,8a-η-s-indacen-1-yl)silanetitanium dimethyl prepared substantially according to the teachings of US-A-2003/004286:

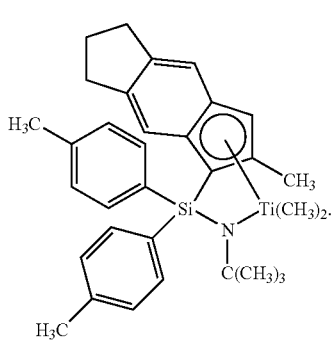

Catalyst (D1) is bis(dimethyldisiloxane)(indene-1-yl)zirconium dichloride available from Sigma-Aldrich:

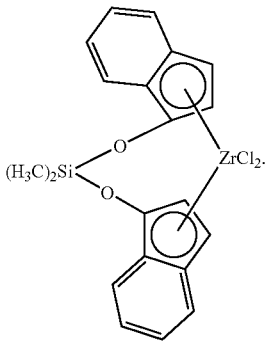

Shuttling Agents The shuttling agents employed include diethylzinc, di(i-butyl)zinc, di(n-hexyl)zinc, triethylaluminum, trioctylaluminum, triethylgallium, i-butylaluminum bis(dimethyl(t-butyl)siloxane), i-butylaluminum bis(di(trimethylsilyl)amide), n-octylaluminum di(pyridine-2-methoxide), bis(n-octadecyl)i-butylaluminum, i-butylaluminum bis(di(n-pentyl)amide), n-octylaluminum bis(2,6-di-t-butylphenoxide), n-octylaluminum di(ethyl(1-naphthyl)amide), ethylaluminum bis(t-butyldimethylsiloxide), ethylaluminum di(bis(trimethylsilyl)amide), ethylaluminum bis(2,3,6,7-dibenzo-1-azacycloheptaneamide), n-octylaluminum bis(2,3,6,7-dibenzo-1-azacycloheptaneamide), n-octylaluminum bis(dimethyl(t-butyl)siloxide), ethylzinc (2,6-diphenylphenoxide), and ethylzinc (t-butoxide).

Preferably, the foregoing process takes the form of a continuous solution process for forming block copolymers, especially multi-block copolymers, preferably linear multi-block copolymers of two or more monomers, more especially ethylene and a $C_{3-20}$ olefin or cycloolefin, and most especially ethylene and a $C_{4-20}$ α-olefin, using multiple catalysts that are incapable of interconversion. That is, the catalysts are chemically distinct. Under continuous solution polymerization conditions, the process is ideally suited for polymerization of mixtures of monomers at high monomer conversions. Under these polymerization conditions, shuttling from the chain shuttling agent to the catalyst becomes advantaged compared to chain growth, and multi-block copolymers, especially linear multi-block copolymers are formed in high efficiency.

The inventive interpolymers may be differentiated from conventional, random copolymers, physical blends of polymers, and block copolymers prepared via sequential monomer addition, fluxional catalysts, anionic or cationic living polymerization techniques. In particular, compared to a random copolymer of the same monomers and monomer content at equivalent crystallinity or modulus, the inventive interpolymers have better (higher) heat resistance as measured by melting point, higher TMA penetration temperature, higher high-temperature tensile strength, and/or higher high-temperature torsion storage modulus as determined by dynamic mechanical analysis. Compared to a random copolymer containing the same monomers and monomer content, the inventive interpolymers have lower compression set, particularly at elevated temperatures such as body temperature or higher, lower stress relaxation, lower stress relaxation particularly at body temperature or higher, higher creep resistance, higher tear strength, higher blocking resistance, faster setup due to higher crystallization (solidification) temperature, higher recovery (particularly at elevated temperatures), better abrasion resistance, higher retractive force, and better oil and filler acceptance.

The inventive interpolymers also exhibit a unique crystallization and branching distribution relationship. That is, the inventive interpolymers have a relatively large difference between the tallest peak temperature measured using CRYSTAF and DSC as a function of heat of fusion, especially as compared to random copolymers containing the same monomers and monomer level or physical blends of polymers, such as a blend of a high density polymer and a lower density copolymer, at equivalent overall density. It is believed that this unique feature of the inventive interpolymers is due to the unique distribution of the comonomer in blocks within the polymer backbone. In particular, the inventive interpolymers may comprise alternating blocks of differing comonomer content (including homopolymer blocks). The inventive interpolymers may also comprise a distribution in number and/or block size of polymer blocks of differing density or comonomer content, which is a Schultz-Flory type of distribution. In addition, the inventive interpolymers also have a unique peak melting point and crystallization temperature profile that is substantially independent of polymer density, modulus, and morphology. In a preferred embodiment, the microcrystalline order of the polymers demonstrates characteristic spherulites and lamellae that are distinguishable from random or block copolymers, even at PDI values that are less than 1.7, or even less than 1.5, down to less than 1.3.

Moreover, the inventive interpolymers may be prepared using techniques to influence the degree or level of blockiness. That is the amount of comonomer and length of each polymer block or segment can be altered by controlling the ratio and type of catalysts and shuttling agent as well as the temperature of the polymerization, and other polymerization variables. A surprising benefit of this phenomenon is the discovery that as the degree of blockiness is increased, the optical properties, tear strength, and high temperature recovery properties of the resulting polymer are improved. In particular, haze decreases while clarity, tear strength, and high temperature recovery properties increase as the average number of blocks in the polymer increases. By selecting shuttling agents and catalyst combinations having the desired chain transferring ability (high rates of shuttling with low levels of chain termination) other forms of polymer termination are effectively suppressed. Accordingly, little if any β-hydride elimination is observed in the polymerization of ethylene/α-olefin comonomer mixtures according to embodiments of the invention, and the resulting crystalline blocks are highly, or substantially completely, linear, possessing little or no long chain branching.

Polymers with highly crystalline chain ends can be selectively prepared in accordance with embodiments of the invention. In elastomer applications, reducing the relative quantity of polymer that terminates with an amorphous block reduces the intermolecular dilutive effect on crystalline regions. This result can be obtained by choosing chain shuttling agents and catalysts having an appropriate response to hydrogen or other chain terminating agents. Specifically, if the catalyst which produces highly crystalline polymer is more susceptible to chain termination (such as by use of hydrogen) than the catalyst responsible for producing the less crystalline polymer segment (such as through higher comonomer incorporation, regio-error, or atactic polymer formation), then the highly crystalline polymer segments will preferentially populate the terminal portions of the polymer. Not only are the resulting terminated groups crystalline, but upon termination, the highly crystalline polymer forming catalyst site is once again available for reinitiation of polymer formation. The initially formed polymer is therefore another highly crystalline polymer segment. Accordingly, both ends of the resulting multi-block copolymer are preferentially highly crystalline.

The ethylene α-olefin interpolymers used in the embodiments of the invention are preferably interpolymers of ethylene with at least one $C_3$-$C_{20}$ α-olefin. Copolymers of ethylene and a $C_3$-$C_{20}$ α-olefin are especially preferred. The interpolymers may further comprise $C_4$-$C_{18}$ diolefin and/or alkenylbenzene. Suitable unsaturated comonomers useful for polymerizing with ethylene include, for example, ethylenically unsaturated monomers, conjugated or nonconjugated dienes, polyenes, alkenylbenzenes, etc. Examples of such comonomers include $C_3$-$C_{20}$ α-olefins such as propylene, isobutylene, 1-butene, 1-hexene, 1-pentene, 4-methyl-1-pentene, 1-heptene, 1-octene, 1-nonene, 1-decene, and the like. 1-Butene and 1-octene are especially preferred. Other suitable monomers include styrene, halo- or alkyl-substituted styrenes, vinylbenzocyclobutane, 1,4-hexadiene, 1,7-octadiene, and naphthenics (e.g., cyclopentene, cyclohexene and cyclooctene).

While ethylene/α-olefin interpolymers are preferred polymers, other ethylene/olefin polymers may also be used. Olefins as used herein refer to a family of unsaturated hydrocarbon-based compounds with at least one carbon-carbon double bond. Depending on the selection of catalysts, any olefin may be used in embodiments of the invention. Preferably, suitable olefins are $C_3$-$C_{20}$ aliphatic and aromatic compounds containing vinylic unsaturation, as well as cyclic compounds, such as cyclobutene, cyclopentene, dicyclopentadiene, and norbornene, including but not limited to, norbornene substituted in the 5 and 6 position with $C_1$-$C_{20}$ hydrocarbyl or cyclohydrocarbyl groups. Also included are mixtures of such olefins as well as mixtures of such olefins with $C_4$-$C_{40}$ diolefin compounds.

Examples of olefin monomers include, but are not limited to propylene, isobutylene, 1-butene, 1-pentene, 1-hexene, 1-heptene, 1-octene, 1-nonene, 1-decene, and 1-dodecene, 1-tetradecene, 1-hexadecene, 1-octadecene, 1-eicosene, 3-methyl-1-butene, 3-methyl-1-pentene, 4-methyl-1-pentene, 4,6-dimethyl-1-heptene, 4-vinylcyclohexene, vinylcyclohexane, norbornadiene, ethylidene norbornene, cyclopentene, cyclohexene, dicyclopentadiene, cyclooctene, $C_4$-$C_{40}$ dienes, including but not limited to 1,3-butadiene, 1,3-pentadiene, 1,4-hexadiene, 1,5-hexadiene, 1,7-octadiene, 1,9-decadiene, other $C_4$-$C_{40}$ α-olefins, and the like. In certain embodiments, the α-olefin is propylene, 1-butene, 1-pentene, 1-hexene, 1-octene or a combination thereof. Although any hydrocarbon containing a vinyl group potentially may be used in embodiments of the invention, practical issues such as monomer availability, cost, and the ability to conveniently remove unreacted monomer from the resulting polymer may become more problematic as the molecular weight of the monomer becomes too high.

The polymerization processes described herein are well suited for the production of olefin polymers comprising monovinylidene aromatic monomers including styrene, o-methyl styrene, p-methyl styrene, t-butylstyrene, and the like. In particular, interpolymers comprising ethylene and styrene can be prepared by following the teachings herein. Optionally, copolymers comprising ethylene, styrene and a $C_3$-$C_{20}$ alpha olefin, optionally comprising a $C_4$-$C_{20}$ diene, having improved properties can be prepared.

Suitable non-conjugated diene monomers can be a straight chain, branched chain or cyclic hydrocarbon diene having from 6 to 15 carbon atoms. Examples of suitable non-conjugated dienes include, but are not limited to, straight chain acyclic dienes, such as 1,4-hexadiene, 1,6-octadiene, 1,7-octadiene, 1,9-decadiene, branched chain acyclic dienes, such as 5-methyl-1,4-hexadiene; 3,7-dimethyl-1,6-octadiene; 3,7-dimethyl-1,7-octadiene and mixed isomers of dihydromyricene and dihydroocinene, single ring alicyclic dienes, such as 1,3-cyclopentadiene; 1,4-cyclohexadiene; 1,5-cyclooctadiene and 1,5-cyclododecadiene, and multi-ring alicyclic fused and bridged ring dienes, such as tetrahydroindene, methyl tetrahydroindene, dicyclopentadiene, bicyclo-(2,2,1)-hepta-2,5-diene; alkenyl, alkylidene, cycloalkenyl and cycloalkylidene norbornenes, such as 5-methylene-2-norbornene (MNB); 5-propenyl-2-norbornene, 5-isopropylidene-2-norbornene, 5-(4-cyclopentenyl)-2-norbornene, 5-cyclohexylidene-2-norbornene, 5-vinyl-2-norbornene, and norbornadiene. Of the dienes typically used to prepare EPDMs, the particularly preferred dienes are 1,4-hexadiene (HD), 5-ethylidene-2-norbornene (ENB), 5-vinylidene-2-norbornene (VNB), 5-methylene-2-norbornene (MNB), and dicyclopentadiene (DCPD). The especially preferred dienes are 5-ethylidene-2-norbornene (ENB) and 1,4-hexadiene (HD).

One class of desirable polymers that can be made in accordance with embodiments of the invention are elastomeric interpolymers of ethylene, a $C_3$-$C_{20}$ α-olefin, especially propylene, and optionally one or more diene monomers. Preferred α-olefins for use in this embodiment of the present invention are designated by the formula $CH_2$=$CHR^*$, where $R^*$ is a linear or branched alkyl group of from 1 to 12 carbon atoms. Examples of suitable α-olefins include, but are not limited to, propylene, isobutylene, 1-butene, 1-pentene, 1-hexene, 4-methyl-1-pentene, and 1-octene. A particularly preferred α-olefin is propylene. The propylene based polymers are generally referred to in the art as EP or EPDM polymers. Suitable dienes for use in preparing such polymers, especially multi-block EPDM type polymers include conjugated or non-conjugated, straight or branched chain-, cyclic- or polycyclic-dienes comprising from 4 to 20 carbons. Preferred dienes include 1,4-pentadiene, 1,4-hexadiene, 5-ethylidene-2-norbornene, dicyclopentadiene, cyclohexadiene, and 5-butylidene-2-norbornene. A particularly preferred diene is 5-ethylidene-2-norbornene.

Because the diene containing polymers comprise alternating segments or blocks containing greater or lesser quantities of the diene (including none) and α-olefin (including none), the total quantity of diene and α-olefin may be reduced without loss of subsequent polymer properties. That is, because the diene and α-olefin monomers are preferentially incorporated into one type of block of the polymer rather than uniformly or randomly throughout the polymer, they are more efficiently utilized and subsequently the crosslink density of the polymer can be better controlled. Such crosslinkable elastomers and the cured products have advantaged properties, including higher tensile strength and better elastic recovery.

In some embodiments, the inventive interpolymers made with two catalysts incorporating differing quantities of comonomer have a weight ratio of blocks formed thereby from 95:5 to 5:95. The elastomeric polymers desirably have an ethylene content of from 20 to 90 percent, a diene content of from 0.1 to 10 percent, and an α-olefin content of from 10 to 80 percent, based on the total weight of the polymer. Further preferably, the multi-block elastomeric polymers have an ethylene content of from 60 to 90 percent, a diene content of from 0.1 to 10 percent, and an α-olefin content of from 10 to 40 percent, based on the total weight of the polymer. Preferred polymers are high molecular weight polymers, having a weight average molecular weight (Mw) from 10,000 to about 2,500,000, preferably from 20,000 to 500,000, more preferably from 20,000 to 350,000, and a polydispersity less than 3.5, more preferably less than 3.0, and a Mooney viscosity (ML (1+4) 125° C.) from 1 to 250. More preferably, such polymers have an ethylene content from 65 to 75 percent, a diene content from 0 to 6 percent, and an α-olefin content from 20 to 35 percent.

The ethylene/α-olefin interpolymers can be functionalized by incorporating at least one functional group in its polymer structure. Exemplary functional groups may include, for example, ethylenically unsaturated mono- and di-functional carboxylic acids, ethylenically unsaturated mono- and di-functional carboxylic acid anhydrides, salts thereof and esters thereof. Such functional groups may be grafted to an ethylene/α-olefin interpolymer, or it may be copolymerized with ethylene and an optional additional comonomer to form an interpolymer of ethylene, the functional comonomer and optionally other comonomer(s). Means for grafting functional groups onto polyethylene are described for example in U.S. Pat. Nos. 4,762,890, 4,927,888, and 4,950,541, the disclosures of these patents are incorporated herein by reference in their entirety. One particularly useful functional group is malic anhydride.

The amount of the functional group present in the functional interpolymer can vary. The functional group can typically be present in a copolymer-type functionalized interpolymer in an amount of at least about 1.0 weight percent, preferably at least about 5 weight percent, and more preferably at least about 7 weight percent. The functional group will typically be present in a copolymer-type functionalized interpolymer in an amount less than about 40 weight percent, preferably less than about 30 weight percent, and more preferably less than about 25 weight percent.

Testing Methods

In the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400-600 kPa) $N_2$. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

GPC Method (Excluding Samples 1-4 and A-C)

The gel permeation chromatographic system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)):
$M_{polyethylene} = 0.431 (M_{polystyrene})$.

Polyethylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457.

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min$^{-1}$ at 21° C. Tensile strength and elongation at break are reported from an average of 5 specimens.

100% and 300% Hysteresis is determined from cyclic loading to 100% and 300% strains using ASTM D 1708 microtensile specimens with an Instron™ instrument. The sample is loaded and unloaded at 267% min$^{-1}$ for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1$^{st}$ unloading cycle.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min$^{-1}$. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where $L_0$ is the load at 50% strain at 0 time and $L_{12}$ is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min−1 at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation ΔL) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation ΔL increases with the temperature, particularly above the melting or softening point of the polymer sample. The test stops at the maximum temperature or when the gap between the fixtures reaches 65 mm.

Melt Index

Melt index, or $I_2$, is measured in accordance with ASTM D 1238, Condition 190° C./2.16 kg. Melt index, or $I_{10}$ is also measured in accordance with ASTM D 1238, Condition 190° C./10 kg.

ATREF

Analytical temperature rising elution fractionation (ATREF) analysis is conducted according to the method described in U.S. Pat. No. 4,798,081 and Wilde, L.; Ryle, T. R.; Knobeloch, D. C.; Peat, I. R.; *Determination of Branching Distributions in Polyethlylene and Ethylene Copolymers*, J. Polym. Sci., 20, 441-455 (1982), which are incorporated by reference herein in their entirety. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

$^{13}$C NMR Analysis

The samples are prepared by adding approximately 3 g of a 50/50 mixture of tetrachloroethane-d$^2$/orthodichlorobenzene to 0.4 g sample in a 10 mm NMR tube. The samples are dissolved and homogenized by heating the tube and its contents to 150° C. The data are collected using a JEOL Eclipse™ 400 MHz spectrometer or a Varian Unity Plus™ 400 MHz spectrometer, corresponding to a $^{13}$C resonance frequency of 100.5 MHz. The data are acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989), which is incorporated by reference herein in its entirety.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available from Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

Melt Strength

Melt Strength (MS) is measured by using a capillary rheometer fitted with a 2.1 mm diameter, 20:1 die with an entrance angle of approximately 45 degrees. After equilibrating the samples at 190° C. for 10 minutes, the piston is run at a speed of 1 inch/minute (2.54 cm/minute). The standard test temperature is 190° C. The sample is drawn uniaxially to a set of accelerating nips located 100 mm below the die with an acceleration of 2.4 mm/sec$^2$. The required tensile force is recorded as a function of the take-up speed of the nip rolls. The maximum tensile force attained during the test is defined as the melt strength. In the case of polymer melt exhibiting draw resonance, the tensile force before the onset of draw resonance was taken as melt strength. The melt strength is recorded in centiNewtons ("cN").

Catalysts

The term "overnight", if used, refers to a time of approximately 16-18 hours, the term "room temperature", refers to a temperature of 20-25° C., and the term "mixed alkanes" refers to a commercially obtained mixture of $C_{6-9}$ aliphatic hydrocarbons available under the trade designation Isopar E®, from ExxonMobil Chemical Company. In the event the name of a compound herein does not conform to the structural representation thereof, the structural representation shall control. The synthesis of all metal complexes and the preparation of all screening experiments were carried out in a dry nitrogen atmosphere using dry box techniques. All solvents used were HPLC grade and were dried before their use.

MMAO refers to modified methylalumoxane, a triisobutylaluminum modified methylalumoxane available commercially from Akzo-Noble Corporation.

The preparation of catalyst (B1) is conducted as follows.
 a) Preparation of (1-methylethyl)(2-hydroxy-3,5-di(t-butyl)phenyl)methylimine 3,5-Di-t-butylsalicylaldehyde (3.00 g) is added to 10 mL of isopropylamine. The solution rapidly turns bright yellow. After stirring at ambient temperature for 3 hours, volatiles are removed under vacuum to yield a bright yellow, crystalline solid (97 percent yield).

b) Preparation of 1,2-bis-(3,5-di-t-butylphenylene)(1-(N-(1-methylethyl)immino)methyl)(2-oxoyl) zirconium dibenzyl A solution of (1-methylethyl)(2-hydroxy-3,5-di(t-butyl) phenyl)imine (605 mg, 2.2 mmol) in 5 mL toluene is slowly added to a solution of $Zr(CH_2Ph)_4$ (500 mg, 1.1 mmol) in 50 mL toluene. The resulting dark yellow solution is stirred for 30 min. Solvent is removed under reduced pressure to yield the desired product as a reddish-brown solid.

The preparation of catalyst (B2) is conducted as follows.
 a) Preparation of (1-(2-methylcyclohexyl)ethyl)(2-oxoyl-3,5-di(t-butyl)phenyl)imine 2-Methylcyclohexylamine (8.44 mL, 64.0 mmol) is dissolved in methanol (90 mL), and di-t-butylsalicaldehyde (10.00 g, 42.67 mmol) is added. The reaction mixture is stirred for three hours and then cooled to −25° C. for 12 hrs. The resulting yellow solid precipitate is collected by filtration and washed with cold methanol (2×15 mL), and then dried under reduced pressure. The yield is 11.17 g of a yellow solid. $^1$H NMR is consistent with the desired product as a mixture of isomers.

b) Preparation of bis-(1-(2-methylcyclohexyl)ethyl)(2-oxoyl-3,5-di(t-butyl)phenyl)immino)zirconium dibenzyl A solution of (1-(2-methylcyclohexyl)ethyl)(2-oxoyl-3,5-di(t-butyl)phenyl)imine (7.63 g, 23.2 mmol) in 200 mL toluene is slowly added to a solution of $Zr(CH_2Ph)_4$ (5.28 g, 11.6 mmol) in 600 mL toluene. The resulting dark yellow solution is stirred for 1 hour at 25° C. The solution is diluted further with 680 mL toluene to give a solution having a concentration of 0.00783 M.

Cocatalyst 1 A mixture of methyldi($C_{14-18}$ alkyl)ammonium salts of tetrakis(pentafluorophenyl)borate (here-in-after armeenium borate), prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2.

Cocatalyst 2 Mixed $C_{14-18}$ alkyldimethylammonium salt of bis(tris(pentafluorophenyl)-alumane)-2-undecylimidazolide, prepared according to U.S. Pat. No. 6,395,671, Ex. 16.

Shuttling Agents The shuttling agents employed include diethylzinc (DEZ, SA1), di(i-butyl)zinc (SA2), di(n-hexyl)zinc (SA3), triethylaluminum (TEA, SA4), trioctylaluminum (SA5), triethylgallium (SA6), i-butylaluminum bis(dimethyl (t-butyl)siloxane) (SA7), i-butylaluminum bis(di(trimethylsilyl)amide) (SA8), n-octylaluminum di(pyridine-2-methoxide) (SA9), bis(n-octadecyl)i-butylaluminum (SA10), i-butylaluminum bis(di(n-pentyl)amide) (SA11), n-octylaluminum bis(2,6-di-t-butylphenoxide) (SA12), n-octylaluminum di(ethyl(1-naphthyl)amide) (SA13), ethylaluminum bis(t-butyldimethylsiloxide) (SA14), ethylaluminum di(bis (trimethylsilyl)amide) (SA15), ethylaluminum bis(2,3,6,7-dibenzo-1-azacycloheptaneamide) (SA16), n-octylaluminum bis(2,3,6,7-dibenzo-1-azacycloheptaneamide) (SA17), n-octylaluminum bis(dimethyl(t-butyl)siloxide) (SA18), ethylzinc (2,6-diphenylphenoxide) (SA19), and ethylzinc (t-butoxide) (SA20).

EXAMPLES 1-4, COMPARATIVE A-C

General High Throughput Parallel Polymerization Conditions

Polymerizations are conducted using a high throughput, parallel polymerization reactor (PPR) available from Symyx technologies, Inc. and operated substantially according to U.S. Pat. Nos. 6,248,540, 6,030,917, 6,362,309, 6,306,658, and 6,316,663. Ethylene copolymerizations are conducted at 130° C. and 200 psi (1.4 MPa) with ethylene on demand using 1.2 equivalents of cocatalyst 1 based on total catalyst used (1.1 equivalents when MMAO is present). A series of polymerizations are conducted in a parallel pressure reactor (PPR) contained of 48 individual reactor cells in a 6×8 array that are fitted with a pre-weighed glass tube. The working volume in each reactor cell is 6000 μL. Each cell is temperature and pressure controlled with stirring provided by individual stirring paddles. The monomer gas and quench gas are plumbed directly into the PPR unit and controlled by automatic valves. Liquid reagents are robotically added to each reactor cell by syringes and the reservoir solvent is mixed alkanes. The order of addition is mixed alkanes solvent (4 ml), ethylene, 1-octene comonomer (1 ml), cocatalyst 1 or cocatalyst 1/MMAO mixture, shuttling agent, and catalyst or catalyst mixture. When a mixture of cocatalyst 1 and MMAO or a mixture of two catalysts is used, the reagents are premixed in a small vial immediately prior to addition to the reactor. When a reagent is omitted in an experiment, the above order of addition is otherwise maintained. Polymerizations are conducted for approximately 1-2 minutes, until predetermined ethylene consumptions are reached. After quenching with CO, the reactors are cooled and the glass tubes are unloaded. The tubes are transferred to a centrifuge/vacuum drying unit, and dried for 12 hours at 60° C. The tubes containing dried polymer are weighed and the difference between this weight and the tare weight gives the net yield of polymer. Results are contained in Table 1. In Table 1 and elsewhere in the application, comparative compounds are indicated by an asterisk (*).

Examples 1-4 demonstrate the synthesis of linear block copolymers by the present invention as evidenced by the formation of a very narrow MWD, essentially monomodal copolymer when DEZ is present and a bimodal, broad molecular weight distribution product (a mixture of separately produced polymers) in the absence of DEZ. Due to the fact that Catalyst (A1) is known to incorporate more octene than Catalyst (B1), the different blocks or segments of the resulting copolymers of the invention are distinguishable based on branching or density.

TABLE 1

| Ex. | Cat. (A1) (μmol) | Cat (B1) (μmol) | Cocat (μmol) | MMAO (μmol) | shuttling agent (μmol) | Yield (g) | Mn | Mw/Mn | hexyls[1] |
|---|---|---|---|---|---|---|---|---|---|
| A* | 0.06 | — | 0.066 | 0.3 | — | 0.1363 | 300502 | 3.32 | — |
| B* | — | 0.1 | 0.110 | 0.5 | — | 0.1581 | 36957 | 1.22 | 2.5 |
| C* | 0.06 | 0.1 | 0.176 | 0.8 | — | 0.2038 | 45526 | 5.30[2] | 5.5 |
| 1 | 0.06 | 0.1 | 0.192 | — | DEZ (8.0) | 0.1974 | 28715 | 1.19 | 4.8 |
| 2 | 0.06 | 0.1 | 0.192 | — | DEZ (80.0) | 0.1468 | 2161 | 1.12 | 14.4 |
| 3 | 0.06 | 0.1 | 0.192 | — | TEA (8.0) | 0.208 | 22675 | 1.71 | 4.6 |
| 4 | 0.06 | 0.1 | 0.192 | — | TEA (80.0) | 0.1879 | 3338 | 1.54 | 9.4 |

[1]$C_6$ or higher chain content per 1000 carbons
[2]Bimodal molecular weight distribution It may be seen the polymers produced according to the invention have a relatively narrow polydispersity (Mw/Mn) and larger block-copolymer content (trimer, tetramer, or larger) than polymers prepared in the absence of the shuttling agent.

Further characterizing data for the polymers of Table 1 are determined by reference to the figures. More specifically DSC and ATREF results show the following:

The DSC curve for the polymer of example 1 shows a 115.7° C. melting point (Tm) with a heat of fusion of 158.1 J/g. The corresponding CRYSTAF curve shows the tallest peak at 34.5° C. with a peak area of 52.9 percent. The difference between the DSC Tm and the Tcrystaf is 81.2° C.

The DSC curve for the polymer of example 2 shows a peak with a 109.7° C. melting point (Tm) with a heat of fusion of 214.0 J/g. The corresponding CRYSTAF curve shows the tallest peak at 46.2° C. with a peak area of 57.0 percent. The difference between the DSC Tm and the Tcrystaf is 63.5° C.

The DSC curve for the polymer of example 3 shows a peak with a 120.7° C. melting point (Tm) with a heat of fusion of 160.1 J/g. The corresponding CRYSTAF curve shows the tallest peak at 66.1° C. with a peak area of 71.8 percent. The difference between the DSC Tm and the Tcrystaf is 54.6° C.

The DSC curve for the polymer of example 4 shows a peak with a 104.5° C. melting point (Tm) with a heat of fusion of 170.7 J/g. The corresponding CRYSTAF curve shows the tallest peak at 30° C. with a peak area of 18.2 percent. The difference between the DSC Tm and the Tcrystaf is 74.5° C.

The DSC curve for comparative A shows a 90.0° C. melting point (Tm) with a heat of fusion of 86.7 J/g. The corresponding CRYSTAF curve shows the tallest peak at 48.5° C. with a peak area of 29.4 percent. Both of these values are consistent with a resin that is low in density. The difference between the DSC Tm and the Tcrystaf is 41.8° C.

The DSC curve for comparative B shows a 129.8° C. melting point (Tm) with a heat of fusion of 237.0 J/g. The corresponding CRYSTAF curve shows the tallest peak at 82.4° C. with a peak area of 83.7 percent. Both of these values are consistent with a resin that is high in density. The difference between the DSC Tm and the Tcrystaf is 47.4° C.

The DSC curve for comparative C shows a 125.3° C. melting point (Tm) with a heat of fusion of 143.0 J/g. The corresponding CRYSTAF curve shows the tallest peak at 81.8° C. with a peak area of 34.7 percent as well as a lower crystalline peak at 52.4° C. The separation between the two peaks is consistent with the presence of a high crystalline and a low crystalline polymer. The difference between the DSC Tm and the Tcrystaf is 43.5° C.

EXAMPLES 5-19, COMPARATIVES D-F

Continuous Solution Polymerization, Catalyst A1/B2+DEZ

Continuous solution polymerizations are carried out in a computer controlled autoclave reactor equipped with an internal stirrer. Purified mixed alkanes solvent (Isopar™ E available from ExxonMobil Chemical Company), ethylene at 2.70 lbs/hour (1.22 kg/hour), 1-octene, and hydrogen (where used) are supplied to a 3.8 L reactor equipped with a jacket for temperature control and an internal thermocouple. The solvent feed to the reactor is measured by a mass-flow controller. A variable speed diaphragm pump controls the solvent flow rate and pressure to the reactor. At the discharge of the pump, a side stream is taken to provide flush flows for the catalyst and cocatalyst 1 injection lines and the reactor agitator. These flows are measured by Micro-Motion mass flow meters and controlled by control valves or by the manual adjustment of needle valves. The remaining solvent is combined with 1-octene, ethylene, and hydrogen (where used) and fed to the reactor. A mass flow controller is used to deliver hydrogen to the reactor as needed. The temperature of the solvent/monomer solution is controlled by use of a heat exchanger before entering the reactor. This stream enters the bottom of the reactor. The catalyst component solutions are metered using pumps and mass flow meters and are combined with the catalyst flush solvent and introduced into the bottom of the reactor. The reactor is run liquid-full at 500 psig (3.45 MPa) with vigorous stirring. Product is removed through exit lines at the top of the reactor. All exit lines from the reactor are steam traced and insulated. Polymerization is stopped by the addition of a small amount of water into the exit line along with any stabilizers or other additives and passing the mixture through a static mixer. The product stream is then heated by passing through a heat exchanger before devolatilization. The polymer product is recovered by extrusion using a devolatilizing extruder and water cooled pelletizer. Process details and results are contained in Table 2. Selected polymer properties are provided in Table 3.

TABLE 2

Process details for preparation of exemplary polymers

| Ex. | $C_8H_{16}$ kg/hr | Solv. kg/hr | $H_2$ sccm[1] | T °C. | Cat Al[2] ppm | Cat A1 Flow kg/hr | Cat B2[3] ppm | B2 Flow kg/hr | DEZ Conc % | DEZ Flow kg/hr | Cocat Conc. ppm | Cocat Flow kg/hr | $[C_2H_4]$/ $[DEZ]^4$ | Poly Rate[5] kg/hr | Conv %[6] | Solids % | Eff.[7] |
|---|---|---|---|---|---|---|---|---|---|---|---|---|---|---|---|---|---|
| D* | 1.63 | 12.7 | 29.90 | 120 | 142.2 | 0.14 | — | — | 0.19 | 0.32 | 820 | 0.17 | 536 | 1.81 | 88.8 | 11.2 | 95.2 |
| E* | " | 9.5 | 5.00 | " | — | — | 109 | 0.10 | 0.19 | " | 1743 | 0.40 | 485 | 1.47 | 89.9 | 11.3 | 126.8 |
| F* | " | 11.3 | 251.6 | " | 71.7 | 0.06 | 30.8 | 0.06 | — | — | " | 0.11 | — | 1.55 | 88.5 | 10.3 | 257.7 |
| 5 | " | " | — | " | " | 0.14 | 30.8 | 0.13 | 0.17 | 0.43 | " | 0.26 | 419 | 1.64 | 89.6 | 11.1 | 118.3 |
| 6 | " | " | 4.92 | " | " | 0.10 | 30.4 | 0.08 | 0.17 | 0.32 | " | 0.18 | 570 | 1.65 | 89.3 | 11.1 | 172.7 |
| 7 | " | " | 21.70 | " | " | 0.07 | 30.8 | 0.06 | 0.17 | 0.25 | " | 0.13 | 718 | 1.60 | 89.2 | 10.6 | 244.1 |
| 8 | " | " | 36.90 | " | " | 0.06 | " | " | " | 0.10 | " | 0.12 | 1778 | 1.62 | 90.0 | 10.8 | 261.1 |
| 9 | " | " | 78.43 | " | " | " | " | " | " | 0.04 | " | " | 4596 | 1.63 | 90.2 | 10.8 | 267.9 |
| 10 | " | " | 0.00 | 123 | 71.1 | 0.12 | 30.3 | 0.14 | 0.34 | 0.19 | 1743 | 0.08 | 415 | 1.67 | 90.31 | 11.1 | 131.1 |
| 11 | " | " | " | 120 | 71.1 | 0.16 | " | 0.17 | 0.80 | 0.15 | 1743 | 0.10 | 249 | 1.68 | 89.56 | 11.1 | 100.6 |
| 12 | " | " | " | 121 | 71.1 | 0.15 | " | 0.07 | " | 0.09 | 1743 | 0.07 | 396 | 1.70 | 90.02 | 11.3 | 137.0 |
| 13 | " | " | " | 122 | 71.1 | 0.12 | " | 0.06 | " | 0.05 | 1743 | 0.05 | 653 | 1.69 | 89.64 | 11.2 | 161.9 |
| 14 | " | " | " | 120 | 71.1 | 0.05 | " | 0.29 | " | 0.10 | 1743 | 0.10 | 395 | 1.41 | 89.42 | 9.3 | 114.1 |
| 15 | 2.45 | " | " | " | 71.1 | 0.14 | " | 0.17 | " | 0.14 | 1743 | 0.09 | 282 | 1.80 | 89.33 | 11.3 | 121.3 |
| 16 | " | " | " | 122 | 71.1 | 0.10 | " | 0.13 | " | 0.07 | 1743 | 0.07 | 485 | 1.78 | 90.11 | 11.2 | 159.7 |
| 17 | " | " | " | 121 | 71.1 | 0.10 | " | 0.14 | " | 0.08 | 1743 | " | 506 | 1.75 | 89.08 | 11.0 | 155.6 |
| 18 | 0.69 | " | " | 121 | 71.1 | " | " | 0.22 | " | 0.11 | 1743 | 0.10 | 331 | 1.25 | 89.93 | 8.8 | 90.2 |
| 19 | 0.32 | " | " | 122 | 71.1 | 0.06 | " | " | " | 0.09 | 1743 | 0.08 | 367 | 1.16 | 90.74 | 8.4 | 106.0 |

*Comparative, not an example of the invention
[1] standard cm³/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dibenzyl
[4] molar ratio in reactor
[5] polymer production rate
[6] percent ethylene conversion in reactor
[7] efficiency, kg polymer/g M where g M = g Hf + g Zr

TABLE 3

Properties of exemplary polymers

| Ex. | Density (g/cm³) | $I_2$ | $I_{10}$ | $I_{10}/I_2$ | Mw (g/mol) | Mn (g/mol) | Mw/Mn | Heat of Fusion (J/g) | $T_m$ (° C.) | $T_c$ (° C.) | $T_{CRYSTAF}$ (° C.) | Tm-$T_{CRYSTAF}$ (° C.) | CRYSTAF Peak Area (percent) |
|---|---|---|---|---|---|---|---|---|---|---|---|---|---|
| D* | 0.8627 | 1.5 | 10.0 | 6.5 | 110,000 | 55,800 | 2.0 | 32 | 37 | 45 | 30 | 7 | 99 |
| E* | 0.9378 | 7.0 | 39.0 | 5.6 | 65,000 | 33,300 | 2.0 | 183 | 124 | 113 | 79 | 45 | 95 |
| F* | 0.8895 | 0.9 | 12.5 | 13.4 | 137,300 | 9,980 | 13.8 | 90 | 125 | 111 | 78 | 47 | 20 |
| 5 | 0.8786 | 1.5 | 9.8 | 6.7 | 104,600 | 53,200 | 2.0 | 55 | 120 | 101 | 48 | 72 | 60 |
| 6 | 0.8785 | 1.1 | 7.5 | 6.5 | 109600 | 53300 | 2.1 | 55 | 115 | 94 | 44 | 71 | 63 |
| 7 | 0.8825 | 1.0 | 7.2 | 7.1 | 118,500 | 53,100 | 2.2 | 69 | 121 | 103 | 49 | 72 | 29 |
| 8 | 0.8828 | 0.9 | 6.8 | 7.7 | 129,000 | 40,100 | 3.2 | 68 | 124 | 106 | 80 | 43 | 13 |
| 9 | 0.8836 | 1.1 | 9.7 | 9.1 | 129600 | 28700 | 4.5 | 74 | 125 | 109 | 81 | 44 | 16 |
| 10 | 0.8784 | 1.2 | 7.5 | 6.5 | 113,100 | 58,200 | 1.9 | 54 | 116 | 92 | 41 | 75 | 52 |
| 11 | 0.8818 | 9.1 | 59.2 | 6.5 | 66,200 | 36,500 | 1.8 | 63 | 114 | 93 | 40 | 74 | 25 |
| 12 | 0.8700 | 2.1 | 13.2 | 6.4 | 101,500 | 55,100 | 1.8 | 40 | 113 | 80 | 30 | 83 | 91 |
| 13 | 0.8718 | 0.7 | 4.4 | 6.5 | 132,100 | 63,600 | 2.1 | 42 | 114 | 80 | 30 | 81 | 8 |
| 14 | 0.9116 | 2.6 | 15.6 | 6.0 | 81,900 | 43,600 | 1.9 | 123 | 121 | 106 | 73 | 48 | 92 |
| 15 | 0.8719 | 6.0 | 41.6 | 6.9 | 79,900 | 40,100 | 2.0 | 33 | 114 | 91 | 32 | 82 | 10 |
| 16 | 0.8758 | 0.5 | 3.4 | 7.1 | 148,500 | 74,900 | 2.0 | 43 | 117 | 96 | 48 | 69 | 65 |
| 17 | 0.8757 | 1.7 | 11.3 | 6.8 | 107,500 | 54,000 | 2.0 | 43 | 116 | 96 | 43 | 73 | 57 |
| 18 | 0.9192 | 4.1 | 24.9 | 6.1 | 72,000 | 37,900 | 1.9 | 136 | 120 | 106 | 70 | 50 | 94 |
| 19 | 0.9344 | 3.4 | 20.3 | 6.0 | 76,800 | 39,400 | 1.9 | 169 | 125 | 112 | 80 | 45 | 88 |

The resulting polymers are tested by DSC and ATREF as with previous examples. Results are as follows:

The DSC curve for the polymer of example 5 shows a peak with a 119.6° C. melting point (Tm) with a heat of fusion of 60.0 J/g. The corresponding CRYSTAF curve shows the tallest peak at 47.6° C. with a peak area of 59.5 percent. The delta between the DSC Tm and the Tcrystaf is 72.0° C.

The DSC curve for the polymer of example 6 shows a peak with a 115.2° C. melting point (Tm) with a heat of fusion of 60.4 J/g. The corresponding CRYSTAF curve shows the tallest peak at 44.2° C. with a peak area of 62.7 percent. The delta between the DSC Tm and the Tcrystaf is 71.0° C.

The DSC curve for the polymer of example 7 shows a peak with a 121.3° C. melting point with a heat of fusion of 69.1 J/g. The corresponding CRYSTAF curve shows the tallest peak at 49.2° C. with a peak area of 29.4 percent. The delta between the DSC Tm and the Tcrystaf is 72.1° C.

The DSC curve for the polymer of example 8 shows a peak with a 123.5° C. melting point (Tm) with a heat of fusion of 67.9 J/g. The corresponding CRYSTAF curve shows the tallest peak at 80.1° C. with a peak area of 12.7 percent. The delta between the DSC Tm and the Tcrystaf is 43.4° C.

The DSC curve for the polymer of example 9 shows a peak with a 124.6° C. melting point (Tm) with a heat of fusion of 73.5 J/g. The corresponding CRYSTAF curve shows the tallest peak at 80.8° C. with a peak area of 16.0 percent. The delta between the DSC Tm and the Tcrystaf is 43.8° C.

The DSC curve for the polymer of example 10 shows a peak with a 115.6° C. melting point (Tm) with a heat of fusion of 60.7 J/g. The corresponding CRYSTAF curve shows the tallest peak at 40.9° C. with a peak area of 52.4 percent. The delta between the DSC Tm and the Tcrystaf is 74.7° C.

The DSC curve for the polymer of example 11 shows a peak with a 113.6° C. melting point (Tm) with a heat of fusion of 70.4 J/g. The corresponding CRYSTAF curve shows the tallest peak at 39.6° C. with a peak area of 25.2 percent. The delta between the DSC Tm and the Tcrystaf is 74.1° C.

The DSC curve for the polymer of example 12 shows a peak with a 113.2° C. melting point (Tm) with a heat of fusion of 48.9 J/g. The corresponding CRYSTAF curve shows no peak equal to or above 30° C. (Tcrystaf for purposes of further calculation is therefore set at 30° C.). The delta between the DSC Tm and the Tcrystaf is 83.2° C.

The DSC curve for the polymer of example 13 shows a peak with a 114.4° C. melting point (Tm) with a heat of fusion of 49.4 J/g. The corresponding CRYSTAF curve shows the tallest peak at 33.8° C. with a peak area of 7.7 percent. The delta between the DSC Tm and the Tcrystaf is 84.4° C.

The DSC for the polymer of example 14 shows a peak with a 120.8° C. melting point (Tm) with a heat of fusion of 127.9 J/g. The corresponding CRYSTAF curve shows the tallest peak at 72.9° C. with a peak area of 92.2 percent. The delta between the DSC Tm and the Tcrystaf is 47.9° C.

The DSC curve for the polymer of example 15 shows a peak with a 114.3° C. melting point (Tm) with a heat of fusion of 36.2 J/g. The corresponding CRYSTAF curve shows the tallest peak at 32.3° C. with a peak area of 9.8 percent. The delta between the DSC Tm and the Tcrystaf is 82.0° C.

The DSC curve for the polymer of example 16 shows a peak with a 116.6° C. melting point (Tm) with a heat of fusion of 44.9 J/g. The corresponding CRYSTAF curve shows the tallest peak at 48.0° C. with a peak area of 65.0 percent. The delta between the DSC Tm and the Tcrystaf is 68.6° C.

The DSC curve for the polymer of example 17 shows a peak with a 116.0° C. melting point (Tm) with a heat of fusion of 47.0 J/g. The corresponding CRYSTAF curve shows the tallest peak at 43.1° C. with a peak area of 56.8 percent. The delta between the DSC Tm and the Tcrystaf is 72.9° C.

The DSC curve for the polymer of example 18 shows a peak with a 120.5° C. melting point (Tm) with a heat of fusion of 141.8 J/g. The corresponding CRYSTAF curve shows the tallest peak at 70.0° C. with a peak area of 94.0 percent. The delta between the DSC Tm and the Tcrystaf is 50.5° C.

The DSC curve for the polymer of example 19 shows a peak with a 124.8° C. melting point (Tm) with a heat of fusion of 174.8 J/g. The corresponding CRYSTAF curve shows the tallest peak at 79.9° C. with a peak area of 87.9 percent. The delta between the DSC Tm and the Tcrystaf is 45.0° C.

The DSC curve for the polymer of comparative D shows a peak with a 37.3° C. melting point (Tm) with a heat of fusion of 31.6 J/g. The corresponding CRYSTAF curve shows no peak equal to and above 30° C. Both of these values are consistent with a resin that is low in density. The delta between the DSC Tm and the Tcrystaf is 7.3° C.

The DSC curve for the polymer of comparative E shows a peak with a 124.0° C. melting point (Tm) with a heat of fusion of 179.3 J/g. The corresponding CRYSTAF curve shows the tallest peak at 79.3° C. with a peak area of 94.6 percent. Both of these values are consistent with a resin that is high in density. The delta between the DSC Tm and the Tcrystaf is 44.6° C.

The DSC curve for the polymer of comparative F shows a peak with a 124.8° C. melting point (Tm) with a heat of fusion of 90.4 J/g. The corresponding CRYSTAF curve shows the tallest peak at 77.6° C. with a peak area of 19.5 percent. The separation between the two peaks is consistent with the presence of both a high crystalline and a low crystalline polymer. The delta between the DSC Tm and the Tcrystaf is 47.2° C.

Physical Property Testing

Polymer samples are evaluated for physical properties such as high temperature resistance properties, as evidenced by TMA temperature testing, pellet blocking strength, high temperature recovery, high temperature compression set and storage modulus ratio, G'(25° C.)/G'(100° C.). Several commercially available polymers are included in the tests: Comparative G* is a substantially linear ethylene/1-octene copolymer (AFFINITY®), available from The Dow Chemical Company), Comparative H* is an elastomeric, substantially linear ethylene/1-octene copolymer (AFFINITY®EG8100, available from The Dow Chemical Company), Comparative I is a substantially linear ethylene/1-octene copolymer (AFFINITY®PL1840, available from The Dow Chemical Company), Comparative J is a hydrogenated styrene butadiene/styrene triblock copolymer (KRATON™ G1652, available from KRATON Polymers), Comparative K is a thermoplastic vulcanizate (TPV, a polyolefin blend containing dispersed therein a crosslinked elastomer). Results are presented in Table 4.

TABLE 4

High Temperature Mechanical Properties

| Ex. | TMA-1 mm penetration (° C.) | Pellet Blocking Strength lb/ft$^2$ (kPa) | G' (25° C.)/ G' (100° C.) | 300% Strain Recovery (80° C.) (percent) | Compression Set (70° C.) (percent) |
|---|---|---|---|---|---|
| D* | 51 | — | 9 | Failed | — |
| E* | 130 | — | 18 | — | — |
| F* | 70 | 141 (6.8) | 9 | Failed | 100 |
| 5 | 104 | 0 (0) | 6 | 81 | 49 |
| 6 | 110 | — | 5 | — | 52 |
| 7 | 113 | — | 4 | 84 | 43 |
| 8 | 111 | — | 4 | Failed | 41 |
| 9 | 97 | — | 4 | — | 66 |
| 10 | 108 | — | 5 | 81 | 55 |
| 11 | 100 | — | 8 | — | 68 |
| 12 | 88 | — | 8 | — | 79 |
| 13 | 95 | — | 6 | 84 | 71 |
| 14 | 125 | — | 7 | — | — |
| 15 | 96 | — | 5 | — | 58 |
| 16 | 113 | — | 4 | — | 42 |
| 17 | 108 | 0 (0) | 4 | 82 | 47 |
| 18 | 125 | — | 10 | — | — |
| 19 | 133 | — | 9 | — | — |
| G* | 75 | 463 (22.2) | 89 | Failed | 100 |
| H* | 70 | 213 (10.2) | 29 | Failed | 100 |
| I* | 111 | — | 11 | — | — |
| J* | 107 | — | 5 | Failed | 100 |
| K* | 152 | — | 3 | — | 40 |

In Table 4, Comparative F (which is a physical blend of the two polymers resulting from simultaneous polymerizations using catalyst A1 and B1) has a 1 mm penetration temperature of about 70° C., while Examples 5-9 have a 1 mm penetration temperature of 100° C. or greater. Further, examples 10-19 all have a 1 mm penetration temperature of greater than 85° C., with most having 1 mm TMA temperature of greater than 90° C. or even greater than 100° C. This shows that the novel polymers have better dimensional stability at higher temperatures compared to a physical blend. Comparative J (a commercial SEBS) has a good 1 mm TMA temperature of about 107° C., but it has very poor (high temperature 70° C.) compression set of about 100 percent and it also failed to recover (sample broke) during a high temperature (80° C.) 300 percent strain recovery. Thus the exemplified polymers have a unique combination of properties unavailable even in some commercially available, high performance thermoplastic elastomers.

Similarly, Table 4 shows a low (good) storage modulus ratio, G'(25° C.)/G'(100° C.), for the inventive polymers of 6 or less, whereas a physical blend (Comparative F) has a storage modulus ratio of 9 and a random ethylene/octene copolymer (Comparative G) of similar density has a storage modulus ratio an order of magnitude greater (89). It is desirable that the storage modulus ratio of a polymer be as close to 1 as possible. Such polymers will be relatively unaffected by temperature, and fabricated articles made from such polymers can be usefully employed over a broad temperature range. This feature of low storage modulus ratio and temperature independence is particularly useful in elastomer applications such as in pressure sensitive adhesive formulations.

The data in Table 4 also demonstrate that the polymers of the invention possess improved pellet blocking strength. In particular, Example 5 has a pellet blocking strength of 0 MPa, meaning it is free flowing under the conditions tested, compared to Comparatives F and G which show considerable blocking. Blocking strength is important since bulk shipment of polymers having large blocking strengths can result in product clumping or sticking together upon storage or shipping, resulting in poor handling properties.

High temperature (70° C.) compression set for the inventive polymers is generally good, meaning generally less than about 80 percent, preferably less than about 70 percent and especially less than about 60 percent. In contrast, Comparatives F, G, H and J all have a 70° C. compression set of 100 percent (the maximum possible value, indicating no recovery). Good high temperature compression set (low numerical values) is especially needed for applications such as gaskets, window profiles, o-rings, and the like.

TABLE 5

Ambient Temperature Mechanical Properties

| Ex. | Flex Modulus (MPa) | Tensile Modulus (MPa) | Tensile Strength (MPa)[1] | Elongation at Break[1] (%) | Tensile Strength (MPa) | Elongation at Break (%) | Abrasion: Volume Loss (mm³) | Tensile Notched Tear Strength (mJ) | 100% Strain Recovery 21° C. (percent) | 300% Strain Recovery 21° C. (percent) | Retractive Stress at 150% Strain (kPa) | Compression Set 21° C. (Percent) | Stress Relaxation at 50% Strain[2] |
|---|---|---|---|---|---|---|---|---|---|---|---|---|---|
| D* | 12 | 5 | — | — | 10 | 1074 | — | — | 91 | 83 | 760 | — | — |
| E* | 895 | 589 | — | — | 31 | 1029 | — | — | — | — | — | — | — |
| F* | 57 | 46 | — | — | 12 | 824 | 93 | 339 | 78 | 65 | 400 | 42 | — |
| 5 | 30 | 24 | 14 | 951 | 16 | 1116 | 48 | — | 87 | 74 | 790 | 14 | 33 |
| 6 | 33 | 29 | — | — | 14 | 938 | — | — | — | 75 | 861 | 13 | — |
| 7 | 44 | 37 | 15 | 846 | 14 | 854 | 39 | — | 82 | 73 | 810 | 20 | — |
| 8 | 41 | 35 | 13 | 785 | 14 | 810 | 45 | 461 | 82 | 74 | 760 | 22 | — |
| 9 | 43 | 38 | — | — | 12 | 823 | — | — | — | — | — | 25 | — |
| 10 | 23 | 23 | — | — | 14 | 902 | — | — | 86 | 75 | 860 | 12 | — |
| 11 | 30 | 26 | — | — | 16 | 1090 | — | 976 | 89 | 66 | 510 | 14 | 30 |
| 12 | 20 | 17 | 12 | 961 | 13 | 931 | — | 1247 | 91 | 75 | 700 | 17 | — |
| 13 | 16 | 14 | — | — | 13 | 814 | — | 691 | 91 | — | — | 21 | — |
| 14 | 212 | 160 | — | — | 29 | 857 | — | — | — | — | — | — | — |
| 15 | 18 | 14 | 12 | 1127 | 10 | 1573 | — | 2074 | 89 | 83 | 770 | 14 | — |
| 16 | 23 | 20 | — | — | 12 | 968 | — | — | 88 | 83 | 1040 | 13 | — |
| 17 | 20 | 18 | — | — | 13 | 1252 | — | 1274 | 13 | 83 | 920 | 4 | — |
| 18 | 323 | 239 | — | — | 30 | 808 | — | — | — | — | — | — | — |
| 19 | 706 | 483 | — | — | 36 | 871 | — | — | — | — | — | — | — |
| G* | 15 | 15 | — | — | 17 | 1000 | — | 746 | 86 | 53 | 110 | 27 | 50 |
| H* | 16 | 15 | — | — | 15 | 829 | — | 569 | 87 | 60 | 380 | 23 | — |
| I* | 210 | 147 | — | — | 29 | 697 | — | — | — | — | — | — | — |
| J* | — | — | — | — | 32 | 609 | — | — | 93 | 96 | 1900 | 25 | — |
| K* | — | — | — | — | — | — | — | — | — | — | — | 30 | — |

[1]Tested at 51 cm/minute
[2]measured at 38° C. for 12 hours

Table 5 shows results for mechanical properties for the new polymers as well as for various comparison polymers at ambient temperatures. It may be seen that the inventive polymers have very good abrasion resistance when tested according to ISO 4649, generally showing a volume loss of less than about 90 mm³, preferably less than about 80 mm³, and especially less than about 50 mm³. In this test, higher numbers indicate higher volume loss and consequently lower abrasion resistance.

Tear strength as measured by tensile notched tear strength of the inventive polymers is generally 1000 mJ or higher, as shown in Table 5. Tear strength for the inventive polymers can be as high as 3000 mJ, or even as high as 5000 mJ. Comparative polymers generally have tear strengths no higher than 750 mJ.

Table 5 also shows that the polymers of the invention have better retractive stress at 150 percent strain (demonstrated by higher retractive stress values) than some of the comparative samples. Comparative Examples F, G and H have retractive stress value at 150 percent strain of 400 kPa or less, while the inventive polymers have retractive stress values at 150 percent strain of 500 kPa (Ex. 11) to as high as about 1100 kPa (Ex. 17). Polymers having higher than 150 percent retractive stress values would be quite useful for elastic applications, such as elastic fibers and fabrics, especially nonwoven fabrics. Other applications include diaper, hygiene, and medical garment waistband applications, such as tabs and elastic bands.

Table 5 also shows that stress relaxation (at 50 percent strain) is also improved (less) for the inventive polymers as compared to, for example, Comparative G. Lower stress relaxation means that the polymer retains its force better in applications such as diapers and other garments where retention of elastic properties over long time periods at body temperatures is desired.

Optical Testing

TABLE 6

Polymer Optical Properties

| EX. | Internal Haze (percent) | Clarity (percent) | 45° Gloss (percent) |
|---|---|---|---|
| F* | 84 | 22 | 49 |
| G* | 5 | 73 | 56 |
| 5 | 13 | 72 | 60 |
| 6 | 33 | 69 | 53 |
| 7 | 28 | 57 | 59 |
| 8 | 20 | 65 | 62 |
| 9 | 61 | 38 | 49 |
| 10 | 15 | 73 | 67 |
| 11 | 13 | 69 | 67 |
| 12 | 8 | 75 | 72 |
| 13 | 7 | 74 | 69 |
| 14 | 59 | 15 | 62 |
| 15 | 11 | 74 | 66 |
| 16 | 39 | 70 | 65 |
| 17 | 29 | 73 | 66 |
| 18 | 61 | 22 | 60 |
| 19 | 74 | 11 | 52 |
| G* | 5 | 73 | 56 |
| H* | 12 | 76 | 59 |
| I* | 20 | 75 | 59 |

The optical properties reported in Table 6 are based on compression molded films substantially lacking in orientation. Optical properties of the polymers may be varied over wide ranges, due to variation in crystallite size, resulting from variation in the quantity of chain shuttling agent employed in the polymerization.

Extractions of Multi-Block Copolymers

Extraction studies of the polymers of examples 5, 7 and Comparative E are conducted. In the experiments, the polymer sample is weighed into a glass fritted extraction thimble and fitted into a Kumagawa type extractor. The extractor with sample is purged with nitrogen, and a 500 mL round bottom flask is charged with 350 mL of diethyl ether. The flask is then fitted to the extractor. The ether is heated while being stirred. Time is noted when the ether begins to condense into the thimble, and the extraction is allowed to proceed under nitrogen for 24 hours. At this time, heating is stopped and the solution is allowed to cool. Any ether remaining in the extractor is returned to the flask. The ether in the flask is evaporated under vacuum at ambient temperature, and the resulting solids are purged dry with nitrogen. Any residue is transferred to a weighed bottle using successive washes of hexane. The combined hexane washes are then evaporated with another nitrogen purge, and the residue dried under vacuum overnight at 40° C. Any remaining ether in the extractor is purged dry with nitrogen.

A second clean round bottom flask charged with 350 mL of hexane is then connected to the extractor. The hexane is heated to reflux with stirring and maintained at reflux for 24 hours after hexane is first noticed condensing into the thimble. Heating is then stopped and the flask is allowed to cool. Any hexane remaining in the extractor is transferred back to the flask. The hexane is removed by evaporation under vacuum at ambient temperature, and any residue remaining in the flask is transferred to a weighed bottle using successive hexane washes. The hexane in the flask is evaporated by a nitrogen purge, and the residue is vacuum dried overnight at 40° C.

The polymer sample remaining in the thimble after the extractions is transferred from the thimble to a weighed bottle and vacuum dried overnight at 40° C. Results are contained in Table 7.

B 300 mm×7.5 mm columns placed in series and heated to 160° C. A Polymer Labs ELS 1000 Detector is used with the Evaporator set to 250° C., the Nebulizer set to 165° C., and the nitrogen flow rate set to 1.8 SLM at a pressure of 60-80 psi (400-600 kPa) N2. The polymer samples are heated to 160° C. and each sample injected into a 250 μl loop using the liquid-handling robot and a heated needle. Serial analysis of the polymer samples using two switched loops and overlapping injections are used. The sample data is collected and analyzed using Symyx Epoch™ software. Peaks are manually integrated and the molecular weight information reported uncorrected against a polystyrene standard calibration curve.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Standard CRYSTAF Method

Branching distributions are determined by crystallization analysis fractionation (CRYSTAF) using a CRYSTAF 200 unit commercially available from PolymerChar, Valencia, Spain. The samples are dissolved in 1,2,4 trichlorobenzene at 160° C. (0.66 mg/mL) for 1 hr and stabilized at 95° C. for 45 minutes. The sampling temperatures range from 95 to 30° C. at a cooling rate of 0.2° C./min. An infrared detector is used to measure the polymer solution concentrations. The cumulative soluble concentration is measured as the polymer crystallizes while the temperature is decreased. The analytical derivative of the cumulative profile reflects the short chain branching distribution of the polymer.

TABLE 7

| Sample | wt. (g) | ether soluble (g) | ether soluble (percent) | $C_8$ mole percent[1] | hexane soluble (g) | hexane soluble (percent) | $C_8$ mole percent[1] | residue $C_8$ mole percent[1] |
|---|---|---|---|---|---|---|---|---|
| Comp. F* | 1.097 | 0.063 | 5.69 | 12.2 | 0.245 | 22.35 | 13.6 | 6.5 |
| Ex. 5 | 1.006 | 0.041 | 4.08 | — | 0.040 | 3.98 | 14.2 | 11.6 |
| Ex. 7 | 1.092 | 0.017 | 1.59 | 13.3 | 0.012 | 1.10 | 11.7 | 9.9 |

[1]Determined by $^{13}$C NMR

Testing Methods

In the foregoing characterizing disclosure and the examples that follow, the following analytical techniques are employed:

GPC Method for Samples 1-4 and A-C

An automated liquid-handling robot equipped with a heated needle set to 160° C. is used to add enough 1,2,4-trichlorobenzene stabilized with 300 ppm Ionol to each dried polymer sample to give a final concentration of 30 mg/mL. A small glass stir rod is placed into each tube and the samples are heated to 160° C. for 2 hours on a heated, orbital-shaker rotating at 250 rpm. The concentrated polymer solution is then diluted to 1 mg/ml using the automated liquid-handling robot and the heated needle set to 160° C.

A Symyx Rapid GPC system is used to determine the molecular weight data for each sample. A Gilson 350 pump set at 2.0 ml/min flow rate is used to pump helium-purged 1,2-dichlorobenzene stabilized with 300 ppm Ionol as the mobile phase through three Plgel 10 micrometer (μm) Mixed The CRYSTAF peak temperature and area are identified by the peak analysis module included in the CRYSTAF Software (Version 2001.b, PolymerChar, Valencia, Spain). The CRYSTAF peak finding routine identifies a peak temperature as a maximum in the dW/dT and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

DSC Standard Method (Excluding Samples 1-4 and A-C)

Differential Scanning Calorimetry results are determined using a TAI model Q1000 DSC equipped with an RCS cooling accessory and an autosampler. A nitrogen purge gas flow of 50 ml/min is used. The sample is pressed into a thin film and melted in the press at about 175° C. and then air-cooled to room temperature (25° C.). 3-10 mg Of material is then cut into a 6 mm diameter disk, accurately weighed, placed in a light aluminum pan (ca 50 mg), and then crimped shut. The thermal behavior of the sample is investigated with the following temperature profile. The sample is rapidly heated to 180° C. and held isothermal for 3 minutes in order to remove any previous thermal history. The sample is then cooled to −40° C. at 10° C./min cooling rate and held at −40° C. for 3 minutes. The sample is then heated to 150° C. at 10° C./min. heating rate. The cooling and second heating curves are recorded.

The DSC melting peak is measured as the maximum in heat flow rate (W/g) with respect to the linear baseline drawn between −30° C. and end of melting. The heat of fusion is measured as the area under the melting curve between −30° C. and the end of melting using a linear baseline.

Abrasion Resistance

Abrasion resistance is measured on compression molded plaques according to ISO 4649. The average value of 3 measurements is reported. Plaques for the test are 6.4 mm thick and compression molded using a hot press (Carver Model #4095-4PR1001R). The pellets are placed between polytetrafluoroethylene sheets, heated at 190° C. at 55 psi (380 kPa) for 3 minutes, followed by 1.3 MPa for 3 minutes, and then 2.6 MPa for 3 minutes. Next the plaques are cooled in the press with running cold water at 1.3 MPa for 1 minute and removed for testing.

GPC Method (For All Samples, Including AA-DD, but Excluding Samples 1-4 and A-C)

The gel permeation chromatographic system consists of either a Polymer Laboratories Model PL-210 or a Polymer Laboratories Model PL-220 instrument. The column and carousel compartments are operated at 140 oC. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1.000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): Mpolyethylene=0.431(Mpolystyrene).

Polyetheylene equivalent molecular weight calculations are performed using Viscotek TriSEC software Version 3.0.

Compression Set

Compression set is measured according to ASTM D 395. The sample is prepared by stacking 25.4 mm diameter round discs of 3.2 mm, 2.0 mm, and 0.25 mm thickness until a total thickness of 12.7 mm is reached. The discs are cut from 12.7 cm×12.7 cm compression molded plaques molded with a hot press under the following conditions: zero pressure for 3 min at 190° C., followed by 86 MPa for 2 min at 190° C., followed by cooling inside the press with cold running water at 86 MPa.

Density

Samples for density measurement are prepared according to ASTM D 1928. Measurements are made within one hour of sample pressing using ASTM D792, Method B.

Flexural/Secant Modulus/Storage Modulus

Samples are compression molded using ASTM D 1928. Flexural and 2 percent secant moduli are measured according to ASTM D-790. Storage modulus is measured according to ASTM D 5026-01 or equivalent technique.

Optical Properties

Films of 0.4 mm thickness are compression molded using a hot press (Carver Model #4095-4PR1001R). The pellets are placed between polytetrafluoroethylene sheets, heated at 190° C. at 55 psi (380 kPa) for 3 min, followed by 1.3 MPa for 3 min, and then 2.6 MPa for 3 min. The film is then cooled in the press with running cold water at 1.3 MPa for 1 min. The compression molded films are used for optical measurements, tensile behavior, recovery, and stress relaxation.

Clarity is measured using BYK Gardner Haze-gard as specified in ASTM D 1746.

45° gloss is measured using BYK Gardner Glossmeter Microgloss 45° as specified in ASTM D-2457.

Internal haze is measured using BYK Gardner Haze-gard based on ASTM D 1003 Procedure A. Mineral oil is applied to the film surface to remove surface scratches.

Mechanical Properties—Tensile, Hysteresis, and Tear

Stress-strain behavior in uniaxial tension is measured using ASTM D 1708 microtensile specimens. Samples are stretched with an Instron at 500% min−1 at 21° C. Tensile strength and elongation at break are reported from an average of 5 specimens.

100%, 150%, and 300% Hysteresis are determined from cyclic loading to 100%, 150%, and 300% strains using ASTM D 1708 microtensile specimens with an Instron™ instrument. The sample is loaded and unloaded at 267% min−1 for 3 cycles at 21° C. Cyclic experiments at 300% and 80° C. are conducted using an environmental chamber. In the 80° C. experiment, the sample is allowed to equilibrate for 45 minutes at the test temperature before testing. In the 21° C., 300% strain cyclic experiment, the retractive stress at 150% strain from the first unloading cycle is recorded. Percent recovery for all experiments are calculated from the first unloading cycle using the strain at which the load returned to the base line. The percent recovery is defined as:

$$\% \text{ Recovery} = \frac{\varepsilon_f - \varepsilon_s}{\varepsilon_f} \times 100$$

where $\varepsilon_f$ is the strain taken for cyclic loading and $\varepsilon_s$ is the strain where the load returns to the baseline during the 1st unloading cycle. Permanent set is defined as $\varepsilon_s$.

Stress relaxation is measured at 50 percent strain and 37° C. for 12 hours using an Instron™ instrument equipped with an environmental chamber. The gauge geometry was 76 mm×25 mm×0.4 mm. After equilibrating at 37° C. for 45 min in the environmental chamber, the sample was stretched to 50% strain at 333% min−1. Stress was recorded as a function of time for 12 hours. The percent stress relaxation after 12 hours was calculated using the formula:

$$\% \text{ Stress Relaxation} = \frac{L_0 - L_{12}}{L_0} \times 100$$

where L0 is the load at 50% strain at 0 time and L12 is the load at 50 percent strain after 12 hours.

Tensile notched tear experiments are carried out on samples having a density of 0.88 g/cc or less using an Instron™ instrument. The geometry consists of a gauge section of 76 mm×13 mm×0.4 mm with a 2 mm notch cut into the sample at half the specimen length. The sample is stretched at 508 mm min−1 at 21° C. until it breaks. The tear energy is calculated as the area under the stress-elongation curve up to strain at maximum load. An average of at least 3 specimens are reported.

TMA

Thermal Mechanical Analysis (Penetration Temperature) is conducted on 30 mm diameter×3.3 mm thick, compression molded discs, formed at 180° C. and 10 MPa molding pressure for 5 minutes and then air quenched. The instrument used is a TMA 7, brand available from Perkin-Elmer. In the test, a probe with 1.5 mm radius tip (P/N N519-0416) is applied to the surface of the sample disc with 1N force. The temperature is raised at 5° C./min from 25° C. The probe penetration distance is measured as a function of temperature. The experiment ends when the probe has penetrated 1 mm into the sample.

DMA

Dynamic Mechanical Analysis (DMA) is measured on compression molded disks formed in a hot press at 180° C. at 10 MPa pressure for 5 minutes and then water cooled in the press at 90° C./min. Testing is conducted using an ARES controlled strain rheometer (TA instruments) equipped with dual cantilever fixtures for torsion testing.

A 1.5 mm plaque is pressed and cut in a bar of dimensions 32×12 mm. The sample is clamped at both ends between fixtures separated by 10 mm (grip separation □L) and subjected to successive temperature steps from −100° C. to 200° C. (5° C. per step). At each temperature the torsion modulus G' is measured at an angular frequency of 10 rad/s, the strain amplitude being maintained between 0.1 percent and 4 percent to ensure that the torque is sufficient and that the measurement remains in the linear regime.

An initial static force of 10 g is maintained (auto-tension mode) to prevent slack in the sample when thermal expansion occurs. As a consequence, the grip separation □L increases with the temperature, particularly above the melting or softening point of the polymer sample. The test stops at the maximum temperature or when the gap between the fixtures reaches 65 mm.

Pellet Blocking Strength

Pellets (150 g) are loaded into a 2" (5 cm) diameter hollow cylinder that is made of two halves held together by a hose clamp. A 2.75 lb (1.25 kg) load is applied to the pellets in the cylinder at 45° C. for 3 days. After 3 days, the pellets loosely consolidate into a cylindrical shaped plug. The plug is removed from the form and the pellet blocking force measured by loading the cylinder of blocked pellets in compression using an Instron™ instrument to measure the compressive force needed to break the cylinder into pellets.

Melt Index

Melt index, or I2, is measured in accordance with ASTM D 1238, Condition 190° C./2.16 kg. Melt index, or I10 is also measured in accordance with ASTM D 1238, Condition 190° C./10 kg.

ATREF

Analytical temperature rising elution fractionation (ATREF) analysis is conducted according to the method described in U.S. Pat. No. 4,798,081. The composition to be analyzed is dissolved in trichlorobenzene and allowed to crystallize in a column containing an inert support (stainless steel shot) by slowly reducing the temperature to 20° C. at a cooling rate of 0.1° C./min. The column is equipped with an infrared detector. An ATREF chromatogram curve is then generated by eluting the crystallized polymer sample from the column by slowly increasing the temperature of the eluting solvent (trichlorobenzene) from 20 to 120° C. at a rate of 1.5° C./min.

Polymer Fractionation by TREF

Large-scale TREF fractionation is carried by dissolving 15-20 g of polymer in 2 liters of 1,2,4-trichlorobenzene (TCB) by stirring for 4 hours at 160° C. The polymer solution is forced by 15 psig (100 kPa) nitrogen onto a 3 inch by 4 foot (7.6 cm×12 cm) steel column packed with a 60:40 (v:v) mix of 30-40 mesh (600-425 μm) spherical, technical quality glass beads (available from Potters Industries, HC 30 Box 20, Brownwood, Tex., 76801) and stainless steel, 0.028" (0.7 mm) diameter cut wire shot (available form Pellets, Inc. 63 Industrial Drive, North Tonawanda, N.Y., 14120). The column is immersed in a thermally controlled oil jacket, set initially to 160° C. The column is first cooled ballistically to 125° C., then slow cooled to 20° C. at 0.04° C. per minute and held for one hour. Fresh TCB is introduced at about 65 ml/min while the temperature is increased at 0.167° C. per minute.

Approximately 2000 ml portions of eluant from the preparative TREF column are collected in a 16 station, heated fraction collector. The polymer is concentrated in each fraction using a rotary evaporator until about 50 to 100 ml of the polymer solution remains. The concentrated solutions are allowed to stand overnight before adding excess methanol, filtering, and rinsing (approx. 300-500 ml of methanol including the final rinse). The filtration step is performed on a 3 position vacuum assisted filtering station using 5.0 μm polytetrafluoroethylene coated filter paper (available from Osmonics Inc., Cat# Z50WP04750). The filtrated fractions are dried overnight in a vacuum oven at 60° C. and weighed on an analytical balance before further testing.

13C NMR Analysis

The samples are prepared by adding approximately 3 g of a 50/50 mixture of tetrachloroethane-d2/orthodichlorobenzene to 0.4 g sample in a 10 mm NMR tube. The samples are dissolved and homogenized by heating the tube and its contents to 150° C. The data is collected using a JEOL Eclipse™ 400 MHz spectrometer or a Varian Unity Plus™ 400 MHz spectrometer, corresponding to a 13C resonance frequency of 100.5 MHz. The data is acquired using 4000 transients per data file with a 6 second pulse repetition delay. To achieve minimum signal-to-noise for quantitative analysis, multiple data files are added together. The spectral width is 25,000 Hz with a minimum file size of 32K data points. The samples are analyzed at 130° C. in a 10 mm broad band probe. The comonomer incorporation is determined using Randall's triad method (Randall, J. C.; JMS-Rev. Macromol. Chem. Phys., C29, 201-317 (1989).

Atomic Force Microscopy (AFM)

Sections are collected from the sample material using a Leica UCT™ microtome with a FC cryo-chamber operated at −80° C. A diamond knife is used to section all sample material to a thickness of 120 nm. Sections are placed on freshly cleaved mica surfaces, and mounted on standard AFM specimen metal support disks with a double carbon tape. The sections are examined with a DI NanoScope IV™ Multi- Mode AFM, in tapping mode with phase detection. Nanosensor tips are used in all experiments.

For nonwoven laminate structures, the following tensile test is used:

For the tensile test, 6 inch by 1 inch specimens can be cut from the samples. When appropriate, a direction such as machine direction (MD) or cross direction (CD) may be specified for samples which possess directionality due to the particular nature of the manufacturing process. These specimens can be then loaded into an Instron 5564 (Canton, Mass.) equipped with pneumatic grips and fitted with a 20 pound capacity tension load cell or a higher capacity load cell when loads exceed 20 pounds. After proper calibration of the load cell according to the manufacturer's instructions, the specimen is oriented parallel to the displacement direction of the crosshead and then gripped with a separation of 3 inches. The sample is then stretched to break at a rate of 500% per minute (111.25 mm/min). Strain or elongation is a quantity that is commonly used. It is described according to the following equation:

$$\text{Elongation}(\%) = \frac{L - L_0}{L_0} \times 100\%$$

such that $L_o$ is defined as the original length of 3 inches, L is the length of the sample at any point during the tensile test. The length of the sample and the corresponding force at the point just before complete breakage of the sample is noted. This point may or may not correspond to a local maximum in force. This point is also commonly described as elongation at break or strain at break.

For cast film, preferably the melt index of at least one layer, preferably the low crystallinity layer, is at least 1 g/10 min and more preferably from 2 to 20 g/10 min. For blown film, preferably at least one layer, preferably the low crystallinity layer, have melt indices of less than 5 g/10 min and more preferably less than 2 g/10 min. and as low as about 0.1 g/10 min.

The Article

One embodiment of the invention includes an article comprising a low crystallinity layer and a high crystallinity layer, the high crystallinity layer is often capable of undergoing plastic deformation upon elongation. "Elongation" is a uniaxial or biaxial stretching of the article to a degree sufficient to cause plastic deformation of the high crystallinity layer. Dimensional profile (surface roughness or corrugated-like structure) and increase in Haze value can be used by one of ordinary skill in the art to determine whether an article is plastically deformed. Haze is measured according to ASTM D1003 using a HazeGard PLUS Hazemeter available from BYK Gardner of Melville, N.Y., with a light source CIE Illuminant C. Plastically deformed articles according to the invention can have a Haze value of greater than about 70%, or greater than about 80%, or greater than about 90%. The plastically deformed articles have an increased haze value compared to the article prior to elongation. Though not limited by theory, the change (increase) in haze is thought to originate from an increase in surface roughness. Surface roughness is thought to originate from differential recovery behavior after deformation. Upon deformation, the high and low crystallinity layers are thought to extend similarly but upon release, there is differential recovery behavior between the higher and lower crystallinity layers. Lower recovery (higher set) of the higher crystallinity layer and the retractive force of the lower crystallinity layer is thought to produce a mechanical instability and result in a structure that can be described as corrugated, micro-undulated, micro-textured, or crenulated.

The surface roughness of the article can be measured by a number of instruments capable of precise surface roughness measurements. One such instrument is Surfcom 110B manufactured by Tokyo Seimitsu Company. The Surfcom instrument contains a diamond stylus which moves across the surface of the sample. The sample can range in hardness from metal to plastic to rubber. The instrument records the surface irregularities over the length traveled by the stylus. The surface roughness is quantified using a combination of three factors Ra (pm)—the arithmetic mean representing the departure of the extrudate surface profile from a mean line; Ry (m)—the sum of the height of the highest peak from a mean line and the depth of the deepest valley from a mean line; and Rz (um)—the sum of two means which are the average height of the five highest peaks from a mean line and the average depth of the five deepest valleys from a mean line. The combination of the Ra, Ry and Rz values characterize the surface profile of the film. By comparing the values of the non-elongated film against the values of the plastically deformed film, the increase in the roughness of the film surface, and thus the effectiveness of the orientation process, can be determined.

A pre-stretching or elongating step is optional, but preferable, and may be done on the article, one or more individual layers of the article such as the high crystallinity layer, the low crystallinity layer, or both, or may not be done at all. If being done to more than one layer, the pre-stretching may be done on each layer separately or on the layers together. Similarly, the stretching may be done in any direction.

In some embodiments, the article is elongated in at least one direction to at least about 100%, or at least about 150%, of its original length or width. Generally, the article is elongated at a temperature below the melting temperature of either of the low crystallinity polymer or high crystallinity polymer. This "pre-stretching" step is accomplished by any means known to those skilled in the art, especially however, they are particularly suited for MD (machine direction) and/or CD (cross direction) orientation activation methods including ring-rolling, MD orientation (MDO) rolls, etc., and a stretch-bonded lamination process. This stretching is a "pre-stretch" in the context that the film will again be likely stretched in its ultimate use, e.g., packaging or shipping applications, and diapers. This step may be performed on the articles of invention alone or on the articles of invention in laminate form or on some other form such as elastic nonwovens.

The article prior to being pre-stretched may have poor elastic and hysteresis characteristics due to the influence of the high crystallinity layer(s). However, upon elongating the article beyond the plastic deformation point of the high crystallinity layer(s), the elastic and hysteresis properties are improved, e.g., the effect of pre-stretching films above 50% strain results in subsequent lower permanent set.

Typically the article is formed using any fabrication process, such as an extrusion coated or cast film process, lamination processes, melt blown, spunbond, fiber extrusion, fiber spinning processes, separated or recovered from that process, and then pre-stretched. Preferably the article is pre-stretched after the article has solidified (more preferably, but not necessarily, crystallized). Operating at or above the melting point of the lower crystallinity layer is not favored for this invention as is typical, for example, in the double bubble orientation (Pahlke) process, and because generally it will not produce the desired structures. Preferably, the lower crystallinity layer has substantially achieved its maximum crystallinity before the pre-stretch procedure.

This invention is especially useful for film converters who must store the elastic film on rolls prior to assembly into laminate structures. A particular challenge for conventional elastic film is blocking. This invention serves to remedy this problem. This invention is also useful during conversion to reduce the coefficient of friction and to increase the bending stiffness of the film during conveyance, cutting, assembly, and other steps. Other applications include elastic diaper back-sheets, feminine hygiene films, elastic strips, elastic laminates in gowns, sheets and the like.

In one particular embodiment, the article is formed by co-extruding the low crystallinity layer and high crystallinity layer prior to elongation. The article can optionally be oriented in the machine direction (MD) or the transverse direction (TD) or both directions (biaxially) using conventional equipment and processes. Orientation can be carried in a separate step prior to the elongation step described below. Thus, an oriented article can be prepared as an intermediate product, which is then later elongated in a separate step. In this embodiment, the orientation is preferably carried out such that minimal plastic deformation of the high crystallinity layer occurs. Alternatively, orientation and elongation to plastic deformation can be carried out in a single step.

In some embodiments the low crystallinity layer is in contact or intimate contact with the high crystallinity layer. The term "in contact" means that there is sufficient interfacial adhesion provided by, for example, compatible crystallinity, such that adjacent polymeric layers do not delaminate, even after orientation and/or elongation. The term "in intimate contact" means that essentially one full planar surface of one layer is in an adhering relationship with a planar surface of another layer. Typically the two planar surfaces are co-terminus with one another. In certain embodiments the low crystallinity layer adheres to the high crystallinity layer through the use of conventional materials, such as adhesives.

"Planar surface" is used in distinction to "edge surface". If rectangular in shape or configuration, a film will comprise two opposing planar surfaces joined by four edge surfaces (two opposing pairs of edge surfaces, each pair intersecting the other pair at right angles). The bottom planar surface of the first skin layer is adapted to join or adhere to the top planar surface of the core layer, and the top planar surface of the second skin layer is adapted to join or adhere to the bottom planar surface of the core layer. In practice, the first and second skin layers are typically of the same composition and as such, are interchangeable. Likewise, the top and bottom planar surfaces of both the skin and core layers are functionally essentially the same and as such, each layer can be "flipped", i.e., the top planar surface can serve as the bottom planar surface, and vice versa. The films can be of any size and shape and as such, so can the planar and edge surfaces, e.g., thin or thick, polygonal or circular, etc. Typically, the film is in an extended ribbon form.

The films of this invention can be prepared by any conventional process, and often are formed by separately extruding the individual layers using conventional extrusion equipment, and then joining or laminating the respective planar surfaces of the individual layers to one another using conventional techniques and equipment, e.g., feeding the individual layers together in an aligned fashion through a set of pinch rollers.

The skin layers typically comprise less than 30 weight percent (wt %), preferably less than 20 wt % and more preferably less than 10 wt %, of a three-layer film consisting of one core layer and two skin layers. Each skin layer is typically the same as the other skin layer in thickness and weight although one skin layer can vary from the other in either or both measurements.

In another embodiment the article is a film wherein the high crystallinity layer forms a skin layer. In a different embodiment, the high crystallinity layer is intermediate to the low crystallinity layer and another type of skin layer, such as any conventional polymer layer. In yet another embodiment, high crystallinity layers are present on both sides of the low crystallinity layer. In this embodiment, the two high crystallinity layers can be the same or different in composition and the same or different in thickness. In yet another embodiment, the article includes, in sequence, a high crystallinity layer, a low crystallinity layer, and an additional low crystallinity layer. In this embodiment, the two low crystallinity layers can be the same or different in composition and the same or different in thickness. The article can comprise as many layers as desired.

The high crystallinity layer or one or more low crystallinity layers may also form a skin layer and be adapted to adhere by melting onto a substrate. Skin layers other than the high crystallinity and low crystallinity layer can also be adapted for melt adhesion onto a substrate.

Non-polymeric additives that can be added to one or more layers include, process oil, flow improvers, fire retardants, antioxidants, plasticizers, pigments, vulcanizing or curative agents, vulcanizing or curative accelerators, cure retarders, processing aids, flame retardants, tackifying resins, and the like. These compounds may include fillers and/or reinforcing materials. These include carbon black, clay, talc, calcium carbonate, mica, silica, silicate, and combinations of two or more of these materials. Other additives, which may be employed to enhance properties, include anti-blocking and coloring agents. Lubricants, mold release agents, nucleating agents, reinforcements, and fillers (including granular, fibrous, or powder-like) may also be employed. Nucleating agents and fillers tend to improve rigidity of the article. The exemplary lists provided above are not exhaustive of the various kinds and types of additives that can be employed with the present invention.

The overall thickness of the article is not particularly limited, but is typically less than 20 mil, often less than 10 mil. The thickness of any of the individual layers can vary widely, and are typically determined by process, use and economic considerations.

Low Crystallinity Layer

The low crystallinity layer has a level of crystallinity that can be detected by Differential Scanning Calorimetry (DSC), but it has elastomeric properties. The low crystallinity layer does not have substantial loss of its elastic properties, even after extension of the high crystallinity layer to and beyond the point of plastic deformation. The low crystallinity layer often comprises a low crystallinity polymer and, optionally, at least one additional polymer. Typically, the low crystallinity layer(s) comprises at least about 40, preferably at least about 50, more preferably at least about 60, preferably at least about 80 and up to about 98 weight percent of the total weight of the high and low crystallinity polymers.

Low Crystallinity Polymer

The low crystallinity polymer of the present invention is a soft, elastic polymer that often has a low to moderate level of crystallinity. In a particular embodiment, the low crystallinity polymer is an ethylene/α-olefin multi-block interpolymers employed in the present invention are a unique class of compounds that are further defined and discussed in Copending PCT Application No. PCT/US2005/008917, filed on Mar. 17, 2005 and published on Sep. 29, 2005 as WO/2005/090427, which in turn claims priority to U.S. Provisional Application No. 60/553,906, filed Mar. 17, 2004. The low crystallinity polymer may also be a copolymer of propylene and one or more comonomers selected from ethylene, C4-C12 alpha-olefins, and combinations of two or more such comonomers. In a particular aspect of this embodiment, the low crystallinity polymer includes units derived from the one or more comonomers in an amount ranging from a lower limit of about 2%, 5%, 6%, 8%, or 10% by weight to an upper limit of about 60%, 50%, or 45% by weight. These percentages by weight are based on the total weight of the ethylene-derived and comonomer-derived units, i.e., based on the sum of weight percent ethylene-derived units and weight percent comonomer-derived units equaling 100%.

Embodiments of the invention include low crystallinity polymers having a heat of fusion, as determined by DSC, ranging from a lower limit of about 1 Joules/gram (J/g), or 3 J/g, or 5 J/g, or 10 J/g, or 15 J/g, to an upper limit of about 125 J/g, or 100 J/g, or 75 J/g, or 57 J/g, or 50 J/g, or 47 J/g, or 37 J/g, or 30 J/g. "Heat of fusion" is measured using DSC.

The crystallinity of the low crystallinity polymer may also be expressed in terms of crystallinity percent. The thermal energy for 100% crystalline polypropylene is taken to be 165 J/g., and for 100% crystalline polyethylene is 292 J/gm. That is, 100% crystallinity is taken as being equal to 165 J/g for polypropylene and 292 J/gm for polyethylene.

The level of crystallinity may be reflected in the melting point. "Melting point" is determined by DSC as previously discussed. The low crystallinity polymer, according to an embodiment of the invention has one or more melting points. The peak having the highest heat flow (i.e., tallest peak height) of these peaks is considered the melting point. The low crystallinity polymer can have a melting point determined by DSC ranging from an upper limit of about 135 C, or 130 C, to a lower limit of about 20 C, or 25 C, or 30 C, or 35 C, or 40 C or 45 C. The low crystallinity polymer can have a crystallization peak temperature determined by DSC ranging from an upper limit of about 120 C, or 110 C, to a lower limit of about 0 C, 30 C, or 50 C, or 60 C.

The low crystallinity polymer can have a weight average molecular weight (Mw) of from about 10,000 to about 5,000,000 g/mol, or from about 20,000 to about 1,000,000 g/mol, or from about 80,000 to about 500,000 g/mol and a molecular weight distribution Mw/Mn (MWD), sometimes referred to as a "polydispersity index" (PDI), ranging from a lower limit of about 1.5 or 1.8 to an upper limit of about 40 or 20 or 10 or 5 or 3.

In some embodiments of the invention, the low crystallinity polymer has a Mooney viscosity ML(1+4)125 C of about 100 or less, or 75 or less, or less, or 30 or less. Mooney viscosity is measured as ML(1+4)125° C. according to ASTM D1646 unless otherwise specified.

Additional Polymers

In some embodiments, the low crystallinity layer optionally comprises one or more additional polymers. The optional additional polymer can be the same or different from the high crystallinity polymer of the high crystallinity layer. In a particular embodiment, the additional polymer has a crystallinity between the crystallinity of the low crystallinity polymer and the high crystallinity polymer.

In a particular embodiment, the low crystallinity layer is a blend comprising a continuous phase including the low crystallinity polymer described above and a dispersed phase including a relatively more crystalline additional polymer. Minor amounts of the additional polymer may be present in the continuous phase. In a particular aspect of this embodiment, the dispersed phase is composed of individual domains less than 50 microns in diameter. In some embodiments, these individual domains of the dispersed phase can be maintained during processing even without cross-linking.

In one embodiment, the additional polymer is a propylene copolymer of ethylene, a C4-C20 α-olefin, or combinations thereof, wherein the amount of ethylene and/or C4-C20 α-olefin(s) present in the additional polymer is less than the amount of ethylene and/or C4-C20 α-olefin(s) present in the low crystallinity polymer.

In one embodiment, the low crystallinity layer is a blend comprising from about 2% to about 95% by weight of an additional polymer and from about 5% to about 98% by weight of the low crystallinity polymer based on the total weight of the blend, in which the additional polymer is more crystalline than the low crystallinity polymer. In a particular aspect of this embodiment, the additional polymer is present in the blend in an amount of from a lower limit of about 2% or 5% to an upper limit of about 30% or 20% or 15% by weight based on the total weight of the blend.

High Crystallinity Layer

The high crystallinity layer has a level of crystallinity sufficient to permit yield and plastic deformation during elongation and/or to have non-tacky or non-blocky characteristics. The high crystallinity layer can be oriented in the machine, cross (transverse) or oblique direction only, or in two or more of these directions as can be detected by microscopy. The orientation can lead to subsequent frangibility of the high crystallinity layer. Typically, the high crystallinity layer(s) comprises less than about 60, preferably less than about 50, more preferably less than about 40, and can be as low as about 2 weight percent of the total weight of the high and low crystallinity layers.

High Crystallinity Polymer

The high crystallinity layer often includes a high crystallinity polymer. The high crystallinity polymers of the present invention are defined as polymeric components, including blends, that include homopolymers or copolymers of ethylene or propylene or an alpha-olefin having 12 carbon atoms or less with minor olefinic monomers that include linear, branched, or ring-containing C3 to C30 olefins, capable of insertion polymerization, or combinations of such olefins. In one embodiment, the amount of alpha-olefin in the copolymer has an upper range of about 9 wt %, or 8 wt %, or 6 wt %, and a lower range of about 2 wt %, based on the total weight of the high crystallinity polymer.

Examples of minor olefinic monomers include, but are not limited to C2 to C20 linear or branched alpha-olefins, such as ethylene, propylene, 1-butene, 1-hexene, 1-octene, 4-methyl-1-pentene, 3-methyl-1-pentene, and 3,5,5-trimethyl-1-hexene, and ring-containing olefinic monomers containing up to 30 carbon atoms such as cyclopentene, vinylcyclohexane, vinylcyclohexene, norbornene, and methyl norbornene.

Suitable aromatic-group-containing monomers can contain up to 30 carbon atoms and can comprise at least one aromatic structure, such as a phenyl, indenyl, fluorenyl, or naphthyl moiety. The aromatic-group- containing monomer further includes at least one polymerizable double bond such that after polymerization, the aromatic structure will be pendant from the polymer backbone. The polymerizable olefinic moiety of the aromatic-group containing monomer can be linear, branched, cyclic-containing, or a mixture of these structures. When the polymerizable olefinic moiety contains a cyclic structure, the cyclic structure and the aromatic structure can share 0, 1, or 2 carbons. The polymerizable olefinic moiety and/or the aromatic group can also have from one to all of the hydrogen atoms substituted with linear or branched alkyl groups containing from 1 to 4 carbon atoms. Examples of aromatic monomers include, but are not limited to styrene, alpha-methylstyrene, vinyltoluenes, vinylnaphthalene, allyl benzene, and indene, especially styrene and allyl benzene.

In one embodiment, the high crystallinity polymer is a homopolymer or copolymer of polypropylene with isotactic propylene sequences or mixtures of such sequences. The polypropylene used can vary widely in form. The propylene component may be a combination of homopolymer polypropylene, and/or random, and/or block copolymers. In a particular embodiment, the high crystallinity polymer is copolymer of propylene and one or more comonomers selected from ethylene and C4 to C12 α-olefins. In a particular aspect of this embodiment, the comonomer is present in the copolymer in an amount of up to about 9% by weight, or from about 2% to about 8% by weight, or from about 2% to about 6% by weight, based on the total weight of the copolymer.

In another embodiment, the high crystallinity polymer is a homopolymer or copolymer of ethylene and one or more comonomers selected from C3 to C20 α-olefins. In a particular aspect of this embodiment, the comonomer is present in the copolymer in an amount of from about 0.5 wt % to about 25 wt % based on the total weight of the copolymer.

In certain embodiments of the invention, the high crystallinity polymer has a weight average molecular weight (Mw) of from about 10,000-5,000,000 g/mol, or from about 20,000-1,000,000 g/mol, or from about 80,000-500,000 g/mol and a molecular weight distribution Mw/Mn (sometimes referred to as a "polydispersity index" (PDI)) ranging from a lower limit of about 1.5-1.8 to an tipper limit of about 40 or 20 or 10 or 5 or 3.

In one embodiment, the high crystallinity polymer is produced with metallocene catalysis and displays narrow molecular weight distribution, meaning that the ratio of the weight average molecular weight to the number average molecular weight will be equal to or below about 4, most typically in the range of from about 1.7-4.0, preferably from about 1.8-2.8.

In another embodiment, the high crystallinity polymer is produced with a single site catalysis, although non-metallocene, and displays narrow molecular weight distribution, meaning that the ratio of the weight average molecular weight to the number average molecular weight will be equal to or below about 4, most typically in the range of from about 1.7-4.0, preferably from about 1.8-2.8.

In another embodiment, the high crystallinity polymer is produced with a Ziegler-Natta or chrome catalysis, and displays medium to broad molecular weight distribution, meaning that the ratio of the weight average molecular weight to the number average molecular weight will be equal to or below about 60, most typically in the range of from about 3.5-20, preferably from about 3.5-8.

The high crystallinity polymers of the present invention can optionally contain long chain branches. These can optionally be generated using one or more ☐,☐-dienes. Alternatively, the high crystallinity polymer may contain small quantities of at least one diene, and preferably at least one of the dienes is a non-conjugated diene to aid in the vulcanization or other chemical modification. The amount of diene is preferably no greater than about 10 wt %, more preferably no greater than about 5 wt %. Preferred dienes are those that are used for the vulcanization of ethylene/propylene rubbers including, but not limited to, ethylidene norbornene, vinyl norbornene, dicyclopentadiene, and 1,4-hexadiene.

Embodiments of the invention include high crystallinity polymers having a heat of fusion, as determined by DSC, with a lower limit of about 60 J/g, or 80 J/g. In one embodiment, the high crystallinity polymer has a heat of fusion higher than the heat of fusion of the low crystallinity polymer.

Embodiments of the invention include high crystallinity polymers having a melting point with a lower limit of about 70 C, 90 C, 100 C, or 110 C, or 115 C, or 120 C, or 130 C, and can be as high as about 300 C.

In one embodiment, the high crystallinity polymer has a higher crystallinity than the low crystallinity polymer. The degree of crystallinity can be determined based on the heat of fusion or density of the polymer components. In one embodiment, the low crystallinity polymer has a lower melting point than the high crystallinity polymer, and the additional polymer, if used, has a melting point between that of the low crystallinity polymer and that of the high crystallinity polymer. In another embodiment, the low crystallinity polymer has a lower heat of fusion than that of the high crystallinity polymer, and the additional polymer, if used, has a heat of fusion intermediate of the low crystallinity polymer and the high crystallinity polymer.

Compatible Crystallinity

In some embodiments the low crystallinity polymer and high crystallinity polymer have compatible crystallinity. Compatible crystallinity can be obtained by using polymers for the high crystallinity and low crystallinity layers that have the same crystallinity type, i.e., based on the same crystallizable sequence, such as ethylene sequences or propylene sequences, or the same stereo-regular sequences, i.e., isotactic or syndiotactic. For example, compatible crystallinity can be achieved by providing both layers with methylene sequences of sufficient length, as is achieved by the incorporation of ethylene derived units.

Compatible crystallinity can also be obtained by using polymers with stereo-regular alpha-olefin sequences. This may be achieved, for example, by providing either syndiotactic sequences or isotactic sequences in both layers.

For purposes of this invention, isotactic refers to a polymer sequence in which greater than 50% of adjacent monomers which have groups of atoms that are not part of the backbone structure are located either all above or all below the atoms in the backbone chain, when the latter are all in one plane.

For purposes of this invention, syndiotactic refers to a polymer sequence in which greater than 50% of adjacent monomers which have groups of atoms that are not part of the backbone structure are located in a symmetrical fashion above and below the atoms in the backbone chain, when the latter are all in one plane.

Fiber Applications

The polymers, layers, and articles of this invention have many useful applications. Representative examples in addition to those that are described elsewhere include mono- and multifilament fibers, staple fibers, binder fibers, spunbond fibers or melt blown fibers (using, e.g., systems as disclosed in U.S. Pat. Nos. 4,430,563, 4,663,220, 4,668,566 or 4,322,027), both woven and nonwoven fabrics, strapping, tape, monofilament, continuous filament (e.g., for use in apparel, upholstery) and structures made from such fibers (including, e.g., blends of these fibers with other fibers such as PET or cotton. Staple and filament fibers can be melt spun into the final fiber diameter directly without additional drawing, or they can be melt spun into a higher diameter and subsequently hot or cold drawn to the desired diameter using conventional fiber drawing techniques.

Crosslinking

Any of the polymers used in any layer of these inventions can be used in essentially the same manner as known polyolefins for the making and using of elastic fibers. In this regard, the polymers used this invention can include functional groups, such as a carbonyl, sulfide, silane radicals, etc., and can be crosslinked or uncrosslinked. If crosslinked, the polymers can be crosslinked using known techniques and materials with the understanding that not all crosslinking techniques and materials are effective on all polyolefins, e.g., while peroxide, azo and electromagnetic radiation (such as e-beam, UV, IR and visible light) techniques are all effective to at least a limited extent with polyethylenes, only some of these, e.g., e-beam, are effective with polypropylenes and then not necessarily to the same extent as with polyethylenes. The use of additives, promoters, etc., can be employed as desired.

"Substantially crosslinked" and similar terms generally mean that the polymer, shaped or in the form of an article, has xylene extractables of less than or equal to 70 weight percent (i.e., greater than or equal to 30 weight percent gel content), preferably less than or equal to 40 weight percent (i.e., greater than or equal to 60 weight percent gel content). Xylene extractables (and gel content) are determined in accordance with ASTM D-2765.

The elastic fibers, layers or polymers used in this invention can be cross-linked by any means known in the art, including, but not limited to, electron-beam irradiation, beta irradiation, gamma irradiation, corona irradiation, silanes, peroxides, allyl compounds and UV radiation with or without crosslinking catalyst. U.S. patent application Ser. No. 10/086,057 (published as US2002/0132923 A1) and U.S. Pat. No. 6,803,014 disclose electron-beam irradiation methods that can be used in embodiments of the invention. If crosslinking is to be employed on an article, the article is usually shaped before it is cross-linked.

Irradiation may be accomplished by the use of high energy, ionizing electrons, ultra violet rays, X-rays, gamma rays, beta particles and the like and combination thereof. Preferably, electrons are employed up to 70 megarads dosages. The irradiation source can be any electron beam generator operating in a range of about 150 kilovolts to about 6 megavolts with a power output capable of supplying the desired dosage. The voltage can be adjusted to appropriate levels which may be, for example, 100,000, 300,000, 1,000,000 or 2,000,000 or 3,000,000 or 6,000,000 or higher or lower. Many other apparati for irradiating polymeric materials are known in the art. The irradiation is usually carried out at a dosage between about 3 megarads to about 35 megarads, preferably between about 8 to about 20 megarads. Further, the irradiation can be carried out conveniently at room temperature, although higher and lower temperatures, for example 0° C. to about 60° C., may also be employed. Preferably, the irradiation is carried out after shaping or fabrication of the article. Also, in a preferred embodiment, the ethylene interpolymer which has been incorporated with a pro-rad additive is irradiated with electron beam radiation at about 8 to about 20 megarads.

Crosslinking can be promoted with a crosslinking catalyst, and any catalyst that will provide this function can be used. Suitable catalysts generally include organic bases, carboxylic acids, and organometallic compounds including organic titanates and complexes or carboxylates of lead, cobalt, iron, nickel, zinc and tin. Dibutyltindilaurate, dioctyltinmaleate, dibutyltindiacetate, dibutyltindioctoate, stannous acetate, stannous octoate, lead naphthenate, zinc caprylate, cobalt naphthenate; and the like. Tin carboxylate, especially dibutyltindilaurate and dioctyltinmaleate, are particularly effective for this invention. The catalyst (or mixture of catalysts) is present in a catalytic amount, typically between about 0.015 and about 0.035 phr.

Representative pro-rad additives include, but are not limited to, azo compounds, organic peroxides and polyfunctional vinyl or allyl compounds such as, for example, triallyl cyanurate, triallyl isocyanurate, pentaerthritol tetramethacrylate, glutaraldehyde, ethylene glycol dimethacrylate, diallyl maleate, dipropargyl maleate, dipropargyl monoallyl cyanurate, dicumyl peroxide, di-tert-butyl peroxide, t-butyl perbenzoate, benzoyl peroxide, cumene hydroperoxide, t-butyl peroctoate, methyl ethyl ketone peroxide, 2,5-dimethyl-2,5-di(t-butyl peroxy)hexane, lauryl peroxide, tert-butyl peracetate, azobisisobutyl nitrite and the like and combination thereof. Preferred pro-rad additives for use in the present invention are compounds which have poly-functional (i.e. at least two) moieties such as C=C, C=N or C=O.

At least one pro-rad additive can be introduced to the ethylene interpolymer by any method known in the art. However, preferably the pro-rad additive(s) is introduced via a masterbatch concentrate comprising the same or different base resin as the ethylene interpolymer. Preferably, the pro-rad additive concentration for the masterbatch is relatively high e.g., about 25 weight percent (based on the total weight of the concentrate).

The at least one pro-rad additive is introduced to the ethylene polymer in any effective amount. Preferably, the at least one pro-rad additive introduction amount is from about 0.001 to about 5 weight percent, more preferably from about 0.005 to about 2.5 weight percent and most preferably from about 0.015 to about 1 weight percent (based on the total weight of the ethylene interpolymer.

In addition to electron-beam irradiation, crosslinking can also be effected by UV irradiation. U.S. Pat. No. 6,709,742 discloses a cross-linking method by UV irradiation which can be used in embodiments of the invention. The method comprises mixing a photoinitiator, with or without a photocrosslinker, with a polymer before, during, or after a fiber is formed and then exposing the fiber with the photoinitiator to sufficient UV radiation to crosslink the polymer to the desired level. The photoinitiators used in the practice of the invention are aromatic ketones, e.g., benzophenones or monoacetals of 1,2-diketones. The primary photoreaction of the monacetals is the homolytic cleavage of the α-bond to give acyl and dialkoxyalkyl radicals. This type of α-cleavage is known as a Norrish Type I reaction which is more fully described in W. Horspool and D. Armesto, Organic Photochemistry: *A Comprehensive Treatment*, Ellis Horwood Limited, Chichester, England, 1992; J. Kopecky, *Organic Photochemistry: A Vistual Approach*, VCH Publishers. Inc., New York, N.Y. 1992; N. J. Turro, et al., *Acc. Chem. Res.*, 1972, 5, 92; and J. T. Banks, et al., *J. Am. Chem. Soc.*, 1993, 115, 2473. The synthesis of monoacetals of aromatic 1,2 diketones, Ar—CO—C(OR)$_2$—Ar' is described in U.S. Pat. No. 4,190,602 and Ger. Offen. 2,337,813. The preferred compound from this class is 2,2-dimethoxy-2-phenylacetophenone, $C_6H_5$—CO—C(OCH$_3$)$_2$—$C_6H_5$, which is commercially available from Ciba-Geigy as Irgacure 651. Examples of other aromatic ketones useful in the practice of this invention as photoinitiators are Irgacure 184, 369, 819, 907 and 2959, all available from Ciba-Geigy.

In one embodiment, the photoinitiator is used in combination with a photocrosslinker. Any photocrosslinker that will upon the generation of free radicals, link two or more polyolefin backbones together through the formation of covalent bonds with the backbones can be used in this invention. Preferably these photocrosslinkers are polyfunctional, i.e., they comprise two or more sites that upon activation will form a covalent bond with a site on the backbone of the polymer. Representative photocrosslinkers include, but are not limited to polyfunctional vinyl or allyl compounds such as, for example, triallyl cyanurate, triallyl isocyanurate, pentaerthritol tetramethacrylate, ethylene glycol dimethacrylate, diallyl maleate, dipropargyl maleate, dipropargyl monoallyl cyanurate and the like. Preferred photocrosslinkers for use in the present invention are compounds which have polyfunctional (i.e. at least two) moieties. Particularly preferred photocrosslinkers are triallycyanurate (TAC) and triallylisocyanurate (TAIC).

Certain compounds act as both a photoinitiator and a photocrosslinker in the practice of this invention. These compounds are characterized by the ability to generate two or more reactive species (e.g., free radicals, carbenes, nitrenes, etc.) upon exposure to UV-light and to subsequently covalently bond with two polymer chains. Any compound that can perform these two functions can be used in the practice of this invention, and representative compounds include the sulfonyl azides described in U.S. Pat. Nos. 6,211,302 and 6,284,842.

In another embodiment, the polymer, layer, or article is subjected to secondary crosslinking, i.e., crosslinking other than and in addition to photocrosslinking. In this embodiment, the photoinitiator is used either in combination with a nonphotocrosslinker, e.g., a silane, or the polymer is subjected to a secondary crosslinking procedure, e.g, exposure to E-beam radiation. Representative examples of silane crosslinkers are described in U.S. Pat. No. 5,824,718, and crosslinking through exposure to E-beam radiation is described in U.S. Pat. Nos. 5,525,257 and 5,324,576. The use of a photocrosslinker in this embodiment is optional.

At least one photoadditive, i.e., photoinitiator and optional photocrosslinker, can be introduced to the polymer by any method known in the art. However, preferably the photoadditive(s) is (are) introduced via a masterbatch concentrate comprising the same or different base resin as the polymer. Preferably the photoadditive concentration for the masterbatch is relatively high e.g., about 25 weight percent (based on the total weight of the concentrate).

The at least one photoadditive is introduced to the polymer in any effective amount. Preferably, the at least one photoadditive introduction amount is from about 0.001 to about 5, more preferably from about 0.005 to about 2.5 and most preferably from about 0.015 to about 1, wt % (based on the total weight of the polymer).

The photoinitiator(s) and optional photocrosslinker(s) can be added during different stages of the manufacturing process. If photoadditives can withstand the extrusion temperature, a polyolefin resin can be mixed with additives before being fed into the extruder, e.g., via a masterbatch addition. Alternatively, additives can be introduced into the extruder just prior the slot die, but in this case the efficient mixing of components before extrusion is important. In another approach, polyolefin fibers can be drawn without photoadditives, and a photoinitiator and/or photocrosslinker can be applied to the extruded fiber via a kiss-roll, spray, dipping into a solution with additives, or by using other industrial methods for post-treatment. The resulting fiber with photoadditive(s) is then cured via electromagnetic radiation in a continuous or batch process. The photo additives can be blended with the polyolefin using conventional compounding equipment, including single and twin-screw extruders.

The power of the electromagnetic radiation and the irradiation time are chosen so as to allow efficient crosslinking without polymer degradation and/or dimensional defects. The preferred process is described in EP 0 490 854 B1. Photoadditive(s) with sufficient thermal stability is (are) premixed with a polyolefin resin, extruded into a fiber, and irradiated in a continuous process using one energy source or several units linked in a series. There are several advantages to using a continuous process compared with a batch process to cure a fiber or sheet of a knitted fabric which are collected onto a spool.

Irradiation may be accomplished by the use of UV-radiation. Preferably, UV-radiation is employed up to the intensity of 100 J/cm$^2$. The irradiation source can be any UV-light generator operating in a range of about 50 watts to about 25000 watts with a power output capable of supplying the desired dosage. The wattage can be adjusted to appropriate levels which may be, for example, 1000 watts or 4800 watts or 6000 watts or higher or lower. Many other apparati for UV-irradiating polymeric materials are known in the art. The irradiation is usually carried out at a dosage between about 3 J/cm$^2$ to about 500 J/scm$^2$, preferably between about 5 J/cm$^2$ to about 100 J/cm$^2$. Further, the irradiation can be carried out conveniently at room temperature, although higher and lower temperatures, for example 0° C. to about 60° C., may also be employed. The photocrosslinking process is faster at higher temperatures. Preferably, the irradiation is carried out after shaping or fabrication of the article. In a preferred embodiment, the polymer which has been incorporated with a photoadditive is irradiated with UV-radiation at about 10 J/cm$^2$ to about 50 J/cm$^2$.

Applications of the Article

The articles of the present invention may be used in a variety of applications. These include those applications and manufacturing techniques described in U.S. Pat. Nos. 5,514,470 and 5,336,545. In one embodiment, the article is a film having at least two layers, which can be used in diaper backsheets and similar absorbent garments such as incontinent garments. In other embodiments, the article is in the form of a woven or nonwoven fabric, film/fabric laminate or fiber. The fabric may be woven or non-woven. The fiber can be of any size or shape, and it can be homogeneous or heterogeneous. If heterogeneous, then it can be either conjugate, bicomponent or biconstituent.

The core layer or layers of the film of this invention comprise a low crystalline ethylene/alpha-olefin multi-block copolymer. If the film of this invention comprises two or more core layers, then the composition of each core layer can be the same or different from the composition of the other core layer(s).

The skin layers of the film of this invention comprise a high crystalline, preferably non-tacky polyolefin homo- or copolymer. The composition of each skin layer can be the same or different from the composition of the other skin layer(s).

Preferably, the particular combination of core and skin layers is chosen to insure that the melting point of the skin polymer is not more than about 24 C greater, preferably not more than about 20 C greater, than the melting point of the core polymer with the lowest melting point.

Ethylene/α-olefin Multi-Block Interpolymer Component(s)

The articles of the present invention comprise an ethylene/α-olefin multi-block interpolymer. The ethylene/α-olefin multi-block interpolymer may be contained in the low crystallinity layer, the high crystallinity layer, or some other part of the article. The ethylene/α-olefin multi-block interpolymer may be present alone or in a blend with any other polymer.

The ethylene/α-olefin multi-block interpolymers employed in the present invention are a unique class of compounds that are further defined and discussed in copending PCT Application No. PCT/US2005/008917, filed on Mar. 17, 2005 and published on Sep. 29, 2005 as WO/2005/090427, which in turn claims priority to U.S. Provisional Application No. 60/553,906, filed Mar. 17, 2004. For purposes of United States patent practice, the contents of the provisional application and the PCT application are herein incorporated by reference in their entirety.

SPECIFIC EMBODIMENTS

Melt Flow Rate (MFR) and Melt Index (MI), as used herein, were measured by ASTM D-1238 at 230 C and 190 C, respectively, and both measurements used weight of 2.16 kg.

Blends of low crystallinity polymer and high crystallinity polymer and other components may be prepared by any procedure that guarantees an intimate mixture of the components. For example, the components can be combined by melt pressing the components together on a Carver press to a thickness of about 0.5 millimeter (20 mils) and a temperature of about 180 C, rolling up the resulting slab, folding the ends together, and repeating the pressing, rolling, and folding operation about 10 times. Internal mixers are particularly useful for solution or melt blending. Blending at a temperature of about 180-240 C in a Brabender Plastograph for about 1-20 minutes has been found satisfactory.

Still another method that may be used for admixing the components involves blending the polymers in a Banbury internal mixer above the flux temperature of all of the components, e.g., about 180 C for about 5 minutes. A complete mixture of the polymeric components is indicated by the uniformity of the morphology of the dispersion of low crystallinity polymer and high crystallinity polymer. Continuous mixing may also be used. These processes are well known in the art and include single and twin screw mixing extruders, static mixers for mixing molten polymer streams of low viscosity, impingement mixers, as well as other machines and processes, designed to disperse the low crystallinity polymer and the high crystallinity polymer in intimate contact. Those skilled in the art will be able to determine the appropriate procedure for blending of the polymers to balance the need for intimate mixing of the component ingredients with the desire for process economy. Still another method for admixing the components of blends using a Haake mixer above the flux temperature of all of the components, (e.g. 180° C. and set at 40 rpm rotor speed for about 3-5 minutes until torque reaches steady state). The sample can then be removed and allowed to cool.

Blend components are selected based on the morphology desired for a given application. The high crystallinity polymer can be co-continuous with the low crystallinity polymer in the film formed from the blend, however, a dispersed high crystallinity polymer phase in a continuous low crystallinity polymer phase is preferred. Those skilled in the art can select the volume fractions of the two components to produce a dispersed high crystallinity polymer morphology in a continuous low crystallinity polymer matrix based on the viscosity ratio of the components (see S. Wu, Polymer Engineering and Science, Vol. 27, Page 335, 1987).

OTHER EXAMPLES OF THE INVENTION

The below examples show how the present invention may be implemented. The ratios described in the following examples are in weight percentages, unless otherwise specified.

Example AA

Multi-Layer Pre-Stretched Elastic Films

Layer A—80/20 DOWLEX* 2045 (ethylene/1-octene heterogeneously branched copolymer having a melt index of about 1 g/10 min (MI), density of about 0.92 g/cc, Tm of about 122° C.)/LDPE 132 (high pressure ethylene homopolymer having melt index of about 0.22 g/10 min (MI), 0.922 g/cc, Tm of about 108° C.), a blended composition melting peak temperature of about 122° C. (DOWLEX* is a trademark of The Dow Chemical Company).

Layer B—Ethylene/1-octene Multi-block copolymer, Overall density of about 0.87 g/cc, melt index of about 1 g/10 min., zinc content of about 250 ppm (diethyl zinc is used as the chain shuttling agent), melting peak temperature of about 115° C. to 125° C., typically about 119-120° C.

Layer C—Same as layer (A).

Layer ratios—5/90/5 or 10/90/10.

The film is made using co-extrusion using a blown film process at a blow up ratio of about 3:1 and a melt temperature of about 450° F., die gap of about 90 mils, to a thickness of about 5 mil. The film is pre-stretched to 400% elongation using set of MDO draw rolls and relaxed to a very low tension to allow substantial elastic recovery before winding up on a roll. This pre-stretched elastic film is the inventive example. The lower wt % of skin layers are preferred for enhanced elasticity performance of the film.

Example BB

Multi-Layer Pre-Stretched Elastic Laminate

Layer A—80/20 DOWLEX 2247 (an ethylene/1-octene copolymer (heterogeneously branched LLDPE) having melt index of about 2.3 g/10 min. (MI), density of about 0.917 g/cc, a Tm of about 122° C.)/LDPE 501 (high pressure ethylene homopolymer having melt index of about 2 g/10 min. (MI), density of about 0.922 g/cc, Tm of about 108° C.), the blended composition having a melting peak temperature of about 122° C.

Layer B—Ethylene/1-octene Multi-block copolymer, Overall density=0.87 g/cc, melt index of about 2.5 g/10 min., zinc content of about 250 ppm (diethyl zinc is used as the chain shuttling agent), Melting peak temperature of about 115° C. to 125° C., typically about 119-120° C.

Layer C—Same as layer (A).

Layer ratios—5/90/5 or 10/90/10.

The film is made using co-extrusion by casting a melt curtain onto a perforated drum and drawing vacuum inside the drum to create holes in the film. A polypropylene spunbond fabric of about 20 grams/square meter basis weight point bonded with about 20% of the area bonded, made from either Ziegler-Natta or metallocene polypropylene homopolymer or copolymer, is nipped in to the melt curtain from the other side. Another polypropylene spunbond fabric is adhesively laminated to the film side to make spunbond/multi-layer film/spunbond laminate. This laminate is then processed through a ring-rolling process (set of gears) to stretch the laminate either in machine direction (MD) or cross direction (CD) or both to a strain necessary for achieving the desired elastic property (typically above about 100% strain). This ring-rolled elastic laminate is then wound up on a roll and is useful as an elastic component for hygiene articles such as diapers.

Example CC

Multi-Layer Elastic Laminate

Two polypropylene based spunbond fabric having about 20 grams/square meter basis weight, made from either Ziegler-Natta or metallocene polypropylene homopolymer or copolymer, is pre-stretched in MD to about 100 to 150% elongation after pre-heating the spunbond fabric to about 90 to 130° C. This results in a "necked" spunbond fabric, being necked in the CD. An ethylene multi-block copolymer having overall density of about 0.87 g/cc, a melt index of about 5 g/10 min., and a zinc level of about 250 ppm (diethyl zinc is used as the chain shuttling agent), and melting peak temperature of about 115° C. to about 125° C. is extrusion coated at about 2 mil thickness on to this necked spunbond with other necked spunbond brought into light contact from the other side using a nip-roll. This elastic laminate is then cooled and wound up on a roll. This laminate exhibits elastic recovery upon stretching in the CD, and is useful as elastic component of a hygiene article such as a diaper.

Example DD

Multi-Layer Elastic Laminate

A row of fibers having a diameter of about 500-1000 denier comprising an ethylene multi-block ethylene/1-octene copolymer having overall density of 0.87 g/cc, melt index of about 10 g/10 min., a zinc level of about 250 ppm (diethyl zinc is used as the chain shuttling agent), and melting peak temperature of about 115-125° C. is extruded onto a moving belt. A small layer (5-10% by weight of the final fibrous composite) of melt blown fabric (nominal fiber diameter of about 10 microns), made from elastic styrenic block copolymer formulation such as Styrene-ethylene/butene-styrene (SEBS) formulation, is applied to these fibers on-line. The resultant elastic composite fibrous structure is stretched on-line to about 500% elongation. Polypropylene based spunbond layers having about 20 grams/square meter basis weight, made from either Ziegler-Natta or metallocene polypropylene homopolymer or copolymer, are point bonded with about 20% of the area bonded on either side of this stretched fibrous structure using ultrasonic bonding. This stretched elastic laminate is relaxed to a very low tension to allow substantial recovery before winding up on a roll. Any suitable thermoplastic elastomer having desired high melt flow rate or melt index could be used for the melt blown layer. Such laminates are useful for elastic components of hygiene or medical articles such as side panels of training pants.

While the illustrative embodiments of the invention have been described with particularity, various other modifications will be apparent to and can be readily made by those skilled in the art without departing from the spirit and scope of the invention. Accordingly, the scope of the following claims are not limited to the examples and descriptions. Rather the claims are to be construed as encompassing all the features of patentable novelty that reside in the present invention, including all features which would be treated as equivalents of these features by those skilled in the art to which the invention pertains.

When numerical lower limits and numerical upper limits are listed above, ranges from any lower limit to any upper limit are contemplated. All issued U.S. patents and allowed U.S. patent applications cited above are incorporated herein by reference.

What is claimed is:

1. An article having at least two layers, the article comprising (a) a low crystallinity layer and (b) a high crystallinity layer, wherein said article is capable of undergoing plastic deformation upon elongation and wherein said article comprises at least one ethylene/α-olefin interpolymer, wherein the ethylene/α-olefin interpolymer comprises one or more of the following criteria:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$Tm > -2002.9 + 4538.5(d) - 2422.2(d)2$; or (b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g, $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), wherein the ratio of G'(25° C.) to G'(100° C.) is in the range of about 1:1 to about 9:1.

2. The article of claim 1, wherein the low crystallinity layer comprises a low crystallinity polymer and the high crystallinity layer comprises a high crystallinity polymer.

3. The article of claim 1 wherein the high crystallinity layer comprises said ethylene/α-olefin interpolymer.

4. The article of claim 1 wherein the low crystallinity layer comprises said ethylene/α-olefin interpolymer.

5. The article of claim 1 wherein said ethylene/α-olefin interpolymer is a component of the low crystallinity layer and the high crystallinity layer.

6. The article of claim 1 wherein the high crystallinity layer comprises a homopolymer or copolymer of propylene and one or more comonomers selected from ethylene and C4-C20 alpha-olefins.

7. The article of claim 1 wherein the high crystallinity layer comprises a homopolymer or copolymer of ethylene and one or more comonomers selected from ethylene and C3-C20 alpha-olefins.

8. The article of claim 1 wherein the high crystallinity layer comprises low density polyethylene.

9. The article of claim 1 wherein at least one layer of the article is capable of being elongated in at least one direction to an elongation of at least 50% of said article's original measurement at a temperature at or below the lowest melting point of the polymers comprising the article.

10. The article of claim 9 wherein at least one layer of the article is capable of being elongated in at least one direction to an elongation of at least 100% of said article's original measurement at a temperature at or below the lowest melting point of the polymers comprising the article.

11. The article of claim 9 wherein at least one layer of the article is capable of being elongated in at least one direction to an elongation of at least 300% of said article's original measurement at a temperature at or below the lowest melting point of the polymers comprising the article.

12. The article of claim 7 wherein at least one layer of the article is capable of being elongated in at least one direction to an elongation of at least 500% of said article's original measurement at a temperature at or below the lowest melting point of the polymers comprising the article.

13. The article of claim 1 wherein at least one layer of the article has been elongated.

14. The article of claim 1 wherein one or more of the high crystallinity layer and the low crystallinity layer is capable of being elongated in at least one direction to an elongation of at least 50% of said layer's original measurement at a temperature at or below the melting point of said layer that is capable of being elongated.

15. The article of claim 1 wherein the low crystallinity layer is capable of being elongated in at least one direction to an elongation of at least 50% of said layer's original measurement at a temperature at or below the melting point of said low crystallinity layer.

16. The article of claim 15 wherein the low crystallinity layer is capable of being elongated in at least one direction to an elongation of at least 100% of said layer's original measurement at a temperature at or below the melting point of said low crystallinity layer.

17. The article of claim 16 wherein the low crystallinity layer is capable of being elongated in at least one direction to an elongation of at least 300% of said layer's original measurement at a temperature at or below the melting point of said low crystallinity layer.

18. The article of claim 17 wherein the low crystallinity layer is capable of being elongated in at least one direction to an elongation of at least 500% of said layer's original measurement at a temperature at or below the melting point of said low crystallinity layer.

19. The article of claim 15 wherein the low crystallinity layer of the article has been elongated.

20. The article of claim 1 wherein the high crystallinity layer is capable of being elongated in at least one direction to an elongation of at least 50% of said layer's original measurement at a temperature at or below the melting point of said high crystallinity layer.

21. The article of claim 20 wherein the high crystallinity layer is capable of being elongated in at least one direction to an elongation of at least 100% of said layer's original measurement at a temperature at or below the melting point of said high crystallinity layer.

22. The article of claim 21 wherein the high crystallinity layer is capable of being elongated in at least one direction to an elongation of at least 300% of said layer's original measurement at a temperature at or below the melting point of said high crystallinity layer.

23. The article of claim 22 wherein the high crystallinity layer is capable of being elongated in at least one direction to an elongation of at least 500% of said layer's original measurement at a temperature at or below the melting point of said high crystallinity layer.

24. The article of claim 20 wherein the high crystallinity layer of the article has been elongated.

25. The article of claim 14 wherein both the low crystallinity layer and the high crystallinity layer of the article have been elongated.

26. The article of claim 2 in which the low crystallinity polymer and high crystallinity polymer have a difference in crystallinity of at least about 3 weight percent.

27. The article of claim 1 in which the low crystallinity layer has a crystallinity of from about 1 to about 25 weight percent.

28. The article of claim 1 in which the low crystallinity layer comprises a low crystallinity polymer comprising a crystallinity of from about 1 to about 25 weight percent.

29. The article of claim 2 in which the high crystallinity polymer has a melting point as determined by Differential Scanning Calorimetry (DSC) that is less than or within about 25 C of the melting point of the low crystallinity polymer.

30. The article of claim 2 in which the low crystallinity polymer has a melting point as determined by Differential Scanning Calorimetry (DSC) that is greater than the melting point of the high crystallinity polymer.

31. The article of claim 2 in which the low crystallinity polymer and said high crystallinity polymer have compatible crystallinity.

32. The article of any of claim 2 in which the low crystallinity polymer and said high crystallinity polymer have incompatible crystallinity.

33. The article of claim 1 in which the high crystallinity layer(s) comprises less than about 60 weight percent of the total weight of the high and low crystallinity layers.

34. The article of claim 2 in which the low crystallinity layer(s) comprises at least about 40 weight percent of the total weight of the high and low crystallinity polymers.

35. The article of claim 1 in which at least one high crystallinity layer comprises a nonwoven layer.

36. The article of claim 1 in which at least one low crystallinity layer comprises a nonwoven layer.

37. The article of claim 1 in which at least one high crystallinity layer comprises a film layer.

38. The article of claim 1 in which at least one high crystallinity layer comprises a film layer and at least one low crystallinity layer comprises, a film layer.

39. The article of claim 1 in which at least one high crystallinity layer comprises a nonwoven layer and at least one low crystallinity layer comprises a film layer.

40. An article comprising a multi-layer film comprising (a) a low crystallinity film non-skin layer comprising a low crystallinity polymer and (b) at least two high crystallinity film layers, wherein said article is capable of undergoing plastic deformation upon elongation and wherein said low crystallinity film layer comprises at least one ethylene/α-olefin interpolymer, wherein the ethylene/α-olefin interpolymer comprises one or more of the following criteria:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)2;\ or$$

(b) has a Mw/Mn from about 1.7 to about 3.5, and is characterized by a heat of fusion, ΔH in J/g, and a delta quantity, ΔA, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81\ \text{for}\ \Delta H\ \text{greater than zero and up to 130 J/g,}$$

$$\Delta T \geq 48°\ C.\ \text{for}\ \Delta H\ \text{greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF. characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer: or (e) has a storage modulus at 25° C., G'(25° C.), and a storage modulus at 100° C., G'(100° C.), wherein the ratio of G'(25° C.) to G'(100° C.) is in the range of about 1:1 to about 9:1 and wherein at least one high crystallinity layer comprises a polymer selected from the group consisting of a propylene homopolymer, a copolymer of propylene and one or more comonomers selected from ethylene and C4-C20 alpha-olefins, an ethylene homopolymer, and a copolymer of ethylene and one or more comonomers selected from ethylene and C3-C20 alpha-olefins.

41. An article comprising a multi-layer laminate comprising (a) a low crystallinity film or nonwoven non-skin layer comprising a low crystallinity polymer and (b) at least two high crystallinity film or nonwoven layers wherein said article is capable of undergoing plastic deformation upon elongation and wherein said low crystallinity film layer comprises at least one ethylene/α-olefin interpolymer. wherein the ethylene/α-olefin interpolymer composes one or more of the following criteria:

(a) has a Mw/Mn from about 1.7 to about 3.5, at least one melting point Tm, in degrees Celsius, and a density, d, in grams/cubic centimeter, wherein the numerical values of Tm and d correspond to the relationship:

$$Tm > -2002.9 + 4538.5(d) - 2422.2(d)2; \text{ or}$$

(b) has a Mw/Mn from about 1.7 to about 3.5, and is characterized by a heat of fusion, ΔH in J/g, and a delta quantity, ΔA, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d): \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), wherein the ratio of G'(25° C.) to G'(100° C.) is in the range of about 1:1 to about 9:1 and wherein said high crystallinity layer(s) comprises a polymer selected from the group consisting of a propylene homopolymer, a copolymer of propylene and one or more comonomers selected from ethylene and C4-C20 alpha-olefins, an ethylene homopolymer, and a copolymer of ethylene and one or more comonomers selected from ethylene and C3-C20 alpha-olefins.

42. The article of claim 41 wherein the high crystallinity film or nonwoven layer(s) comprises a polymer selected from the group consisting of homogeneously branched polymers, LLDPE, LDPE, HDPE, SLEP, hPP, and PP plastomers and PP elastomers, and RCP.

43. The article of claim 41 wherein the high crystallinity film or nonwoven layer(s) comprises less than about 60 weight percent of the multi-layer laminate.

44. The article of claim 41 wherein the α-olefin monomer units of the ethylene/α-olefin interpolymer in the low crystallinity film layer are present in an amount of from about 2 to about 50 weight percent of the total weight of the ethylene/α-olefin interpolymer in the low crystallinity film layer.

45. The article of claim 41 wherein said low crystallinity film layer is a blown film and wherein said ethylene/α-olefin interpolymer has a melt index (ASTM D1238 condition 190 C/2.16 kg) of from about 0.5 to about 5 g/10 minutes.

46. The article of claim 41 wherein said low crystallinity film layer is a cast film and wherein said ethylene/α-oletin interpolymer has a melt index (ASTM D1238, condition 190 C/2.16 kg) of from about 2 to about 10 g/10 minutes.

47. The article of claim 41 in which the low crystallinity layer is in contact with the first high crystallinity layer.

48. The article of claim 41 in which the multi-layer laminate comprises a third layer located between the low crystallinity layer and the high crystallinity layer.

49. The article of claim 41 in which the multi-layer laminate comprises a third layer, wherein the low crystallinity layer is located between the third layer and the high crystallinity layer.

50. The article of claim 49 wherein the third layer comprises a second high crystallinity polymer.

51. The article of claim 50 wherein the second high crystallinity polymer is different from the first high crystallinity polymer.

52. The article of claim 41 in which the high crystallinity layer is capable of being plastically deformed.

53. The article of claim 41 wherein the multi-layer laminate has a haze value of greater than about 70%.

54. The article of claim 41 wherein the multi-layer laminate has a permanent set of less than about 30% after a 50% hysteresis test.

55. The article of claim 41 wherein the multi-layer laminate has a permanent set of less than about 30% after a 100% hysteresis test.

56. The article of claim 41 wherein the multi-layer laminate has a permanent set of less than about 50% after a 150% hysteresis test.

57. The article of claim 41 wherein the multi-layer film comprises three or more layers.

58. A garment portion comprising an article of claim 41 adhered to a garment substrate.

59. An article of claim 41 wherein the multi-layer film comprises at least one elongated film layer.

60. The article of claim 59 in which the elongated film layer is elongated in at least one direction to an elongation of at least about 150% of its original measurement and has a haze value of at least about 10%.

61. The article of claim 41 in which at least one film layer is cross-linked.

62. A fiber comprising (a) a low crystallinity polymer and (b) a high crystallinity polymer, wherein said fiber is capable of undergoing plastic deformation upon elongation and wherein said low crystallinity polymer comprises at least one ethylene/α-olefin interpolymer, wherein the ethylene/α-olefin interpolymer comprises at least one criteria selected from the group consisting of:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)2; \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100 ° C.), wherein the ratio of G'(25° C.) to G'(100° C.) is in the range of about 1:1 to about 9:1 and wherein said high crystallinity polymer comprises a polymer selected from the group consisting of a propylene homopolymer, a copolymer of propylene and one or more comonomers selected from ethylene and C4-C20 alpha-olefins, an ethylene homopolymer, and a copolymer of ethylene and one or more comonomers selected from ethylene and C3-C20 alpha-olefins.

63. The fiber of claim 62 wherein the high crystallinity polymer comprises a polymer selected from the group consisting of LLDPE, LDPE, HDPE, SLEP, hPP, and RCP.

64. The fiber of claim 62 in the form of a bicomponent fiber in which the high crystallinity polymer comprises at least a portion of the surface of the fiber.

65. The fiber of claim 62 in the form of a bicomponent fiber in which the low crystallinity polymer comprises at least a portion of the surface of the fiber.

66. The fiber of claim 62 having a configuration selected from the group consisting of sheath/core, side-by-side, crescent moon, trilobal, islands-in-the-sea and flat.

67. The fiber of claim 62 in which the high crystallinity polymer has been plastically deformed.

68. A web comprising the fiber of claim 62.

69. The web of claim 68 in which at least a portion of the fibers are bonded to each other.

70. The fiber of claim 62 in which the fiber is elongated at a temperature below the melting point of the high crystallinity polymer.

71. The fiber of claim 62 in which the fiber is elongated at a temperature below the melting point of the low crystallinity polymer.

72. The fiber of claim 62 in which the high crystallinity polymer, low crystallinity polymer, or both, further comprises succinic acid or succinic anhydride functionality.

73. The fiber of claim 62 in which the high crystallinity layer comprises at least one Ziegler-Natta, metallocene or single site catalyzed polyolefin and the low crystallinity layer comprises a propylene-based polymer.

74. An article comprising (a) a fiber comprising a low crystallinity polymer and (b) a high crystallinity polymer, wherein said article is capable of undergoing plastic deformation upon elongation and wherein said low crystallinity polymer comprises at least one ethylene/α-olefin interpolymer, wherein the ethylene/α-olefin interpolymer comprises at least one criteria selected from the group consisting of:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)2; \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g.}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.), where in the ratio of G'(25° C.) to G'(100° C.) is in the range of about 1:1 to about 9:1 and wherein said high crystallinity polymer comprises a polymer selected from the group consisting of a propylene homopolymer, a copolymer of propylene and one or more comonomers selected from ethylene and C4-C20 alpha-olefins, an ethylene homopolymer, and a copolymer of ethylene and one or more comonomers selected from ethylene and C3-C20 alpha-olefins.

75. The article of claim 74 further comprising at least one nonwoven layer, wherein said layer comprises high crystallinity polymer (b).

76. An article comprising: A) a first layer of filaments comprising a low crystallinity polymer; B) a second layer of elastomeric meltblown fibers, said meltblown fibers bonded to at least a portion of the first layer filaments; C) a third layer of spunbond fibers; and. D) a fourth layer of spunbond fibers; wherein said first and second layers are disposed between said third and fourth layers; wherein the low crystallinity polymer comprises at least one criteria selected from the group consisting of:

(a) has a Mw/Mn from about 1.7 to about 3 5 at least one melting point, Tm, in degrees Celsius, and a density, d, in grams/cubic centimeter, wherein the numerical values of Tm and d correspond to the relationship:

$Tm > -2002.9 + 4538.5(d) - 2422.2(d)2$; or (b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g, $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or (e) has a storage modulus at 25° C., G'(25° C.), and a storage modulus at 100° C., G'(100° C.). wherein the ratio of G'(25° C.) to G'(100° C.) is in the range of about 1:1 to about 9:1.

77. The article of claim 76 wherein (C) and (D) are skin or surface layers.

78. The article of claim 76 wherein (C) or (D) or both comprise a high crystallinity polymer.

79. An article having at least two layers, the article comprising (a) a low crystallinity layer and (b) a high crystallinity layer, wherein said article is capable of undergoing plastic deformation upon elongation and wherein said article comprises at least one ethylene/α-olefin interpolymer, wherein the ethylene/α-olefin interpolymer comprises one or more of the following criteria:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1.

80. The article of claim 79, wherein the low crystallinity layer comprises a low crystallinity polymer and the high crystallinity layer comprises a high crystallinity polymer.

81. The article of claim 79 wherein the high crystallinity layer comprises said ethylene/α-olefin interpolymer.

82. The article of claim 79 wherein the low crystallinity layer comprises said ethylene/α-olefin interpolymer.

83. The article of claim 79 wherein said ethylene/α-olefin interpolymer is a component of the low crystallinity layer and the high crystallinity layer.

84. The article of claim 79 wherein the high crystallinity layer comprises a homopolymer or copolymer of propylene and one or more comonomers selected from ethylene and C4 C20 alpha olefins.

85. The article of claim 79 wherein the high crystallinity layer comprises a homopolymer or copolymer of ethylene and one or more comonomers selected from ethylene and C3 C20 alpha olefins.

86. The article of claim 79, wherein the high crystallinity layer comprises low density polyethylene.

87. The article of claim 79 wherein at least one layer of the article is capable of being elongated in at least one direction to an elongation of at least 50% of said article's original measurement at a temperature at or below the lowest melting point of the polymers comprising the article.

88. The article of claim 87 wherein at least one layer of the article is capable of being elongated in at least one direction to an elongation of at least 100% of said article's original measurement at a temperature at or below the lowest melting point of the polymers comprising the article.

89. The article of claim 87 wherein at least one layer of the article is capable of being elongated in at least one direction to an elongation of at least 300% of said article's original measurement at a temperature at or below the lowest melting point of the polymers comprising the article.

90. The article of claim 85 wherein at least one layer of the article is capable of being elongated in at least one direction to an elongation of at least 500% of said article's original measurement at a temperature at or below the lowest melting point of the polymers comprising the article.

91. The article of claim 79 or the preceding claims wherein at least one layer of the article has been elongated.

92. The article of claim 79 wherein one or more of the high crystallinity layer and the low crystallinity layer is capable of being elongated in at least one direction to an elongation of at least 50% of said layer's original measurement at a temperature at or below the melting point of said layer that is capable of being elongated.

93. The article of claim 79 wherein the low crystallinity layer is capable of being elongated in at least one direction to an elongation of at least 50% of said layer's original measurement at a temperature at or below the melting point of said low crystallinity layer.

94. The article of claim 93 wherein the low crystallinity layer is capable of being elongated in at least one direction to an elongation of at least 100% of said layer's original measurement at a temperature at or below the melting point of said low crystallinity layer.

95. The article of claim 94 wherein the low crystallinity layer is capable of being elongated in at least one direction to an elongation of at least 300% of said layer's original measurement at a temperature at or below the melting point of said low crystallinity layer.

96. The article of claim 95 wherein the low crystallinity layer is capable of being elongated in at least one direction to an elongation of at least 500% of said layer's original measurement at a temperature at or below the melting point of said low crystallinity layer.

97. The article of claim 93 wherein the low crystallinity layer of the article has been elongated.

98. The article of claim 79 wherein the high crystallinity layer is capable of being elongated in at least one direction to an elongation of at least 50% of said layer's original measurement at a temperature at or below the melting point of said high crystallinity layer.

99. The article of claim 98 wherein the high crystallinity layer is capable of being elongated in at least one direction to an elongation of at least 100% of said layer's original measurement at a temperature at or below the melting point of said high crystallinity layer.

100. The article of claim 99 wherein the high crystallinity layer is capable of being elongated in at least one direction to an elongation of at least 300% of said layer's original measurement at a temperature at or below the melting point of said high crystallinity layer.

101. The article of claim 100 wherein the high crystallinity layer is capable of being elongated in at least one direction to an elongation of at least 500% of said layer's original measurement at a temperature at or below the melting point of said high crystallinity layer.

102. The article of claim 98 wherein the high crystallinity layer of the article has been elongated.

103. The article of claim 79 wherein both the low crystallinity layer and the high crystallinity layer of the article have been elongated.

104. The article of claim 79 in which the low crystallinity polymer and high crystallinity polymer have a difference in crystallinity of at least about 3 weight percent.

105. The article of claim 79 in which the low crystallinity layer has a crystallinity of from about 1 to about 25 weight percent.

106. The article of claim 79 in which the low crystallinity layer comprises a low crystallinity polymer comprising a crystallinity of from about 1 to about 25 weight percent.

107. The article of claim 79 in which the high crystallinity polymer has a melting point as determined by Differential Scanning Calorimetry (DSC) that is less than or within about 25 C of the melting point of the low crystallinity polymer.

108. The article of claim 79 in which the low crystallinity polymer has a melting point as determined by Differential Scanning Calorimetry (DSC) that is greater than the melting point of the high crystallinity polymer.

109. The article of claim 79 in which the low crystallinity polymer and said high crystallinity polymer have compatible crystallinity.

110. The article of claim 79 in which the low crystallinity polymer and said high crystallinity polymer have incompatible crystallinity.

111. The article of claim 79 in which the high crystallinity layer(s) comprises less than about 60 weight percent of the total weight of the high and low crystallinity layers.

112. The article of claim 79 in which the low crystallinity layer(s) comprises at least about 40 weight percent of the total weight of the high and low crystallinity polymers.

113. The article of claim 79 in which at least one high crystallinity layer comprises a nonwoven layer.

114. The article of claim 79 in which at least one low crystallinity layer comprises a nonwoven layer.

115. The article of claim 79 in which at least one high crystallinity layer comprises a film layer.

116. The article of claim 79 in which at least one high crystallinity layer comprises a film layer and at least one low crystallinity layer comprises a film layer.

117. The article of claim 79 in which at least one high crystallinity layer comprises a nonwoven layer and at least one low crystallinity layer comprises a film layer.

118. An article comprising a multi-layer film comprising (a) a low crystallinity film non-skin layer comprising a low crystallinity polymer and (b) at least two high crystallinity film layers, wherein said article is capable of undergoing plastic deformation upon elongation and wherein said low crystallinity film layer comprises at least one ethylene/α-olefin interpolymer, wherein the ethylene/α-olefin interpolymer comprises one or more of the following criteria:
 (1) an average block index greater than zero and up to about 1.0 and a molecular weight distribution, Mw/Mn, greater than about 1.3; or
 (2) at least one molecular fraction which elutes between 40° C. and 130° when fractionated using TREF, characterized in that the fraction has a block index of at least 0.5 and up to about 1.

119. An article comprising a multi-layer laminate comprising (a) a low crystallinity film or nonwoven non-skin layer comprising a low crystallinity polymer and (b) at least two high crystallinity film or nonwoven layers wherein said article is capable of undergoing plastic deformation upon elongation and wherein said low crystallinity film layer comprises at least one ethylene/α-olefin interpolymer, wherein the ethylene/α-olefin interpolymer comprises one or more of the following criteria:

(1) an average block index greater than zero and up to about 1.0 and a molecular weight distribution, Mw/Mn, greater than about 1.3; or (2) at least one molecular fraction which elutes between 40° C. and 130° C. when fractionated using TREF. characterized in that the fraction has a block index of at least 0.5 and up to about 1.

120. The article of claim 119 wherein the high crystallinity film or nonwoven layer(s) comprises a polymer selected from the group consisting of homogeneously branched polymers, LLDPE, LDPE. HDPE, SLEP, hPP, and PP plastomers and PP elastomers, and RCP.

121. The article of claim 119 wherein the high crystallinity film or nonwoven layer(s) comprises less than about 60 weight percent of the multi-layer laminate.

122. The article of claim 119 wherein the α-olefin monomer units of the ethylene/α-olefin interpolymer in the low crystallinity film layer are present in an amount of from about 2 to about 50 weight percent of the total weight of the ethylene/α-olefin interpolymer in the low crystallinity film layer.

123. The article of claim 119 wherein said low crystallinity film layer is a blown film and wherein said ethylene/α-olefin interpolymer has a melt index (ASTM D1238 condition 190 C/2.16 kg) of from about 0.5 to about 5 g/10 minutes.

124. The article of claim 119 wherein said low crystallinity film layer is a cast film and wherein said ethylene/α-olefin interpolymer has a melt index (ASTM D1238, condition 190 C/2.16 kg) of from about 2 to about 10 g/10 minutes.

125. The article of claim 119 in which the low crystallinity layer is in contact with the first high crystallinity layer.

126. The article of claim 119 in which the multi-layer laminate comprises a third layer located between the low crystallinity layer and the high crystallinity layer.

127. The article of claim 119 in which the multi-layer laminate comprises a third layer, wherein the low crystallinity layer is located between the third layer and the high crystallinity layer.

128. The article of claim 127 wherein the third layer comprises a second high crystallinity polymer.

129. The article of claim 128 wherein the second high crystallinity polymer is different from the first high crystallinity polymer.

130. The article of claim 119 in which the high crystallinity layer is capable of being plastically deformed.

131. The article of claim 119 wherein the multi-layer laminate has a haze value of greater than about 70%.

132. The article of claim 119 wherein the multi-layer laminate has a permanent set of less than about 30% after a 50% hysteresis test.

133. The article of claim 119 wherein the multi-layer laminate has a permanent set of less than about 30% after a 100% hysteresis test.

134. The article of claim wherein the multi-layer laminate has a permanent set of less than about 50% after a 150% hysteresis test.

135. The article of claim 119 wherein the multi-layer film comprises three or more layers.

136. A garment portion comprising an article of claim 119 adhered to a garment substrate.

137. An article of claim 119 wherein the multi-layer film comprises at least one elongated film layer.

138. The article of claim 137 in which the elongated film layer is elongated in at least one direction to an elongation of at least about 150% of its original measurement and has a haze value of at least about 10%.

139. The article of claim 119 in which at least one film layer is cross-linked.

140. A fiber comprising (a) a low crystallinity polymer and (b) a high crystallinity polymer, wherein said fiber is capable of undergoing plastic deformation upon elongation and wherein said low crystallinity polymer comprises at least one ethylene/α-olefin interpolymer, wherein the ethylene/α-olefin interpolymer comprises at least one criteria selected from the group consisting of:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1.

141. The fiber of claim 140 wherein the high crystallinity polymer comprises a polymer selected from the group consisting of LLDPE, LDPE, HDPE, SLEP, hPP, and RCP.

142. The fiber of claim 140 in the form of a bicomponent fiber in which the high crystallinity polymer comprises at least a portion of the surface of the fiber.

143. The fiber of claim 140 in the form of a bicomponent fiber in which the low crystallinity polymer comprises at least a portion of the surface of the fiber.

144. The fiber of claim 140 having a configuration selected from the group consisting of sheath/core, side-by-side, crescent moon, trilobal, islands-in-the-sea and flat.

145. The fiber of claim 140 in which the high crystallinity polymer has been plastically deformed.

146. A web comprising the fiber of claim 140.

147. The web of claim 68 in which at least a portion of the fibers are bonded to each other.

148. The fiber of claim 140 in which the fiber is elongated at a temperature below the melting point of the high crystallinity polymer.

149. The fiber of claim 140 in which the fiber is elongated at a temperature below the melting point of the low crystallinity polymer.

150. The fiber of claim 140 in which the high crystallinity polymer, low crystallinity polymer, or both, further comprises succinic acid or succinic anhydride functionality.

151. The fiber of claim 140 in which the high crystallinity layer comprises at least one Ziegler-Natta, metallocene or single site catalyzed polyolefin and the low crystallinity layer comprises a propylene-based polymer.

152. An article comprising (a) a fiber comprising a low crystallinity polymer and (b) a high crystallinity polymer, wherein said article is capable of undergoing plastic deformation upon elongation and wherein said low crystallinity polymer comprises at least one ethylene/α-olefin interpolymer, wherein the ethylene/α-olefin interpolymer comprises at least one criteria selected from the group consisting of:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1.

153. The article of claim 152 further comprising at least one nonwoven layer, wherein said layer comprises high crystallinity polymer (b).

154. An article comprising: A) a first layer of filaments comprising a low crystallinity polymer; B) a second layer of elastomeric meltblown fibers, said meltblown fibers bonded to at least a portion of the first layer filaments; C) a third layer of spunbond fibers; and, D) a fourth layer of spunbond fibers; wherein said first and second layers are disposed between said third and fourth layers; wherein the low crystallinity polymer comprises at least one criteria selected from the group consisting of:

(1) an average block index greater than zero and up to about 1.0 and a molecular weight distribution, Mw/Mn, greater than about 1.3; or (2) at least one molecular fraction which elutes between 40° C. and 130° C. when fractionated using TREF, characterized in that the fraction has a block index of at least 0.5 and up to about 1.

155. The article of claim 154 wherein (C) and (D) are skin or surface layers.

156. The article of claim 154 wherein (C) or (D) or both comprise a high crystallinity polymer.

\* \* \* \* \*

UNITED STATES PATENT AND TRADEMARK OFFICE
CERTIFICATE OF CORRECTION

PATENT NO. : 7,498,282 B2
APPLICATION NO. : 11/552563
DATED : March 3, 2009
INVENTOR(S) : Rajen M. Patel et al.

It is certified that error appears in the above-identified patent and that said Letters Patent is hereby corrected as shown below:

On the Title Page, change Item "(73) Assignee: Dow Global Technology Inc., Midland," to Item "(73) Assignee: Dow Global Technologies Inc., Midland,"

at Col/Line 62/57, change "$Tm>2002.9+4538.5(d)-2422.2(d)2$" to "$Tm>-2002.9+4538.5(d)-2422.2(d)^2$"

at Col/Line 62/60, change "$\Delta A$" to "$\Delta T$"

at Col/Line 63/48, change "$Tm>-2002.9+4538.5(d)-2422.2(d)2$" to "$Tm>-2002.9+4538.5(d)-2422.2(d)^2$"

at Col/Line 63/51, change "$\Delta A$" to "$\Delta T$"

at Col/Line 64/46, change "ethylene/α-oletin" to "ethylene/α-olefin"

at Col/Line 65/33, change "$Tm>-2002.9+4538.5(d)-2422.2(d)2$" to "$Tm>-2002.9+4538.5(d)-2422.2(d)^2$"

at Col/Line 66/54, change "$Tm>-2002.9+4538.5(d)-2422.2(d)2$" to "$Tm>-2002.9+4538.5(d)-2422.2(d)^2$"

at Col/Line 67/49, change "$Tm>-2002.9+4538.5(d)-2422.2(d)2$" to "$Tm>-2002.9+4538.5(d)-2422.2(d)^2$"

at Col/Line 67/52, change "Jig" to "J/g"

UNITED STATES PATENT AND TRADEMARK OFFICE
CERTIFICATE OF CORRECTION

PATENT NO. : 7,498,282 B2
APPLICATION NO. : 11/552563
DATED : March 3, 2009
INVENTOR(S) : Rajen M. Patel et al.

It is certified that error appears in the above-identified patent and that said Letters Patent is hereby corrected as shown below:

at Col/Line 71/54, change "134. The article of claim wherein..." to "134. The article of claim 119 wherein..."

Signed and Sealed this

Twenty-first Day of April, 2009

JOHN DOLL
*Acting Director of the United States Patent and Trademark Office*